(12) United States Patent
Tsusaka et al.

(10) Patent No.: US 10,076,845 B2
(45) Date of Patent: Sep. 18, 2018

(54) ROBOT SYSTEM, INSTRUCTION INPUT DEVICE, NON-TRANSITORY COMPUTER-READABLE RECORDING MEDIUM, AND CONTROL METHOD FOR ROBOT SYSTEM

(71) Applicant: Panasonic Intellectual Property Management Co., Ltd., Osaka (JP)

(72) Inventors: Yuko Tsusaka, Osaka (JP); Yudai Fudaba, Osaka (JP); Yasunao Okazaki, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 179 days.

(21) Appl. No.: 15/194,017

(22) Filed: Jun. 27, 2016

(65) Prior Publication Data

US 2017/0035631 A1 Feb. 9, 2017

(30) Foreign Application Priority Data

Aug. 5, 2015 (JP) .................................. 2015-155298
Mar. 30, 2016 (JP) .................................. 2016-069011

(51) Int. Cl.
*G06F 19/00* (2018.01)
*B25J 19/06* (2006.01)
(Continued)

(52) U.S. Cl.
CPC ............ *B25J 19/06* (2013.01); *A61G 7/1017* (2013.01); *A61G 7/1053* (2013.01); *B25J 5/007* (2013.01);
(Continued)

(58) Field of Classification Search
CPC .. A61G 7/1053; A61G 7/1017; A61G 7/1046; B25J 11/009; B25J 13/06; B25J 19/06; B25J 5/007
See application file for complete search history.

(56) References Cited

U.S. PATENT DOCUMENTS 6,742,206 B1 * 6/2004 Han ...................... A61G 5/006
280/250.1
7,392,554 B1 * 7/2008 Su ........................ A61G 7/1017
5/86.1
(Continued)

FOREIGN PATENT DOCUMENTS

JP 2000-137514 5/2000
JP 2001-071287 3/2001
(Continued)

*Primary Examiner* — Rachid Bendidi
(74) *Attorney, Agent, or Firm* — Wenderoth, Lind & Ponack, L.L.P.

(57) ABSTRACT

A robot system for assisting a patient in standing up and/or sitting down is provided. The robot system includes the following elements. A drive mechanism executes a drive pattern for assisting the patient in standing up and/or sitting down. An instruction input device receives an instruction to cause the drive mechanism to execute the drive pattern. A state acquirer acquires an execution state of the drive mechanism which is executing the drive pattern. A controller decides whether or not to cause the drive mechanism to execute the instruction received by the instruction input device, on the basis of the execution state acquired by the state acquirer, and controls the driving of the drive mechanism.

19 Claims, 41 Drawing Sheets

(51) Int. Cl.
    *A61G 7/10*          (2006.01)
    *B25J 5/00*          (2006.01)
    *B25J 11/00*        (2006.01)
    *B25J 13/06*        (2006.01)

(52) U.S. Cl.
    CPC .............. *B25J 11/009* (2013.01); *B25J 13/06* (2013.01); *A61G 7/1046* (2013.01)

(56) References Cited

U.S. PATENT DOCUMENTS

| | | | | |
|---|---|---|---|---|
| 7,827,630 | B2* | 11/2010 | Bostelman | A61G 7/1007 5/83.1 |
| 8,375,484 | B2* | 2/2013 | Ota | A61G 7/1017 5/81.1 R |
| 8,832,875 | B2* | 9/2014 | Odashima | A61G 7/1017 5/81.1 R |
| 9,038,212 | B2* | 5/2015 | Yamaguchi | A61G 7/1017 5/87.1 |
| 9,452,528 | B1* | 9/2016 | Checka | G08C 17/02 |
| 9,669,549 | B2* | 6/2017 | Suzuki | A61G 7/1017 |
| 2003/0187524 | A1 | 10/2003 | Hashimoto et al. | |
| 2008/0265821 | A1* | 10/2008 | Theobald | B25J 5/005 318/568.12 |
| 2011/0277235 | A1* | 11/2011 | Okumatsu | A61G 7/1017 5/83.1 |

FOREIGN PATENT DOCUMENTS

| | | |
|---|---|---|
| JP | 2003-288105 | 10/2003 |
| JP | 2013-158386 | 8/2013 |

* cited by examiner

FIG. 6

| TIME (msec) | POSITION (m) | INITIAL POSITION FLAG | PROGRESS INFORMATION |
|---|---|---|---|
| t0 | p0 | 0 | 0 |
| t1 | p1 | 1 | 1 |
| t2 | p2 | 0 | 0 |
| . . | . . | . . | . . |
| tn | p10 | 0 | 0 |
| tn+1 | p11 | 0 | 0 |
| ⋮ | ⋮ | ⋮ | ⋮ |

FIG. 11

| STATE ID | INPUT IF RECEIVE/REJECT INFORMATION | INDICATOR INFORMATION | PROGRESS INFORMATION |
|---|---|---|---|
| S1 | (1, 0, 0, 0, 1) | (0, 0, 0, 0, 0) | 0 |
| S2 | (1, 1, 0, 0, 1) | (1, 1, 0, 0, 1) | 1 |
| S3 | (1, 1, 0, 0, 1) | (1, 1, 0, 0, 1) | 0 |
| S4 | (1, 1, 0, 0, 1) | (1, 1, 0, 0, 1) | 0 |
| S5 | (1, 0, 1, 1, 1) | (1, 0, 1, 1, 1) | 0 |
| S6 | (1, 0, 1, 1, 1) | (1, 0, 1, 1, 1) | 0 |
| S7 | (1, 0, 1, 1, 1) | (1, 0, 1, 1, 1) | 0 |
| S8 | (1, 0, 0, 0, 1) | (0, 0, 0, 0, 0) | 0 |

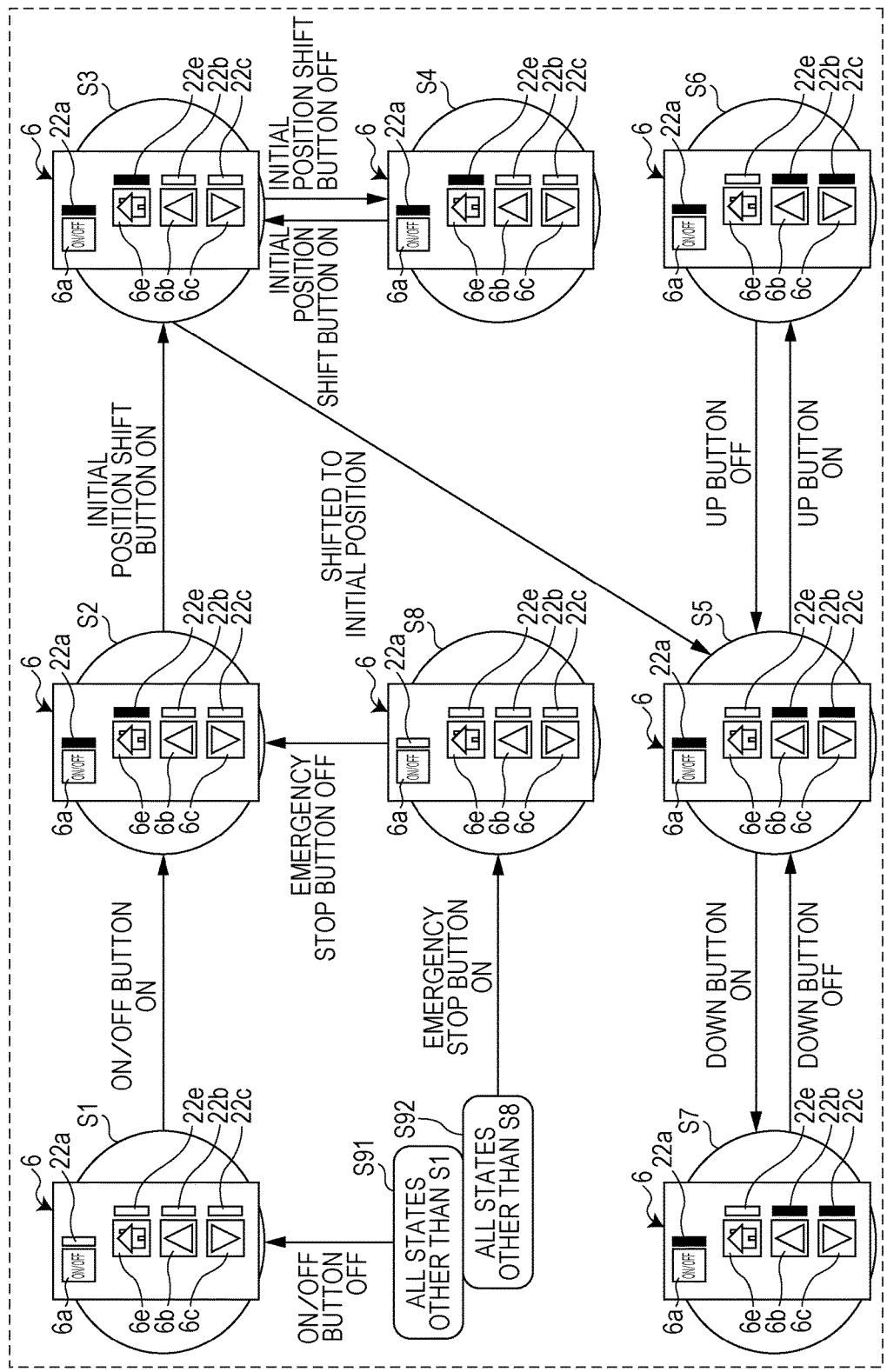

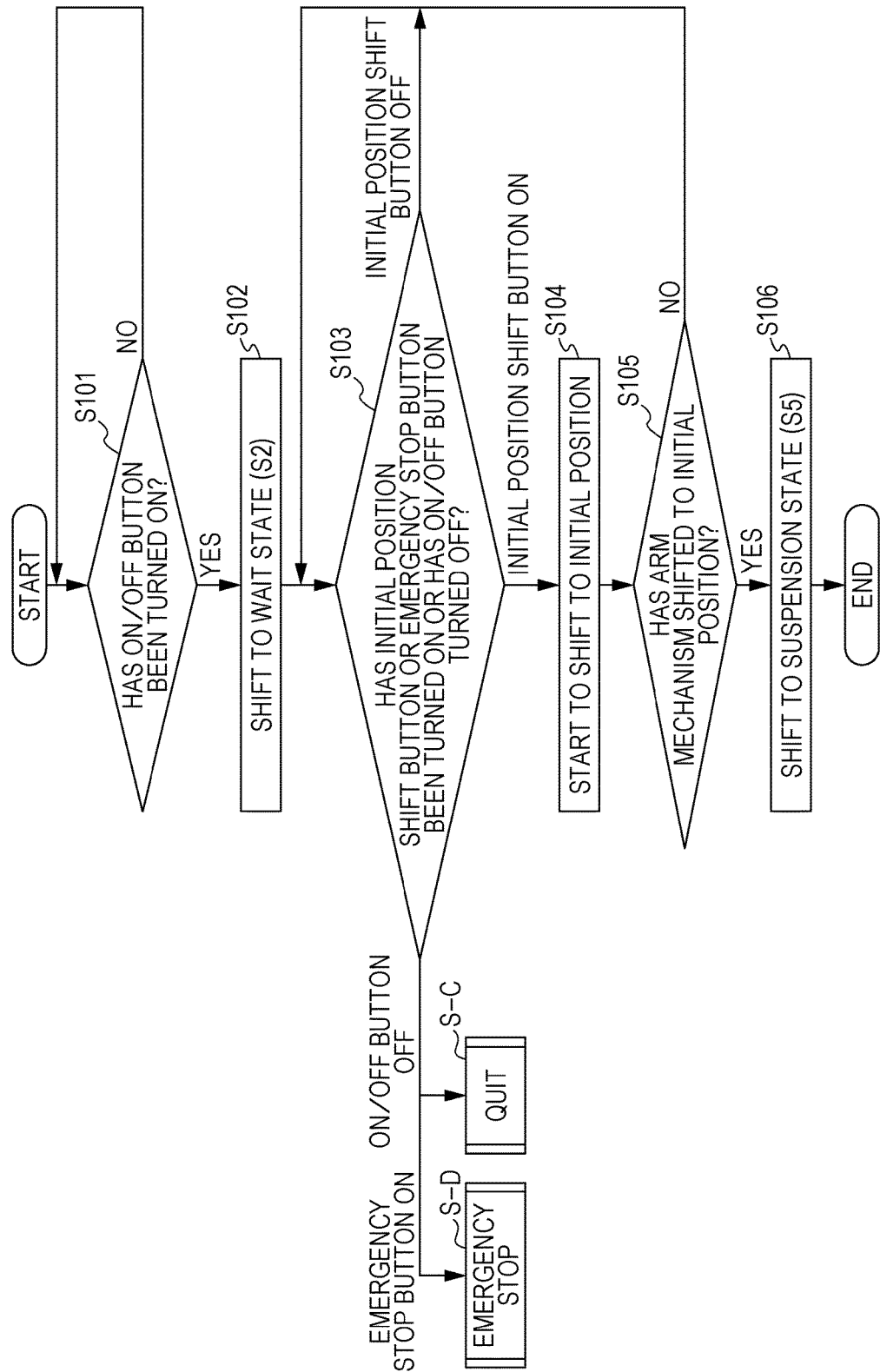

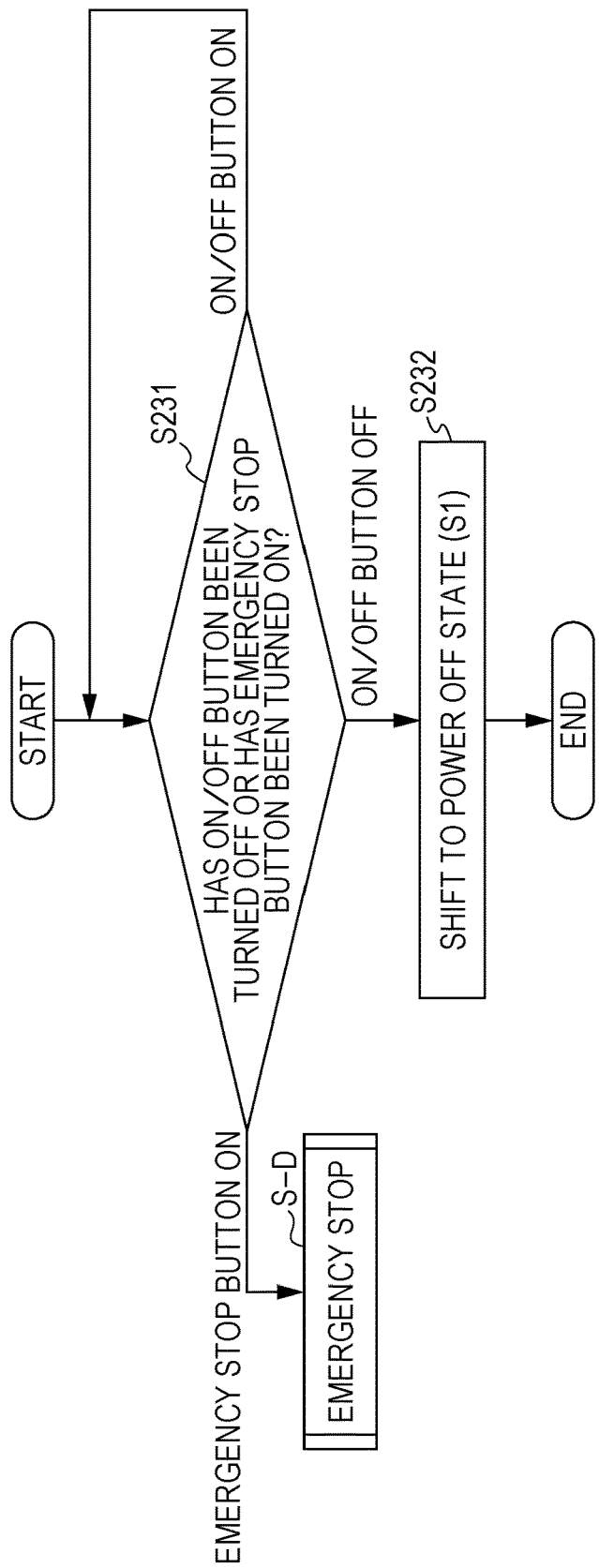

FIG. 15

| TIME (msec) | POSITION (m) | INITIAL POSITION FLAG | PROGRESS INFORMATION | STATE INFORMATION |
|---|---|---|---|---|
| t0 | p0 | 0 | 0 | v0 |
| t1 | p1 | 1 | 1 | v1 |
| t2 | p2 | 0 | 0 | v2 |
| : | : | : | : | : |
| tn | p10 | 0 | 0 | vn |
| tn+1 | p11 | 0 | 0 | vn+1 |
| . . . . | . . . . | . . . . | . . . . | . . . . |

FIG. 16A

| STATE ID | INPUT IF RECEIVE/REJECT INFORMATION | INDICATOR INFORMATION | PROGRESS INFORMATION |
|---|---|---|---|
| S1 | (1, 0, 0, 0, 1) | (0, 0, 0, 0, 0, ID1) | 0 |
| S2 | (1, 1, 0, 0, 1) | (1, 1, 0, 0, 1, ID2) | 1 |
| S3 | (1, 1, 0, 0, 1) | (1, 1, 0, 0, 1, ID3) | 0 |
| S4 | (1, 1, 0, 0, 1) | (1, 1, 0, 0, 1, ID4) | 0 |
| S5 | (1, 0, 1, 1, 1) | (1, 0, 1, 1, 1, ID5) | 0 |
| S6 | (1, 0, 1, 1, 1) | (1, 0, 1, 1, 1, ID6) | 0 |
| S7 | (1, 0, 1, 1, 1) | (1, 0, 1, 1, 1, ID7) | 0 |
| S8 | (1, 0, 0, 0, 1) | (0, 0, 0, 0, 0, ID8) | 0 |

FIG. 16B

| INDICATOR INFORMATION ID | INDICATOR INFORMATION |
|---|---|
| ID1 | 0 |
| ID2 | "POWER ON" |
| ID3 | "INITIALIZING" |
| ID4 | "INITIALIZING SUSPENDED" |
| ID5 | videofilename1 |
| ID6 | videofilename1 |
| ID7 | videofilename1 |
| ID8 | "EMERGENCY STOP" |

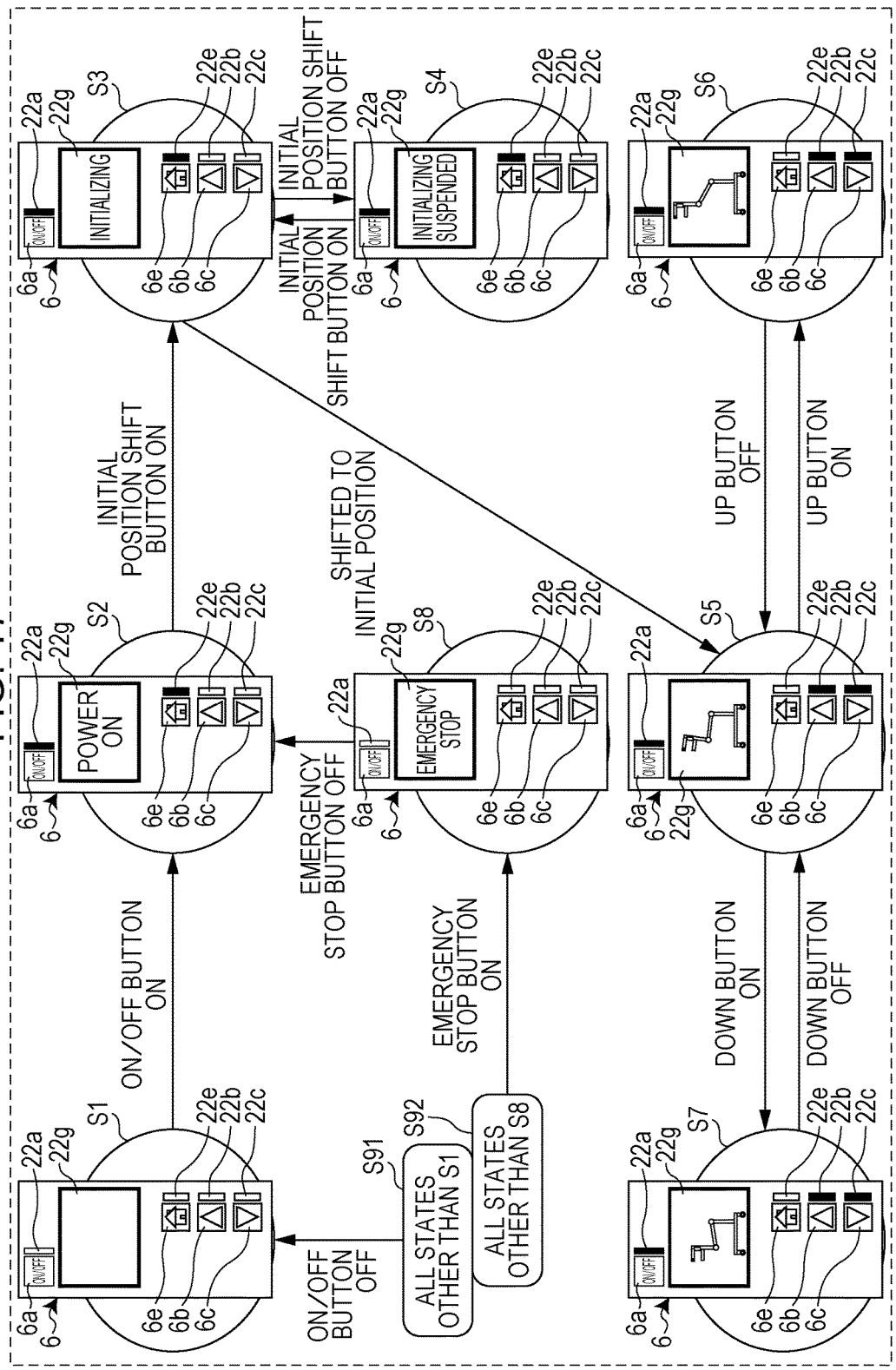

FIG. 26

| STATE ID | INPUT IF RECEIVE/REJECT INFORMATION | INDICATOR INFORMATION | PROGRESS INFORMATION |
|---|---|---|---|
| S1 | (1, 0, 0, 0, 1) | (0, 0, 0, 0, 0) | 0 |
| S2 | (1, 1, 0, 0, 1) | (1, 1, 0, 0, 1) | 1 |
| S3 | (1, 1, 0, 0, 1) | (1, 1, 0, 0, 1) | 0 |
| S4 | (1, 1, 0, 0, 1) | (1, 1, 0, 0, 1) | 0 |
| S5 | (1, 0, 1, 1, 1) | (1, 0, 1, 1, 1) | 0 |
| S6 | (1, 0, 1, 1, 1) | (1, 0, 1, 1, 1) | 0 |
| S7 | (1, 0, 1, 1, 1) | (1, 0, 1, 1, 1) | 0 |
| S8 | (1, 0, 0, 0, 1) | (0, 0, 0, 0, 0) | 0 |
| S9 | (1, 0, 0, 0, 1) | (1, 0, 0, 0, 1) | 0 |

ROBOT SYSTEM, INSTRUCTION INPUT DEVICE, NON-TRANSITORY COMPUTER-READABLE RECORDING MEDIUM, AND CONTROL METHOD FOR ROBOT SYSTEM

BACKGROUND

1. Technical Field

The present disclosure relates to a robot system, an instruction input device, a non-transitory computer-readable recording medium, and a control method for the robot system that assist a patient in standing up from a sitting posture and/or in sitting down from a standing posture.

2. Description of the Related Art

A stand assist robot that assists a patient in standing up in accordance with preset path data while an operator is pressing a switch (for example, see Japanese Unexamined Patent Application Publication No. 2013-158386) has been proposed. In this stand assist robot, the chest of a patient is supported by a support portion, and three servo motors are controlled. Then, in an automatic mode, the support portion is automatically moved along a predetermined path, and in a manual mode, by rotating a dial of a manual pulse generator in accordance with the movement of a patient, the movement speed and the movement direction of the support portion can be changed.

SUMMARY

If an instruction input from an operator by using a switch is received in any circumstances to drive a robot in accordance with the received instruction, it may not be convenient for assisting a patient in moving. For example, in the case of a robot which assists a patient in standing up or walking, if a patient inputs an instruction to assist the patient in walking by mistake while the robot is assisting the patient in standing up, the robot responds to this accidental instruction from the patient and moves accordingly, which makes the patient feel uncomfortable.

One non-limiting and exemplary embodiment provides a robot system, an instruction input device, a non-transitory computer-readable recording medium, and a control method for the robot system in which, while a patient is standing up or sitting down, a drive mechanism does not perform any operation that the patient does not wish to receive, which would otherwise make the patient feel uncomfortable.

In one general aspect, the techniques disclosed here feature a robot system including a drive mechanism that executes a drive pattern for assisting a user in moving, an instruction input device that receives an instruction to execute the drive pattern, a state acquirer that acquires an execution state of the drive mechanism which is executing the drive pattern, and a controller that decides whether or not to cause the drive mechanism to execute the instruction received by the instruction input device, on the basis of the execution state, and controls driving of the drive mechanism. If an emergency stop instruction is received, until predetermined conditions are satisfied, the controller does not allow the drive mechanism to execute the instruction received by the instruction input device. The emergency stop instruction is an instruction to stop the drive mechanism operating and to maintain a state of the drive mechanism when the drive mechanism stops operating. The predetermined conditions are that (i) the emergency stop instruction is canceled and (ii) the drive mechanism is shifted to a connecting position at which the drive mechanism is connected to the user.

According to an aspect of the present disclosure, while a patient is standing up or sitting down, a drive mechanism does not perform any operation that the patient does not wish to receive, which would otherwise make the patient feel uncomfortable.

It should be noted that general or specific embodiments may be implemented as a system, a method, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates an example of details of an operation information database in the first embodiment;

FIG. 11 illustrates an example of details of an operating state database in the first embodiment;

FIG. 13 is a diagram illustrating the transition of the state of the controller, together with indicators, in the first embodiment;

FIG. 14B is a flowchart illustrating an initializing operation of the robot system according to the first embodiment;

FIG. 14E is a flowchart illustrating a quit operation of the robot system according to the first embodiment;

FIG. 15 illustrates an example of details of an operation information database in a second embodiment of the present disclosure;

FIGS. 16A and 16B illustrate an example of details of an operating state database in the second embodiment;

FIG. 17 is a diagram illustrating the transition of the state of a controller, together with indicators, in the second embodiment;

FIG. 26 illustrates an example of details of an operating state database in the third embodiment;

DETAILED DESCRIPTION

Figure 1A:
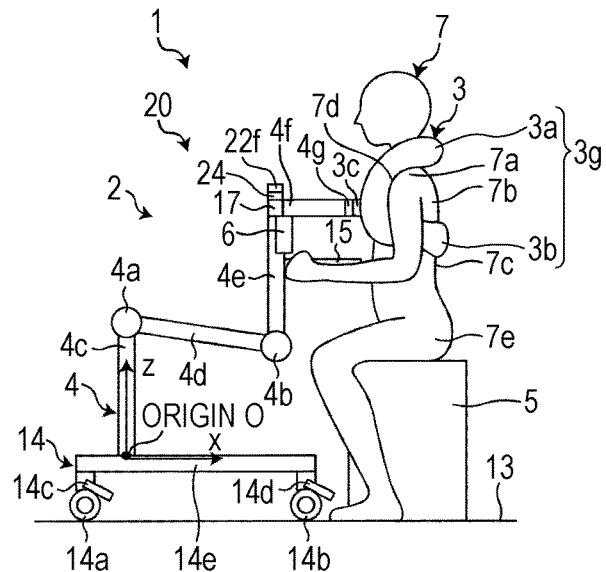
FIG. 1A is a side view illustrating an example of the overall configuration of a robot system, together with a patient, as a sit-to-stand and/or stand-to-sit assist system (sit-to-stand and/or stand-to-sit assist apparatus) according to a first embodiment of the present disclosure.

Embodiments of the present disclosure will be described below with reference to the accompanying drawings.

Prior to a detailed explanation of the embodiments with reference to the accompanying drawings, various aspects of the present disclosure will be described below.

According to a first aspect of the present disclosure, the following robot system is provided.

A robot system including:
a drive mechanism that executes a drive pattern for assisting a patient in moving;
an instruction input device that receives an instruction to cause the drive mechanism to execute the drive pattern;
a state acquirer that acquires an execution state of the drive mechanism which is executing the drive pattern; and
a controller that decides whether or not to cause the drive mechanism to execute the instruction received by the instruction input device, on the basis of the execution state acquired by the state acquirer, and controls driving of the drive mechanism.

If an instruction received by the instruction input device is always executed by the drive mechanism of a robot in any circumstances, it may not be convenient for assisting a patient in moving. For example, in the case of a robot which assists a patient in standing up or walking, if a patient inputs an instruction to assist the patient in walking by mistake while the robot is assisting the patient in standing up, the drive mechanism responds to this accidental instruction from the patient and drives the robot accordingly, which makes the patient feel uncomfortable.

According to the first aspect, the controller decides whether or not to cause the drive mechanism to execute an instruction received by the instruction input device, on the basis of the execution state of the drive mechanism which is executing the drive pattern. That is, if the controller decides, based on the execution state, that the robot system will not be able to assist a patient appropriately if the instruction is executed, the controller does not execute this instruction. In this manner, the drive mechanism does not perform any operation that the patient does not wish to receive, which would otherwise make the patient feel uncomfortable.

According to a second aspect of the present disclosure, the following robot system is provided.

The robot system according to the first aspect,
the drive mechanism including
a holding mechanism that holds the patient, and
a pulling mechanism that is connectable to the holding mechanism and pulls the holding mechanism so that the holding mechanism will move along the drive pattern and execute the drive pattern,
the instruction input device including
a connecting position shift instruction input device that receives an instruction to shift the pulling mechanism to a connecting position at which the pulling mechanism is connected to the holding mechanism, under the control of the controller,
wherein, after the pulling mechanism is shifted to the connecting position, the instruction to cause the drive mechanism to execute the drive pattern is received by the instruction input device, under the control of the controller.

According to the second aspect, under the control of the controller, the pulling mechanism is shifted to the connecting position at which the pulling mechanism is connected to the holding mechanism. With this configuration, when the patient wishes to use the pulling mechanism, the pulling mechanism can start pulling the holding mechanism immediately without the patient having to adjust the position of the pulling mechanism to the connecting position.

According to a third aspect of the present disclosure, the following robot system is provided.

The robot system according to the first aspect,
the drive mechanism including
a holding mechanism that holds the patient, and
a pulling mechanism that is connectable to the holding mechanism and pulls the holding mechanism so that the holding mechanism will move along the drive pattern and execute the drive pattern,
the robot system further including
an emergency stop instruction input device that receives an emergency stop instruction to stop the pulling mechanism operating and to maintain a state of the pulling mechanism when the pulling mechanism stops operating, under the control of the controller,
wherein, if the emergency stop instruction received by the emergency stop instruction input device is canceled, under the control of the controller, after the pulling mechanism is shifted to a connecting position at which the pulling mechanism is connected to the holding mechanism, the instruction to cause the drive mechanism to execute the drive pattern is received by the instruction input device.

According to the third aspect, when the emergency stop instruction received by the emergency stop instruction input device is canceled, under the control of the controller, the pulling mechanism is shifted to the connecting position. With this configuration, when the patient wishes to use the pulling mechanism, the pulling mechanism can start pulling the holding mechanism immediately without the patient having to adjust the position of the pulling mechanism to the connecting position after the occurrence of emergency stop.

According to a fourth aspect of the present disclosure, the following robot system is provided.

The robot system according to one of the first through third aspects, wherein:
the drive mechanism executes a first drive pattern for assisting the patient in performing a first movement and a second drive pattern for assisting the patient in performing a second movement;
the instruction input device receives a first instruction to cause the drive mechanism to execute the first drive pattern or a second instruction to cause the drive mechanism to execute the second drive pattern; and
if the second instruction is received by the instruction input device when the execution state acquired by the state acquirer indicates that the drive mechanism is executing the first drive pattern, the controller does not allow the drive mechanism to execute the second drive pattern.

According to a fifth aspect of the present disclosure, the following robot system is provided.

The robot system according to one of the first through fourth aspects, wherein:
the instruction input device includes an indicator that indicates whether or not it is possible to receive the instruction to cause the drive mechanism to execute the drive pattern; and
the controller causes the indicator to indicate whether or not it is possible to receive the instruction, on the basis of a result of deciding whether or not to cause the drive mechanism to execute the instruction received by the instruction input device.

In the robot system according to the first aspect, even if an operator, that is, a patient or a helper, inputs an instruction to cause the drive mechanism to execute the drive pattern by using the instruction input device, the drive mechanism may not execute the instruction depending on the execution state of the drive mechanism which is executing the drive pattern. In this case, the operator is not able to identify whether the robot system has decided that the drive mechanism will not execute the instruction on the basis of the execution state, or the instruction has not been executed simply because of a failure of the instruction input device.

According to the fifth aspect, the operator can check whether or not the instruction can be received, simply by looking at the indicator of the instruction input device. Thus, the operator is able to identify whether the drive mechanism will not execute the instruction on the basis of the execution state, or the instruction has not been executed simply because of a failure of the instruction input device.

According to a sixth aspect of the present disclosure, the following robot system is provided.

The robot system according to the fifth aspect, wherein, if the instruction received by the instruction input device is wirelessly transmitted to the controller, the controller causes the indicator to indicate the execution state acquired by the state acquirer.

In one scene where the robot system is utilized, a helper may control the operation of a robot by using the instruction input device at a remote place from a patient. In such a scene, an instruction received by the instruction input device is wirelessly transmitted to the controller disposed within the robot.

If the helper remotely controls the operation of the robot by using the instruction input device, it is in most cases difficult for the helper to check the execution state of the drive mechanism which is executing the drive pattern.

According to the sixth aspect, the execution state is indicated on the indicator. With this configuration, even in a case where a helper remotely controls the operation of the robot, the helper can easily check the execution state of the drive mechanism which is executing the drive pattern.

According to a seventh aspect of the present disclosure, the following robot system is provided.

The robot system according to the fifth or sixth aspect, wherein, if the instruction received by the instruction input device is wirelessly transmitted to the controller, the controller causes the indicator to indicate a state of the patient based on the execution state acquired by the state acquirer.

In one scene where the robot system is utilized, a helper may control the operation of a robot by using the instruction input device at a remote place from a patient. In such a scene, an instruction received by the instruction input device is wirelessly transmitted to the controller disposed within the robot.

If the helper remotely controls the operation of the robot by using the instruction input device, it is in most cases difficult for the helper to check the state of the patient, that is, the posture of the patient.

According to the seventh aspect, the state of the patient based on the execution state is indicated on the indicator. With this configuration, even in a case where a helper remotely controls the operation of the robot, the helper can easily check the posture of a patient.

According to an eighth aspect of the present disclosure, the following robot system is provided.

The robot system according to one of the third through fifth aspects, wherein:
the instruction input device includes first and second instruction input devices;
the first instruction input device receives a third instruction that causes the drive mechanism to execute a first instruction received by the first instruction input device with higher priority than a second instruction received by the second instruction input device; and
if the third instruction is received by the first instruction input device, the controller performs control so that the drive mechanism will not execute the second instruction even if the second instruction is received by the second instruction input device.

According to the eighth aspect, priority is given to the helper operating the first instruction input device over the patient operating the second instruction input device. With this configuration, an inadvertent operation of the patient can be prevented.

According to a ninth aspect of the present disclosure, the following robot system is provided.

The robot system according to the eighth aspect, wherein:

the second instruction input device receives a fourth instruction to stop the drive pattern executed by the drive mechanism; and if the fourth instruction is received by the second instruction input device, the controller performs control so that the drive mechanism will not execute the third instruction even if the third instruction is received by the first instruction input device.

The instruction input device may be constituted by two instruction input devices, that is, an instruction input device for a patient and an instruction input device for a helper. Accordingly, different instructions may be received from the two instruction input devices. In this case, either one of the instructions input from the instruction input devices has to be executed with higher priority over the other instruction, in which case, it is desirable to select in advance to which one of the instruction input devices priority is given. On the other hand, however, if an instruction from the selected one of the instruction input devices is always executed with higher priority, it may not be convenient for assisting a patient. For example, if an instruction input from the instruction input device for a helper is executed with higher priority, a patient is unable to stop a drive pattern executed by the drive mechanism even if the patient wishes to do so for some reason. As a result, the robot assists the patient even if the patient does not wish, which makes the patient uncomfortable.

According to the ninth aspect, if an instruction to stop a drive pattern executed by the drive mechanism is received from the instruction input device which would not normally be executed with higher priority, the controller performs control so that the drive mechanism will not execute an instruction input from the instruction input device which would normally be executed with higher priority. With this configuration, the drive mechanism is prevented from assisting the patient if the patient does not wish, which would otherwise make the patient feel uncomfortable.

According to a tenth aspect of the present disclosure, the following robot system is provided.

The robot system according to the eighth or ninth aspect, wherein:

the first and second instruction input devices include first and second indicators, respectively; and while the drive mechanism is executing the drive pattern, the controller causes each of the first and second indicators to indicate which one of the first and second instruction input devices has provided an instruction to execute the drive pattern.

If the instruction input device is constituted by two instruction input devices, that is, an instruction input device for a patient and an instruction input device for a helper, it is difficult for the patient and the helper to identify which one of the instruction input devices has provided an instruction to execute a drive pattern which is being executed by the drive mechanism.

According to the tenth aspect, while a drive pattern is being executed, the controller performs control so that each of the two instruction input devices will indicate which one of the instruction input devices has provided an instruction to execute this drive pattern. Then, the helper and the patient can identify which one of the instruction input devices has provided an instruction to execute this drive pattern.

According to an eleventh aspect of the present disclosure, the following instruction input device is provided.

An instruction input device used in a robot system, the robot system including a state acquirer that acquires an execution state of a drive mechanism which is executing a drive pattern, the drive pattern being executed for assisting a patient in moving, and a controller that decides whether or not to cause the drive mechanism to execute an instruction to cause the drive mechanism to execute the drive pattern, on the basis of the execution state acquired by the state acquirer, and controls driving of the drive mechanism, the instruction input device receiving the instruction to cause the drive mechanism to execute the drive pattern, the instruction input device including an indicator that indicates whether or not it is possible to receive the instruction to cause the drive mechanism to execute the drive pattern.

According to the eleventh aspect, the drive mechanism does not perform any operation that a patient does not wish to receive, which would otherwise make the patient feel uncomfortable. Additionally, when the emergency stop button is pressed, the controller performs control so that the drive mechanism will be shifted to the connecting position. With this configuration, when the patient wishes to use the pulling mechanism, the pulling mechanism can start pulling the holding mechanism immediately without the patient having to adjust the position of the pulling mechanism to the connecting position.

According to a twelfth aspect of the present disclosure, the following instruction input device is provided.

The instruction input device according to the eleventh aspect, wherein, if the instruction received by the instruction input device is wirelessly transmitted to the controller, the indicator indicates a state of the patient based on the execution state acquired by the state acquirer.

According to a thirteenth aspect of the present disclosure, the following non-transitory computer-readable recording medium is provided.

A non-transitory computer-readable recording medium storing a program to be executed by a computer of a robot system, the robot system including a drive mechanism that executes a drive pattern for assisting a patient in moving, an instruction input device that receives an instruction to cause the drive mechanism to execute the drive pattern, a state acquirer that acquires an execution state of the drive mechanism which is executing the drive pattern, and a controller that decides whether or not to cause the drive mechanism to execute the instruction received by the instruction input device, on the basis of the execution state acquired by the state acquirer, and controls driving of the drive mechanism, the program causing the controller to execute:

controlling the drive mechanism based on the instruction if the controller has decided that the drive mechanism will execute the instruction received by the instruction input device, and not controlling the drive mechanism based on the instruction if the controller has decided that the drive mechanism will not execute the instruction received by the instruction input device.

According to a fourteenth aspect of the present disclosure, the following control method is provided.

A control method for a robot system, the robot system including a drive mechanism that executes a drive pattern for assisting a patient in moving, an instruction input device that receives an instruction to cause the drive mechanism to execute the drive pattern, a state acquirer that acquires an execution state of the drive mechanism which is executing the drive pattern, and a controller that decides whether or not to cause the drive mechanism to execute the instruction received by the instruction input device, on the basis of the execution state acquired by the state acquirer, and controls driving of the drive mechanism, the program causing the controller to execute:

controlling the drive mechanism based on the instruction if the controller has decided that the drive mechanism will execute the instruction received by the instruction input device, and not controlling the drive mechanism based on the instruction if the controller has decided that the drive mechanism will not execute the instruction received by the instruction input device.

A sit-to-stand and/or stand-to-sit assist system according to the embodiments of the present disclosure will be described below in detail.

First Embodiment

Figure 1B:
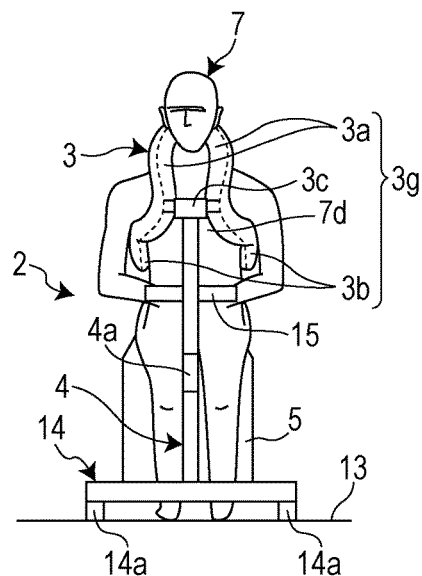
FIG. 1B is a front view illustrating an example of the overall configuration of the robot system according to the first embodiment, together with the patient in a sitting posture.
Figure 1C:
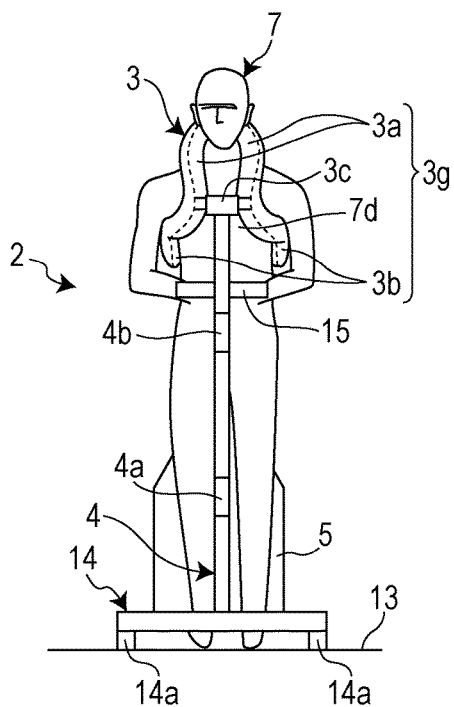
FIG. 1C is a front view illustrating an example of the overall configuration of the robot system according to the first embodiment, together with the patient in a standing posture.
Figure 2:
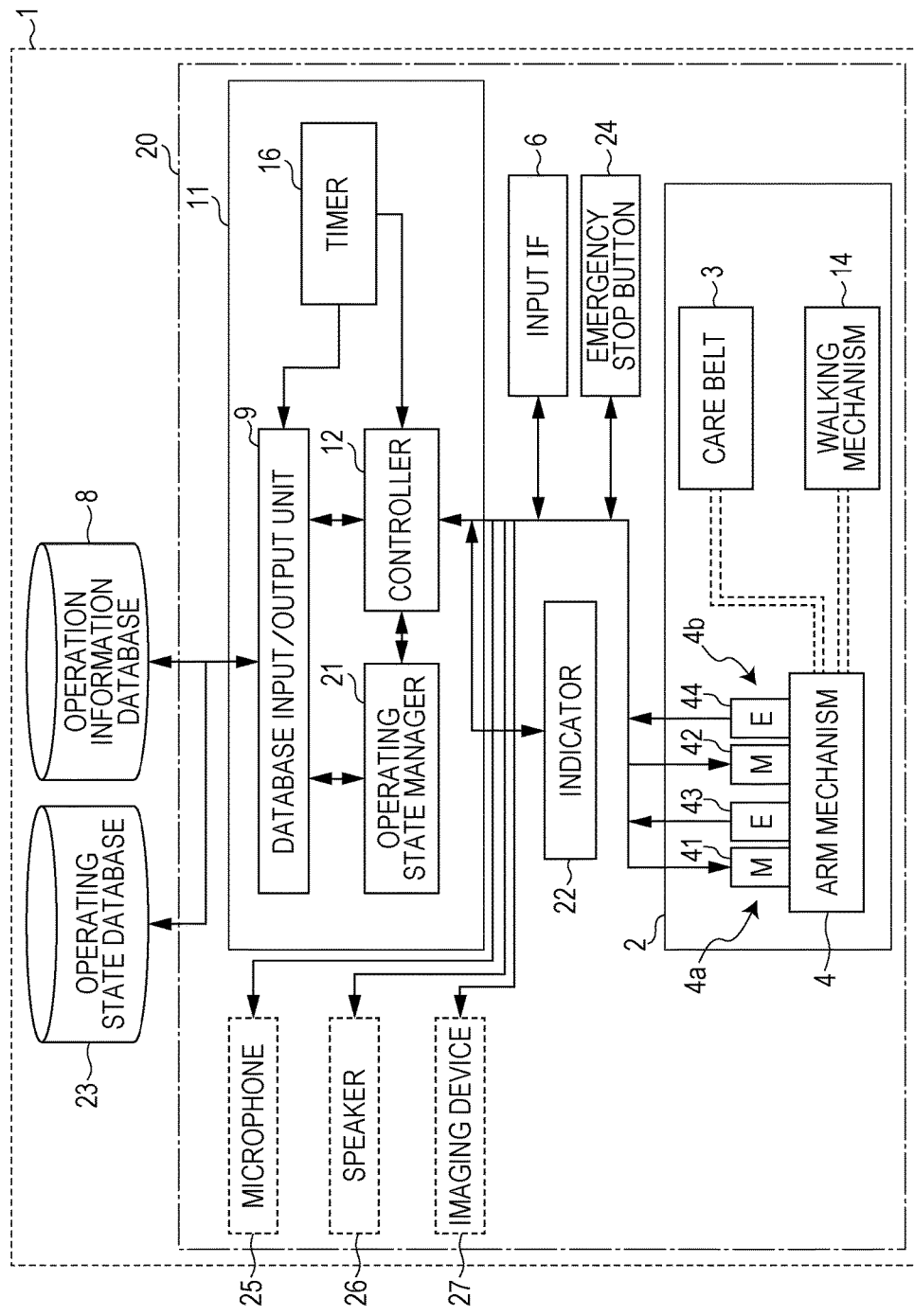
FIG. 2 is a block diagram illustrating an example of the detailed configuration of the robot system according to the first embodiment.
Figure 3A:
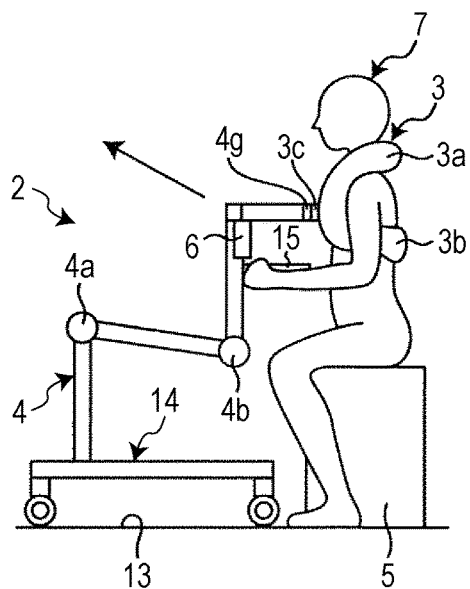
FIGS. 3A through 3C are side views schematically illustrating an example of a first drive pattern in a stand operation of the robot system according to the first embodiment.
Figure 3B:
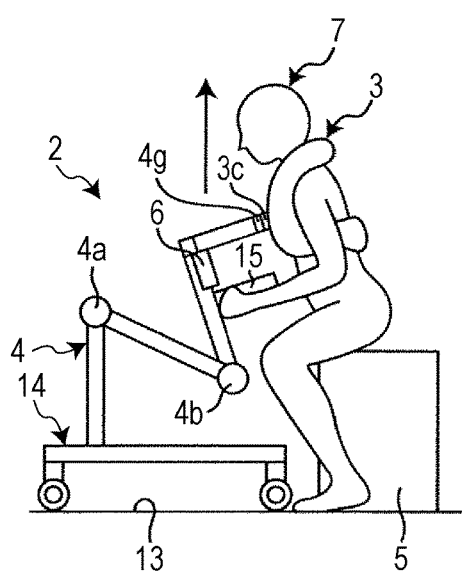
Figure 3C:
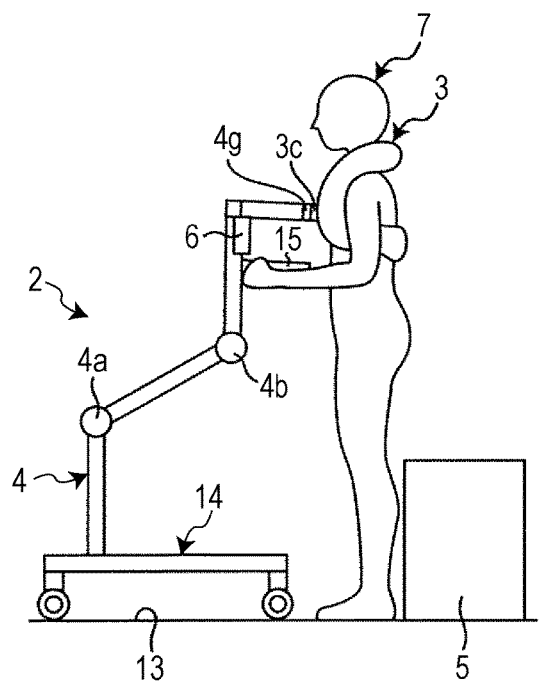
Figure 4A:
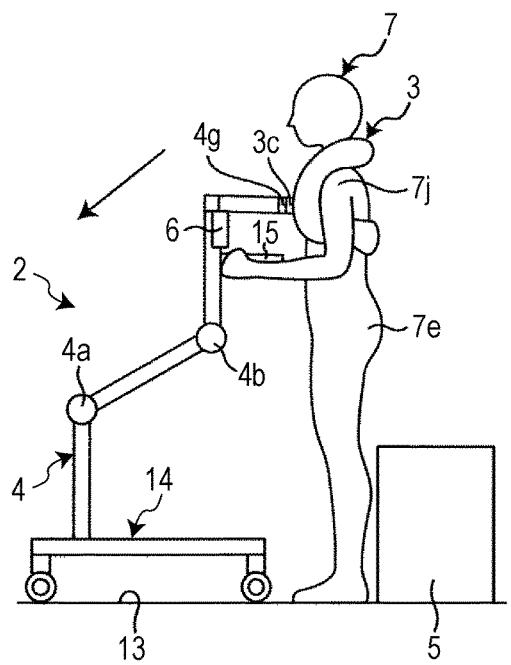
FIGS. 4A through 4C are side views schematically illustrating an example of a second drive pattern in a sit operation of the robot system according to the first embodiment.
Figure 4B:
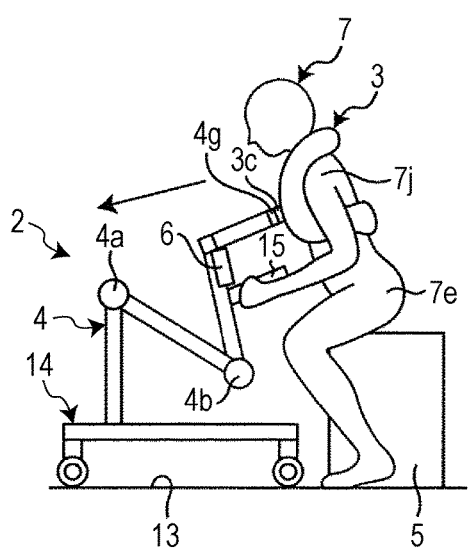
Figure 4C:
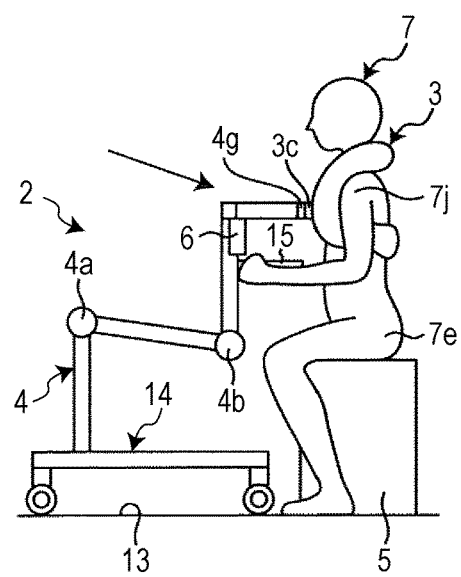

FIGS. 1A and 1B illustrate an example of a movement assist system (for example, a sit-to-stand and/or stand-to-sit assist apparatus) according to a first embodiment of the present disclosure. FIGS. 1A and 1B illustrate a robot system 1, which is an example of the movement assist system. More specifically, FIGS. 1A and 1B are a side view and a front view, respectively, illustrating a robot 20 when a patient 7 is sitting. The robot 20 assists the patient 7 in standing from a sitting posture and/or in sitting from a standing posture. The patient 7 is sitting on a seat 5 placed on a floor 13 (such a posture will also be referred to as a "sitting posture"). FIG. 1C is a front view of the robot system 1 in which the patient 7 is in a standing posture. FIG. 2 is a block diagram illustrating an example of the detailed configuration of the robot system 1 according to the first embodiment. FIGS. 3A through 3C schematically illustrate an example of a first drive pattern when the robot system 1 assists the patient 7 in standing up (an example of a first movement) according to the first embodiment. FIGS. 4A through 4C schematically illustrate an example of a second drive pattern when the robot system 1 assists the patient 7 in sitting down (an example of a second movement) according to the first embodiment.

The robot system 1 shown in FIGS. 1A through 2 is an example of a sit-to-stand and/or stand-to-sit assist system for assisting the patient 7 in standing up and/or sitting down. The robot system 1 includes the robot 20. The robot system 1 shown in FIG. 2 includes an operation information database 8 and an operating state database 23 outside the robot 20. Alternatively, the robot 20 may include the operation information database 8 and the operating state database 23 therein. In this example, the patient 7 means a user assisted by the movement assist system.

The robot 20 is placed on the floor 13. The robot 20 includes a main body mechanism 2, which is an example of a drive mechanism, a control device 11, an input interface (IF) 6, which is an example of an instruction input device, an operating state manager 21, which is an example of a state acquirer, and a controller 12.

The main body mechanism 2 includes an arm mechanism 4, a care belt 3, which is an example of a holding mechanism, and a walking mechanism 14. The main body mechanism 2 may not necessarily include the walking mechanism 14. The arm mechanism 4 at least includes a robot arm, which is an example of a pulling mechanism.

The control device 11 includes a database input/output unit 9, the operating state manager 21, a timer 16, and the controller 12.

(Care Belt 3)

As shown in FIGS. 1A through 1C, the care belt 3 may be fit on the patient 7 and also holds the patient 7. The care belt 3 includes first and second holding portions 3a and 3b and a connecting portion 3c. The care belt 3 is attachable to and removable from the robot arm via the connecting portion 3c.

A holding mechanism 3g includes at least the first and second holding portions 3a and 3b.

The first holding portion 3a is capable of holding a neck 7a and/or a back 7b of the patient 7.

The second holding portion 3b is capable of holding a waist 7c of the patient 7.

When the holding mechanism 3g is fit on the patient 7, the connecting portion 3c is positioned on a chest 7d of the patient 7, and connects the first and second holding portions 3a and 3b at the front of the patient 7. The connecting portion 3c is connected to the holding mechanism 3g and is attachable to and removable from an end (for example, the rear end) of the arm mechanism 4, which will be discussed later.

The connecting portion 3c is connected to an end of the arm mechanism 4, as shown in FIGS. 1A through 1C. The connecting portion 3c is located substantially at the center of the chest 7d of the patient 7 and substantially between the first and second holding portions 3a and 3b. The connecting portion 3c is disposed such that it stretches between portions where the ends of the first holding portion 3a and the ends of the second holding portion 3b are connected to each other. The connecting portion 3c is screwed to the end of the arm mechanism 4. Alternatively, the connecting portion 3c may be connected to the end of the arm mechanism 4 by using a known medium. The connecting portion 3c desirably has low elasticity than the first and second holding portions 3a and 3b. This makes it possible to prevent the connecting portion 3c from extending when the care belt 3 is pulled by the arm mechanism 4, so that an external force from the arm mechanism 4 can reliably be transmitted to the holding mechanism 3g. The arm mechanism 4 is connected to the connecting portion 3c of the care belt 3, and pulls the care belt 3 so that the care belt 3 can move along a drive pattern and executes it.

(Walking Mechanism 14)

The walking mechanism 14 includes a rectangular table 14e, a pair of front wheels 14a, a pair of rear wheels 14b, front-wheel brakes 14c, and rear-wheel brakes 14d. The walking mechanism 14 is placed on the floor 13. The pair of front wheels 14a is rotatably provided at a pair of corners of the front end of the rectangular table 14e. The pair of rear wheels 14b is rotatably provided at a pair of corners of the rear end of the rectangular table 14e. The front-wheel brakes 14c are used for applying the brakes to the front wheels 14a. The rear-wheel brakes 14d are used for applying the brakes to the rear wheels 14b. The arm mechanism 4 is located on the top of the walking mechanism 14. That is, the arm mechanism 4 is supported by the rectangular table 14e so that it can stand erect on substantially the center of the front portion of the rectangular table 14e. In the state in FIG. 3C, the pair of front wheels 14a and the pair of rear wheels 14b are rotated as a result of the patient 7 applying force to the arm mechanism 4 in the forward direction (for example, to the left side in FIG. 3C). In this manner, the walking mechanism 14 can assist the patient 7 in walking as a walker. In this example, the pair of front wheels 14a and the pair of rear wheels 14b are rotated as a result of the patient 7 pressing the arm mechanism 4. However, a motor may be provided in one of or both of the pair of front wheels 14a and the pair of rear wheels 14b so as to enhance the force applied by the patient 7, thereby enabling the patient 7 to walk easily. The front-wheel brakes 14c and the rear-wheel brakes 14d may be turned ON/OFF manually or by using an electric signal, such as that used in electromagnetic brakes (not shown). By turning ON the front-wheel brakes 14c or the rear-wheel brakes 14d, the brakes can be applied to the corresponding one of the front wheels 14a and the rear wheels 14b. Conversely, by turning OFF the front-wheel brakes 14c or the rear-wheel brakes 14d, the brakes applied to the corresponding one of the pair of front wheels 14a and the pair of rear wheels 14b can be canceled. In this example, the pair of front wheels 14a and the pair of rear wheels 14b are provided. However, the number and the size of wheels are not restricted to those shown in the drawings. For example, another wheel may be added at the center of the rectangular table 14e.

(Arm Mechanism 4)

The arm mechanism 4 is located on the top of the walking mechanism 14, and the forward end of the arm mechanism 4 is connected to the holding mechanism 3g via the connecting portion 3c. Under the control of the controller 12, the arm mechanism 4 executes a drive pattern for assisting the patient 7 in standing and/or sitting. The arm mechanism 4 is, for example, a robot arm of two degrees of freedom that includes a first motor 41, a first encoder 43 for detecting the speed (for example, the angle of rotation) of a shaft of the first motor 41, a second motor 42, and a second encoder 44 for detecting the speed (for example, the angle of rotation) of a shaft of the second motor 42. Based on position information concerning the position of the arm mechanism 4 converted from information concerning the angles of rotation detected by the first and second encoders 43 and 44, the controller 12 of the control device 11 controls the first and second motors 41 and 42, thereby causing the arm mechanism 4 to execute a drive pattern for assisting the patient 7 in standing or sitting. As an example of the drive pattern, in order to assist the patient 7 in a sitting posture in lifting buttocks 7e of the patient 7 from the seat 5, the robot system 1 is driven to cause the arm mechanism 4 to perform the following operation under the control of the controller 12. As shown in FIGS. 3A through 3C, the arm mechanism 4 pulls the first and second holding portions 3a and 3b of the holding mechanism 3g at the same time toward the obliquely front side as viewed from the patient 7, and then further pulls the first and second holding portions 3a and 3b upward. As another example of the drive pattern, in order to assist the patient 7 in a standing posture in sitting on the seat 5, the robot system 1 is driven to cause the arm mechanism 4 to perform the following operation under the control of the controller 12. As shown in FIGS. 4A through 4C, the arm mechanism 4 pulls the first and second holding portions 3a and 3b of the holding mechanism 3g at the same time at least toward downward as viewed from the patient 7, and then further pulls the first and second holding portions 3a and 3b downward and slightly toward the front side, and then downward and slightly toward the rear side.

More specifically, the arm mechanism 4 is constituted by a robot arm including first through fourth arms 4c through 4f and first and second driving portions 4a and 4b. The first arm 4c is fixed at the bottom end to the rectangular table 14e at substantially the center of the front portion of the rectangular table 14e such that it stands from the rectangular table 14e upward or sits on the rectangular table 14e downward. The front end of the second arm 4d is rotatably connected to the top end of the first arm 4c via a first joint containing the first driving portion 4a. The rear end of the second arm 4d is rotatably connected to the bottom end of the third arm 4e via a second joint containing the second driving portion 4b. The top end of the third arm 4e is fixed to the front end of the fourth arm 4f so that the third and fourth arms 4e and 4f can bend to form the shape of an L while the axial directions of the third and fourth arms 4e and 4f are crossing each other at right angles. A connecting portion 4g is connected to the rear end of the fourth arm 4f. The connecting portion 4g is removably connected to the connecting portion 3c of the care belt 3.

The first driving portion 4a is provided at the joint between the first and second arms 4c and 4d, and is constituted by, for example, the first motor 41 and the first encoder 43. The first motor 41 causes the second arm 4d to rotate with respect to the first arm 4c, and the first encoder 43 detects the angle of rotation of the second arm 4d. Accordingly, under the control of the controller 12, which will be discussed later, the first driving portion 4a drives the second arm 4d to rotate with respect to the first arm 4c by a predetermined angle. The second driving portion 4b is provided at the joint between the second and third arms 4d and 4e, and is constituted by, for example, the second motor 42 and the second encoder 44. The second motor 42 causes the third arm 4e to rotate with respect to the second arm 4d, and the second encoder 44 detects the angle of rotation of the third arm 4e. Information concerning the angles of rotation detected by the first and second encoders 43 and 44 is converted into position information concerning the arm mechanism 4, and the controller 12 uses this position information. Accordingly, under the control of the controller 12, which will be discussed later, the second driving portion 4b drives the third arm 4e to rotate with respect to the second arm 4d by a predetermined angle and to move to a desired position.

A handle 15 protrudes from the intermediate portion of the third arm 4e to the rear side (for example, toward the patient 7). The patient 7 can hold the handle 15 with both hands when standing or sitting. The handle 15 may have a certain length that allows the patient 7 to place the elbows when walking. In this manner, the patient 7 can walk more stably. The fourth arm 4f may also have a shock absorber made of, for example, urethane, at the top. With this configuration, even in a case in which the patient 7 falls down forward and hits the face or the upper body against the fourth arm 4f, shock generated by such an accident may be absorbed by the shock absorber.

(Input IF 6 and Emergency Stop Button 24)

Figure 5:
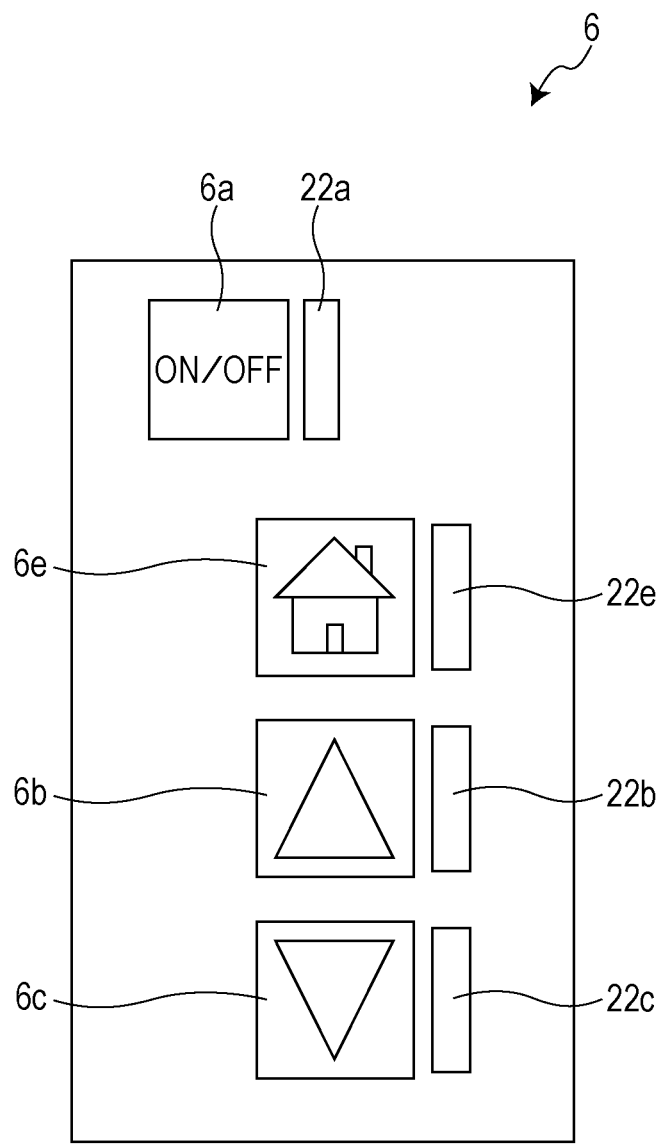
FIG. 5 schematically illustrates an input interface (IF) in the first embodiment.

At the front portion of the fourth arm 4f, the input IF 6, such as a console panel, on which buttons are provided, protrudes downward. The input IF 6 is removably attached to the front portion of the fourth arm 4f. By providing the input IF 6 at this position, the patient 7 in a sitting posture is able to operate the input IF 6 from a side of the arm mechanism 4. The input IF 6 receives input of a stand instruction (for example, a first instruction) to execute the drive pattern for assisting the patient 7 in standing and input of a sit instruction (for example, a second instruction) to execute the drive pattern for assisting the patient 7 in sitting. A specific example of the input IF 6 is shown in FIG. 5. The input IF 6 has an ON/OFF button 6a for powering the robot system 1 ON or OFF (for example, when the button 6a is pressed, the robot system 1 is powered ON, and the when the button 6a is released, the robot system 1 is powered OFF), an up button 6b used for assisting the patient 7 in standing up, a down button 6c used for assisting the patient 7 in sitting down, and an initial position shift button 6e for shifting the arm mechanism 4 to the initial position. The patient 7 can press these buttons to input instructions. The initial position of the arm mechanism 4 is, for example, a position substantially in the front of the patient 7, as shown in FIG. 3A. The input IF 6 is removable from the front portion of the fourth arm 4f and serves as a remote controller. A helper 18 can hold the remote controller (input IF 6) in hand and operate it. The initial position is an example of the connecting position at which the arm mechanism 4 is connectable to the connecting portion 3c of the care belt 3. The initial position shift button 6e serves as an example of a connecting position shift instruction input device. For example, when the patient 7 or the helper 18 presses the initial position shift button 6e, under the control of the controller 12, the arm mechanism 4 is first shifted to the initial position, which is an example of the connecting position, and then, input of an instruction using the input IF 6 (an example of an instruction input device) is received. In other words, under the control of the controller 12, until the arm mechanism 4 reaches the initial position after the occurrence of emergency stop, none of instructions including an up instruction and a down instruction given by pressing the up bottom 6b and the down button 6c are received whatsoever.

An emergency stop button 24 is an example of an emergency stop instruction input device. The emergency stop button 24 is provided on the fourth arm 4f (for example, at the front end of the fourth arm 4f) of the arm mechanism 4, as shown in FIG. 1A. The patient 7 can press the emergency stop button 24 when wishing to stop the operation of the robot system 1. Under the control of the controller 12, the emergency stop button 24 receives input of an instruction to stop the operation of the arm mechanism 4 and to maintain the state of the arm mechanism 4 when it has stopped operating. This instruction will also be called an emergency stop instruction. More specifically, when the emergency stop button 24 is pressed, the robot system 1 enters the emergency stop state, and the emergency stop button 24 remains ON (remains being pressed). In the emergency stop state, if the emergency stop button 24 which remains being pressed is rotated, it is turned OFF, so that the emergency stop state can be canceled. After the emergency stop state obtained by pressing the emergency stop button 24 is canceled, under the control of the controller 12, the arm mechanism 4 shifts to the initial position (connecting position) at which it is connected to the connecting portion 3c of the care belt 3, and then, input of an instruction using the input IF 6 can be received. In this example, the emergency stop button 24 is provided on the arm mechanism 4. However, the emergency stop button 24 may be provided on the input IF 6 or may be provided on each of the arm mechanism 4 and the input IF 6.

(Indicators 22)

The indicators 22 indicate, under the control of the controller 12, whether or not input of instructions from the input IF 6 and the emergency stop button 24 can be received. For example, in the input IF 6 shown in FIG. 5, an ON/OFF button lamp 22a, an up button lamp 22b, a down button lamp 22c, and an initial position shift button lamp 22e are provided next to the ON/OFF button 6a, the up button 6b, the down button 6c, and the initial position shift button 6e, respectively, so as to indicate whether or not input of instructions from the corresponding buttons can be received. An emergency stop button lamp 22f is provided next to the emergency stop button 24. Hereinafter, the ON/OFF button 6a, the up button 6b, the down button 6c, and the initial position shift button 6e may be simply referred to as the "buttons 6a, 6b, 6c, and 6e" if it is not necessary to distinguish them from each other, and the ON/OFF button lamp 22a, the up button lamp 22b, the down button lamp 22c, the initial position shift button lamp 22e, and the emergency stop button lamp 22f may be simply referred to as the "lamps 22a, 22b, 22c, 22e, and 22f" if it is not necessary to distinguish them from each other. If it is possible to receive input of instructions from the buttons 6a, 6b, 6c, and 6e and the emergency stop button 24, the lamps 22a, 22b, 22c, 22e, and 22f, respectively, are turned ON. If it is not possible to receive input of instructions from the buttons 6a, 6b, 6c, and 6e and the emergency stop button 24, the lamps 22a, 22b, 22c, 22e, and 22f, respectively, are turned OFF. It is determined, under the control of the controller 12, whether or not each of the lamps 22a, 22b, 22c, 22e, and 22f will be turned ON, on the basis of information stored as "indicator information" in the operating state database 23, which will be discussed later. If "indicator information" concerning a certain indicator 22 is 0, a corresponding one of the lamps 22a, 22b, 22c, 22e, and 22f is turned OFF. If "indicator information" concerning a certain indicator 22 is 1, a corresponding one of the lamps 22a, 22b, 22c, 22e, and 22f is turned ON. That is, the controller 12 causes the indicators 22 to indicate whether or not input of instructions from the corresponding buttons 6a, 6b, 6c, and 6e and the emergency stop button 24 can be received, based on a decision result regarding whether or not an instruction input from the input IF6 will be executed by the arm mechanism 4.

In this example, the lamps 22a, 22b, 22c, 22e, and 22f are provided near the buttons 6a, 6b, 6c, and 6e and the emergency stop button 24, respectively, and are turned ON. Alternatively, the buttons 6a, 6b, 6c, and 6e and the emergency stop button 24 themselves may be lit up. Moreover, the indicators 22 may be a medium other than lamps. For example, when the patient 7 presses a certain button from which an instruction can be received, the patient 7 may be informed by sound that an instruction can be received from this button.

(Timer 16)

After the lapse of a predetermined time (for example, one millisecond), the timer 16 outputs an execution command to run the database input/output unit 9 and the controller 12 to the database input/output unit 9 and the controller 12.

(Database Input/Output Unit 9)

The database input/output unit 9 inputs and outputs data (for example, information) between the operation information database 8, the operating state database 23, the controller 12, and the operating state manager 21.

(Operation Information Database 8)

The controller 12 is run based on an execution command from the timer 16. More specifically, the database input/output unit 9 and the controller 12 are run in response to an execution command from the timer 16 so as to generate position information concerning the arm mechanism 4 at predetermined regular times (for example, every one millisecond). In this case, the position information is generated by converting angle information concerning the angles of rotation detected by the first and second encoders 43 and 44. Then, in the first embodiment, plural items of position information generated in this manner are sequentially output, together with the times, to the operation information database 8 via the database input/output unit 9, and are stored in the operation information database 8 as operation information. In the first embodiment, the operation information is generated by using the input IF 6 and is stored in the operation information database 8 in advance.

FIG. 6 illustrates an example of the content of operation information stored in the operation information database 8.

(1) In the field of "time", information concerning the time at which the arm mechanism 4 is being operated is indicated. The time is expressed by milliseconds (msec).

(2) In the field of "position", position information concerning the arm mechanism 4 converted from angle information concerning the angles of rotation detected by the first and second encoders 43 and 44 of the arm mechanism 4 is indicated. The position information will be explained below more specifically. As shown in FIG. 1A, one end of the arm mechanism 4 (for example, the bottom end of the first arm 4c shown in FIG. 1A) is set as the origin O. The position information is represented by relative coordinates from the origin O on two axes, that is, on the x axis and the z axis. The direction opposite to the traveling direction of the robot system 1 is taken as the positive side of the x axis, while the upward direction is taken as the positive side of the z axis. The position is expressed by meters (m).

Figure 8A:
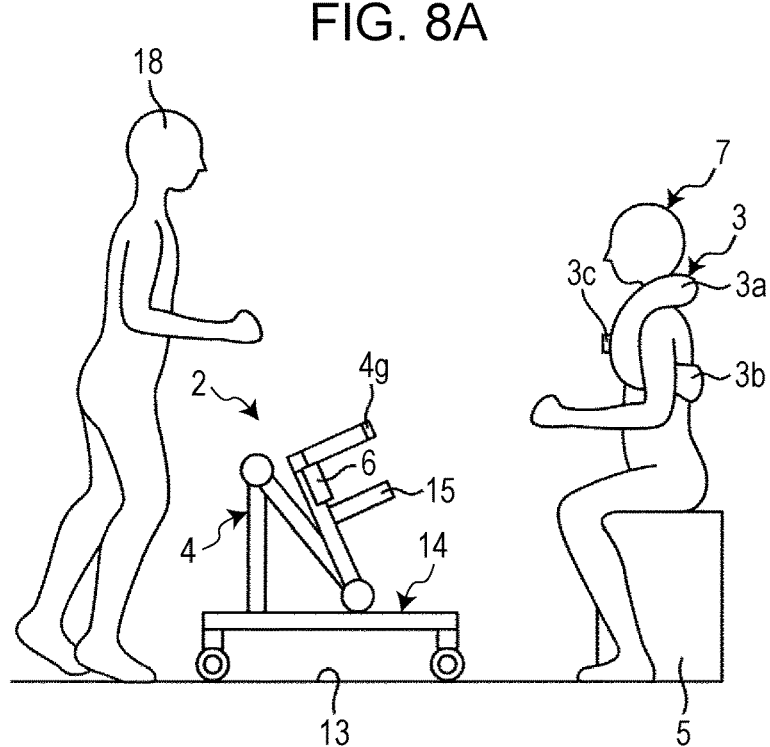
FIGS. 8A through 8D illustrate operations of the robot system according to the first embodiment.
Figure 8B:
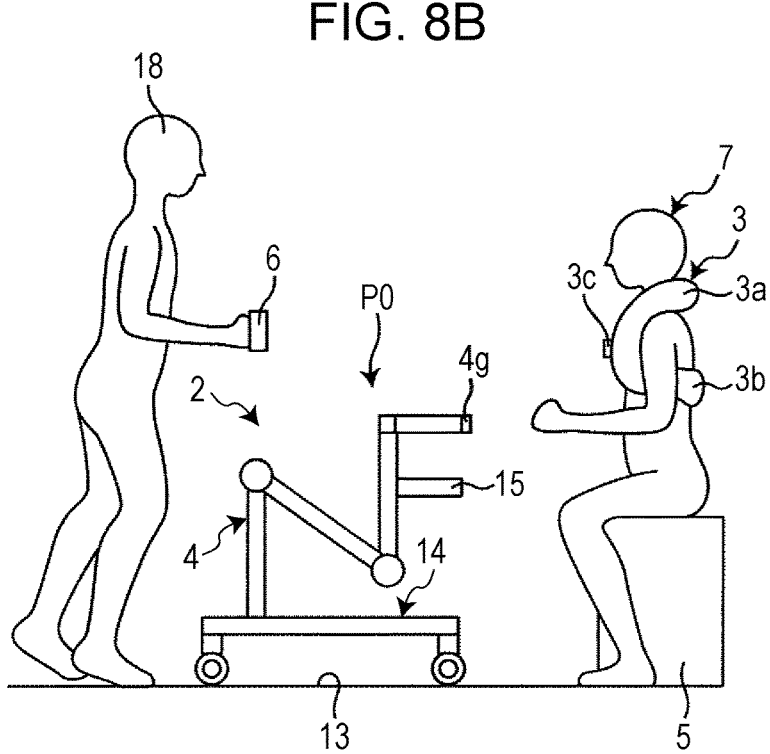

(3) In the field of "initial position flag", a flag for indicating the coordinates at the initial position of the arm mechanism 4 is stored. The arm mechanism 4 shifts from the position at which it is collapsed for storage as shown in FIG. 8A to a position at which the arm mechanism 4 starts to shift to the initial position as shown in FIG. 8B. In the initial position flag, "0" or "1" is stored. When the initial position flag is "1", the position corresponding to the time for which "1" is stored is set as the initial position. When the initial position flag is "0", it means that the position corresponding to the time for which "0" is stored is not the initial position.

(4) In the field of "progress information", information concerning the progress of the operation of the robot system 1 is stored by the controller 12. The controller 12 stores "1" in the progress information for a time corresponding to the current (that is, when the control operation is performed) position of the robot system 1. The controller 12 stores "0" in the progress information for a time which does not correspond to the current position of the robot system 1. The controller 12 stores "0" in the progress information for a time at which the robot system 1 has not yet shifted to the initial position. Immediately after the robot system 1 has shifted to the initial position, the controller 12 stores "1" in the progress information corresponding to the time for which "1" is stored in the initial position flag.

(Operating State Database 23)

Based on an instruction input from the input IF 6 or the emergency stop button 24, the operating state manager 21 decides the operating state of the robot system 1 and stores it in the operating state database 23 via the database input/output unit 9.

FIG. 11 illustrates an example of the content of the operating state database 23.

(1) In the field of "state ID", the operating state of the arm mechanism 4 is indicated by one of ID numbers S1 through S8.

(2) In the field of "input IF receive/reject information", information concerning whether or not input of an instruction from each button of the input IF 6 and the emergency stop button 24 will be received is recorded. If input of an instruction is received, "1" is recorded. If input of an instruction is not received, "0" is recorded. For example, input IF receive/reject information concerning each button of the ON/OFF button 6a, the initial position shift button 6e, the up button 6b, the down button 6c, and the emergency stop button 24 is recorded by using delimiters, such as (1,1,0,0,1).

(3) In the field of "indicator information", information for indicating the input receive/reject state concerning each button of the input IF 6 and the emergency stop button 24 is recorded. If the information is indicated, "1" is recorded. If the information is not indicated, "0" is recorded. For example, the indicator information concerning the input receive/reject state of each of the ON/OFF button 6a, the initial position shift button 6e, the up button 6b, the down button 6c, and the emergency stop button 24 is recorded by using delimiters, such as (1,1,0,0,1). For a button for which the indicator information is "1", the corresponding one of the ON/OFF button lamp 22a, the up button lamp 22b, the down button lamp 22c, the initial position shift button lamp 22e, and the emergency stop button lamp 22f is turned ON. For a button for which the indicator information is "0", the corresponding one of the ON/OFF button lamp 22a, the up button lamp 22b, the down button lamp 22c, the initial position shift button lamp 22e, and the emergency stop button lamp 22f is turned OFF.

(4) In the field of "progress information", information concerning the progress of the current (that is, when the control operation is performed) state is stored. For the current state, "1" is recorded, and for the other states, "0" is recorded.

(Operating State Manager 21 and Controller 12)

The controller 12 decides, based on the operating state acquired by the operating state manager 21, whether or not an instruction input and received by the input IF 6 will be executed by the arm mechanism 4, and controls the arm mechanism 4 in accordance with the decision result. More specifically, the controller 12 controls the arm mechanism 4, based on an instruction or a command input from the input IF 6 or the timer 16 or information concerning the operating state acquired by the operating state manager 21. The controller 12 also controls the operation of the operating state manager 21 and the indicators 22. If the controller 12 receives input of an instruction to sit down from the input IF 6 when the operating state acquired by the operating state manager 21 indicates that the arm mechanism 4 is executing the drive pattern for standing up, the controller 12 controls the arm mechanism 4 so that the arm mechanism 4 will not execute the drive pattern for sitting down. Conversely, if the controller 12 receives input of an instruction to stand up from the input IF 6 when the operating state acquired by the operating state manager 21 indicates that the arm mechanism 4 is executing the drive pattern for sitting down, the controller 12 controls the arm mechanism 4 so that the arm mechanism 4 will not execute the drive pattern for standing up. If an emergency stop instruction is received, until predetermined conditions are satisfied, the controller 12 does not allow the drive mechanism (for example, the main body mechanism 2) to execute an instruction received by the instruction input device (for example, the input IF 6). In other words, after the emergency stop instruction has been canceled, until the drive mechanism reaches the connecting position at which the drive mechanism is connected to a user (for example, the patient 7), the controller 12 does not allow the drive mechanism to execute an instruction received by the instruction input device. In this case, the predetermined conditions are (a) the emergency stop instruction is canceled and (b) the drive mechanism is shifted to the connecting position at which the drive mechanism is connected to a user (patient). Even if the predetermined conditions are not satisfied, the controller 12 may receive a power ON/OFF instruction or an emergency stop instruction. That is, the controller 12 does not allow the drive mechanism at least to execute an instruction to execute a drive pattern unless the predetermined conditions are satisfied.

Figure 12:
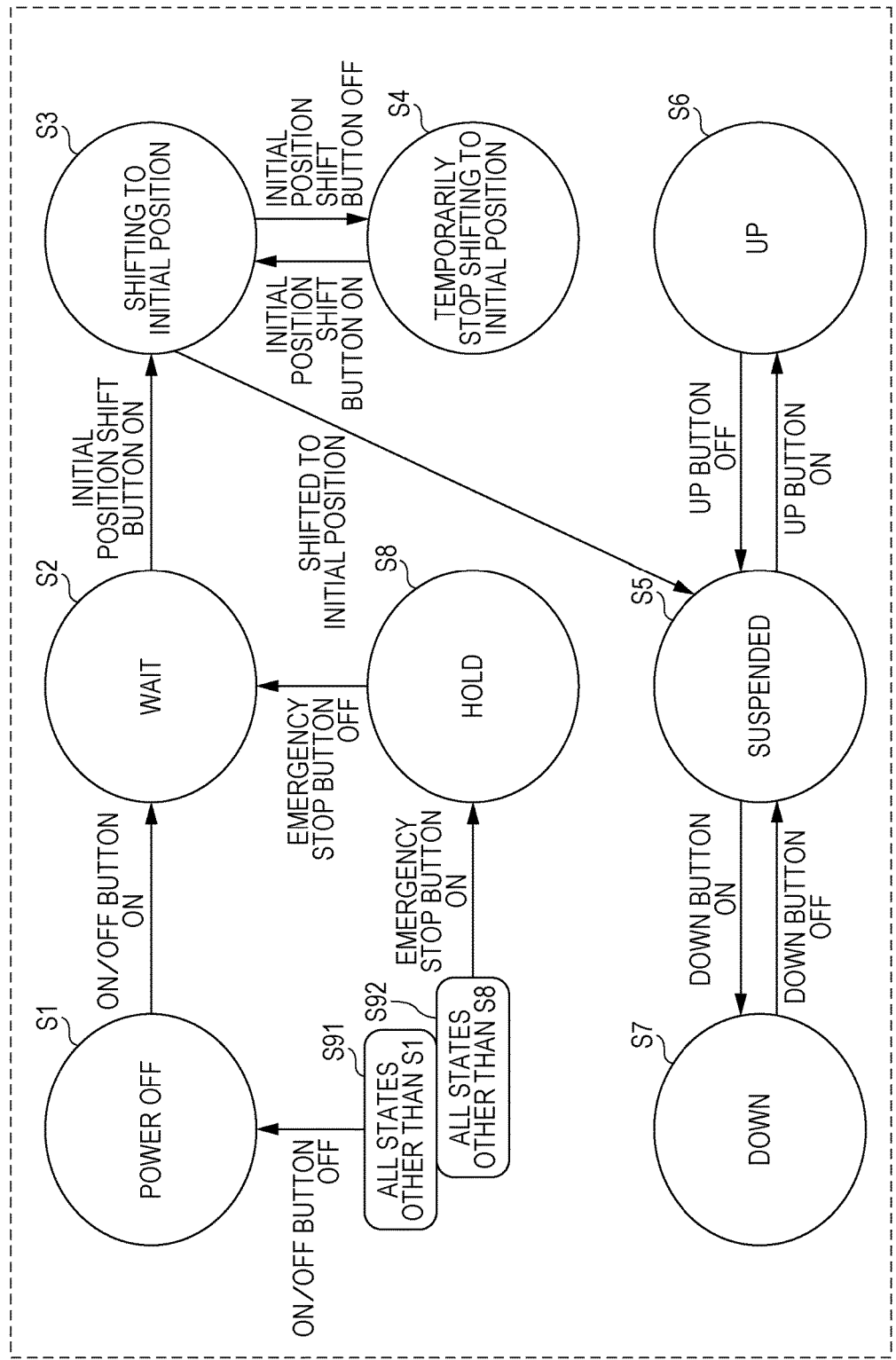
FIG. 12 is a diagram illustrating the transition of the state of a controller in the first embodiment.

The operating state manager 21 acquires the execution state (for example, the operating state) of a drive pattern executed by the arm mechanism 4. More specifically, the operating state manager 21 decides the operating state of the arm mechanism 4 based on an instruction from the input IF 6 or the emergency stop button 24, and stores the decided operating state in the operating state database 23 and informs the controller 12 of the operating state via the database input/output unit 9. An example of the state transition diagram of the robot system 1 is shown in FIG. 12.

Decision of the operating state and the control operation for the robot system 1 performed by the operating state manager 21 and the controller 12, and the resulting operation of the helper 18 and the patient 7 will be described below with reference to FIGS. 7 through 10C, and 12 through 14E.

Figure 7:
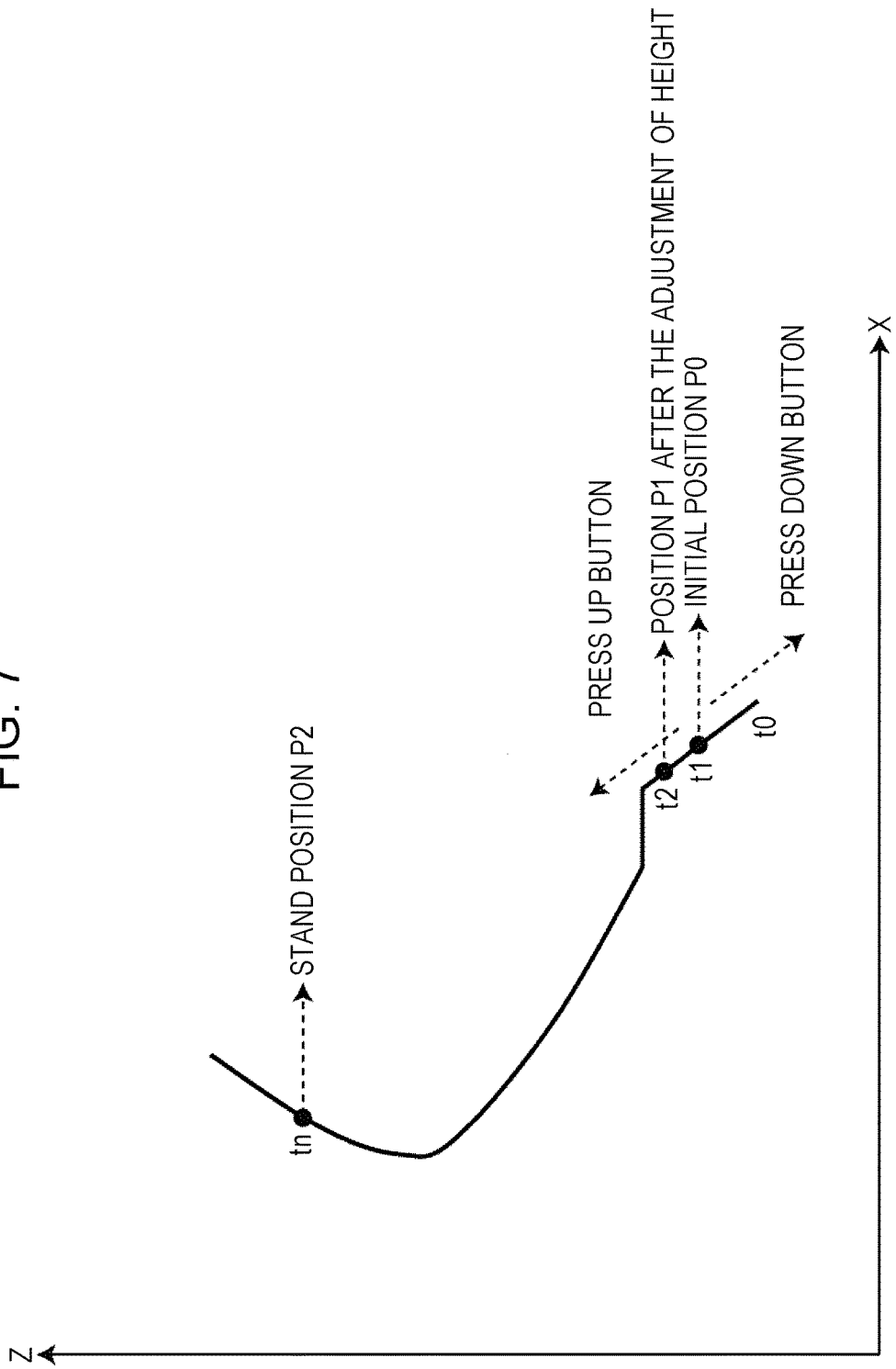
FIG. 7 is a graph illustrating operation information in the first embodiment.

FIG. 7 is a plot graph indicating the positions of the arm mechanism 4 on the x axis and the z axis stored in the operation information database 8. The horizontal axis indicates the x axis, and the vertical axis indicates the z axis.

As shown in FIG. 8A, the patient 7 sits on the seat 5 such as a bed placed on the floor 13. Alternatively, the patient 7 stands on the floor 13 near the seat 5. Then, the helper 18 brings the robot system 1 to the front side of the patient 7. In this case, the arm mechanism 4 is in a collapsed state for storage. The helper 18 then turns ON the front-wheel brakes 14c and the rear-wheel brakes 14d of the walking mechanism 14 by using a brake button 6d of the input IF 6 so as to apply the brakes to the front wheels 14a and the rear wheels 14b.

Figure 14A:
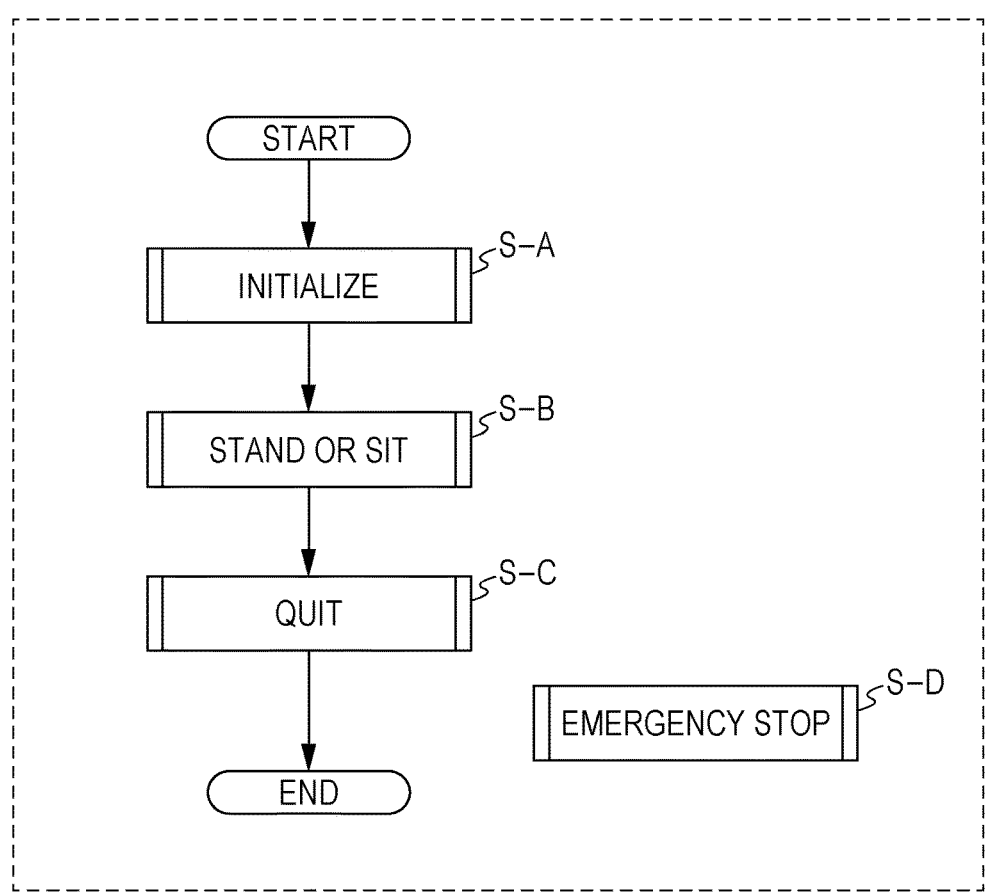
FIG. 14A is a flowchart illustrating the overall operation of the robot system according to the first embodiment.

Thereafter, as indicated by the flowchart of the overall operation in FIG. 14A, an initializing operation S-A (see FIG. 14B), a stand or sit operation S-B (see FIG. 14C), and a quit operation S-C (see FIG. 14E) are sequentially performed. There is also an emergency stop operation S-D (see FIG. 14D) in addition to the initializing operation S-A, the stand or sit operation S-B, and the quit operation S-C.

In the initializing operation S-A (see FIG. 14B), the ON/OFF button 6a of the input IF 6 is pressed so that the state S1 will shift to the state S2 (see FIG. 12), and then, the initial position shift button 6e is pressed so that the state S2 will shift to the state S3 (see FIG. 12). In the initializing operation S-A, the arm mechanism 4 which is in a collapsed state for storage shifts to the initial position at which the arm mechanism 4 and the connecting portion 3c of the care belt 3 are connected to each other.

The quit operation S-C (see FIG. 14E) is executed to quit the use of the robot 20. After the connecting portion 3c of the care belt 3 and the connecting portion 4g of the arm mechanism 4 are disconnected from each other, power is turned OFF.

(State S1)

As shown in FIG. 8A, the patient 7 sits on the seat 5 such as a bed placed on the floor 13. Then, the helper 18 brings the robot system 1 in which the arm mechanism 4 is in a collapsed state for storage to the front side of the patient 7.

In this state, since the power of the robot 20 is OFF, the operating state manager 21 decides that the operating state of the robot system 1 is the state S1 (power OFF) shown in FIG. 12. In the state S1, the input IF receive/reject information concerning the state ID S1 in the operating state database 23 is (1,0,0,0,1). Accordingly, input of an instruction from the ON/OFF button 6a or the emergency stop button 24 will be received, while input of an instruction from the initial position shift button 6e, the up button 6b, or the down button 6c will not be received. The operating state manager 21 supplies the above-described input IF receive/reject information to the controller 12, so that the controller 12 can perform control regarding whether or not to receive input from the input IF 6. In other words, the controller 12 decides whether or not an instruction input from the input IF 6 will be executed by the arm mechanism 4, and controls the driving of the arm mechanism 4 based on the decision result. More specifically, if the input IF receive/reject information concerning a certain button of the input IF 6 is "1", the controller 12 receives input from this button. If the input IF receive/reject information concerning a certain button of the input IF 6 is "0", the controller 12 does not receive input from this button. If an instruction or a command that can be received by the controller 12 is input, the operating state manager 21 manages the operating state of the robot system 1 so that the robot system 1 will shift to a corresponding state, based on the command or the instruction input from the input IF 6. The controller 12 does not perform any control concerning an instruction which is not possible to receive.

The indicator information concerning the state ID S1 in the operating state database 23 is (0,0,0,0,0). Accordingly, the operating state manager 21 informs the indicators 22 via the controller 12 that the lamps 22a, 22e, 22b, and 22c of all the indicators 22 of the input IF 6 shown in FIG. 5 will be turned OFF. As a result of receiving this information from the controller 12, the ON/OFF button lamp 22a, the initial position shift button lamp 22e, the up button lamp 22b, and the down button lamp 22c are turned OFF, as indicated in the state S1 in FIG. 13.

(State S1→State S2)

Then, as shown in FIGS. 8B and 14B, the helper 18 or the patient 7 presses the ON/OFF button 6a of the input IF 6 of the robot 20 (step S101).

When the ON/OFF button 6a of the input IF 6 has been pressed, the operating state manager 21 receives information via the controller 12 that the ON/OFF button 6a has been pressed, and manages the operating state of the robot system 1 so that the state S1 will shift to a subsequent state. More specifically, the operating state manager 21 manages the operating state of the robot system 1 so that the state S1 will shift to the state S2 (wait state) (step S102). In accordance with this transition of the state, the controller 12 updates the operating state in the operating state database 23 via the database input/output unit 9. More specifically, the controller 12 sets the progress information concerning the state ID S2 in the operating state database 23 to be "1", and sets the progress information concerning the other state IDs to be "0". The input IF receive/reject information concerning the state ID S2 in the operating state database 23 is (1,1,0,0,1). Accordingly, input from the ON/OFF button 6a, the initial position shift button 6e, and the emergency stop button 24 will be received by the controller 12, while input from the up button 6b and the down button 6c will not be received by the controller 12. The state in which input will not be received includes a state in which the controller 12 receives input from the input IF 6, but it does not control the operation of the arm mechanism 4 based on the received input. The operating state manager 21 supplies the above-described input IF receive/reject information to the controller 12, so that the controller 12 can perform control regarding whether or not to receive input from the input IF 6. More specifically, if one of the ON/OFF button 6a, the initial position shift button 6e, and the emergency stop button 24 is pressed, the controller 12 receives input from the pressed button and performs control (step S103). On the other hand, if the up button 6b or the down button 6c is pressed, the controller 12 does not perform any control without receiving input from the pressed button. The indicator information concerning the state ID S2 in the operating state database 23 is (1,1,0,0,1). Accordingly, the operating state manager 21 supplies this indicator information to the indicators 22 via the controller 12. Then, as indicated in the state S2 in FIG. 13, the ON/OFF button lamp 22a and the initial position shift button lamp 22e are turned ON, while the up button lamp 22b and the down button lamp 22c are turned OFF. This enables the helper 18 or the patient 7 to visually check from which buttons an instruction will be received by the controller 12.

When the controller 12 performs control after receiving input from one of the ON/OFF button 6a, the initial position shift button 6e, and the emergency stop button 24 in step S103, if the ON/OFF button 6a is pressed to turn OFF the robot system 1, the quit operation S-C is performed.

If the emergency stop button 24 is pressed in step S103, the emergency stop operation S-D is performed.

(State S3→State S4 or State S5)

In step S103, as a result of the helper 18 or the patient 7 pressing the initial position shift button 6e of the input IF 6 of the robot 20 in the state in FIG. 8B, the controller 12 controls the driving of the arm mechanism 4 so as to move the arm mechanism 4 to the initial position P0 (step S104). Then, the controller 12 proceeds to step S105.

In this example, the arm mechanism 4 moves only when the helper 18 or the patient 7 presses the initial position shift button 6e, and the arm mechanism 4 stops moving when the helper 18 or the patient 7 releases the initial position shift button 6e. In this manner, the arm mechanism 4 shifts to the initial position P0 shown in FIG. 7. That is, the arm mechanism 4 shifts from the position in FIG. 8A to the position in FIG. 8B. The initial position P0 in FIG. 7 is a position at which "1" is stored in the initial position flag in the operation information database 8. The operating state manager 21 manages the operating state of the robot system 1 so that the state S2 will shift to the state S3 when the helper 18 or the patient 7 presses the initial position shift button 6e. As a result, the arm mechanism 4 of the robot system 1 starts to shift to the initial position P0. The operating state manager 21 also manages the operating state of the robot system 1 so that the state S3 will shift to the state S4 when the helper 18 or the patient 7 releases the initial position shift button 6e. As a result, the arm mechanism 4 temporarily stops moving. As described above, the state S3 is a state in which the arm mechanism 4 starts to shift to the initial position P0, and the state S4 is a state in which the arm mechanism 4 temporarily stops shifting to the initial position P0. The controller 12 controls the driving of each of the first and second motors 41 and 42 separately so that the arm mechanism 4 will shift to the initial position P0. When the helper 18 or the patient 7 presses the initial position shift button 6e again, the operating state manager 21 manages the operating state of the robot system 1 so that the arm mechanism 4 will restart to move and the state S4 will shift to the state S3. The operating state manager 21 also manages the operating state of the robot system 1 so that the state S3 will shift to the state S5 (suspension state) when the arm mechanism 4 reaches the initial position P0. As a result, the robot system 1 temporarily stops operating. That is, in step S105, the controller 12 determines whether or not the arm mechanism 4 has shifted to the initial position P0. If the arm mechanism 4 has shifted to the initial position P0, the operating state manager 21 manages the operating state of the robot system 1 so that the state S3 will shift to the state S5 (suspension state) (step S106). Then, the initializing operation S-A has been completed.

If the controller 12 determines in step S105 that the arm mechanism 4 has not shifted to the initial position P0, it returns to step S103.

In this case, the controller 12 determines whether or not the arm mechanism 4 has shifted to the initial position P0, on the basis of position information concerning the arm mechanism 4 (for example, position information converted from information concerning the angles of rotation detected by the first and second encoders 43 and 44).

If the controller 12 determines that the arm mechanism 4 has shifted to the initial position P0, it outputs a completion signal to the operating state manager 21. This enables the operating state manager 21 to manage the operating state of the robot system 1 so that the state S3 will shift to the state S5. The state S5 is a state in which an up operation and a down operation are suspended. In accordance with the transition of the operating state, the controller 12 updates the operating state database 23 via the database input/output unit 9. More specifically, the controller 12 sets the progress information concerning the state ID of the current state to be "1" and sets the progress information concerning the other state IDs to be "0". In the operating state database 23, the input IF receive/reject information concerning both of the state S3 and the state S4 is (1,1,0,0,1). Accordingly, input from the ON/OFF button 6a, the initial position shift button 6e, and the emergency stop button 24 will be received by the controller 12, while input from the up button 6b and the down button 6c will not be received by the controller 12. The operating state manager 21 supplies the input IF receive/reject information concerning each of the state S3 and the state S4 to the controller 12, so that the controller 12 can perform control regarding whether or not to receive input from the input IF 6. More specifically, if the ON/OFF button 6a, the initial position shift button 6e, or the emergency stop button 24 is pressed by the helper 18 or the patient 7, the controller 12 receives input from the pressed button and performs control. If the up button 6b or the down button 6c is pressed by the helper 18 or the patient 7, the controller 12 does not perform any control without receiving input from the pressed button. The indicator information concerning the state IDs S3 and S4 in the operating state database 23 is (1,1,0,0,1). The operating state manager 21 supplies this indicator information to the indicators 22 via the controller 12, so that the ON/OFF button lamp 22a and the initial position shift button lamp 22e will be turned ON, and the up button lamp 22b and the down button lamp 22c will be turned OFF, as indicated in the state S3 and the state S4 in FIG. 13. In the operating state database 23, the input IF receive/reject information concerning the state S5 is (1,0,1,1,1). Accordingly, input from the ON/OFF button 6a, the up button 6b, the down button 6c, and the emergency stop button 24 will be received by the controller 12, while input from the initial position shift button 6e will not be received by the controller 12. More specifically, if the ON/OFF button 6a, the up button 6b, the down button 6c, or the emergency stop button 24 is pressed by the helper 18 or the patient 7, the controller 12 receives input from the pressed button and performs control. If the initial position shift button 6e is pressed by the helper 18 or the patient 7, the controller 12 does not perform any control without receiving input from the pressed button. The indicator information concerning the state ID S5 in the operating state database 23 is (1,0,1,1,1). The operating state manager 21 supplies this indicator information to the indicators 22 via the controller 12, so that the ON/OFF button lamp 22a, the up button lamp 22b, and the down button lamp 22c will be turned ON, and the initial position shift button lamp 22e will be turned OFF, as indicated in the state S5 in FIG. 13. This enables the helper 18 or the patient 7 to visually check from which buttons an instruction will be received by the controller 12. (State S5→State S6 or State S7, See FIG. 14C)

Figure 14C:
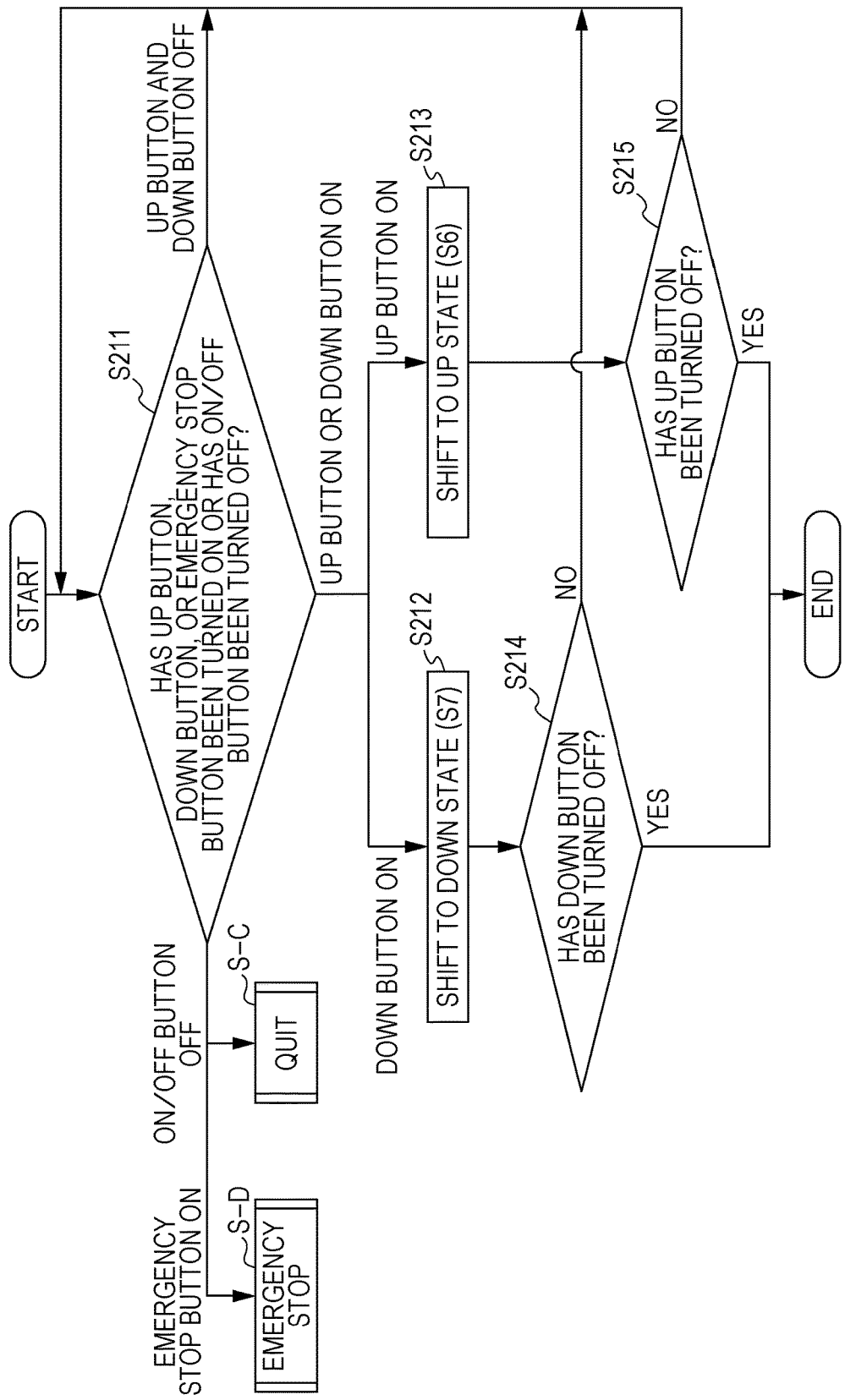
FIG. 14C is a flowchart illustrating a stand or sit operation of the robot system according to the first embodiment.
Figure 14D:
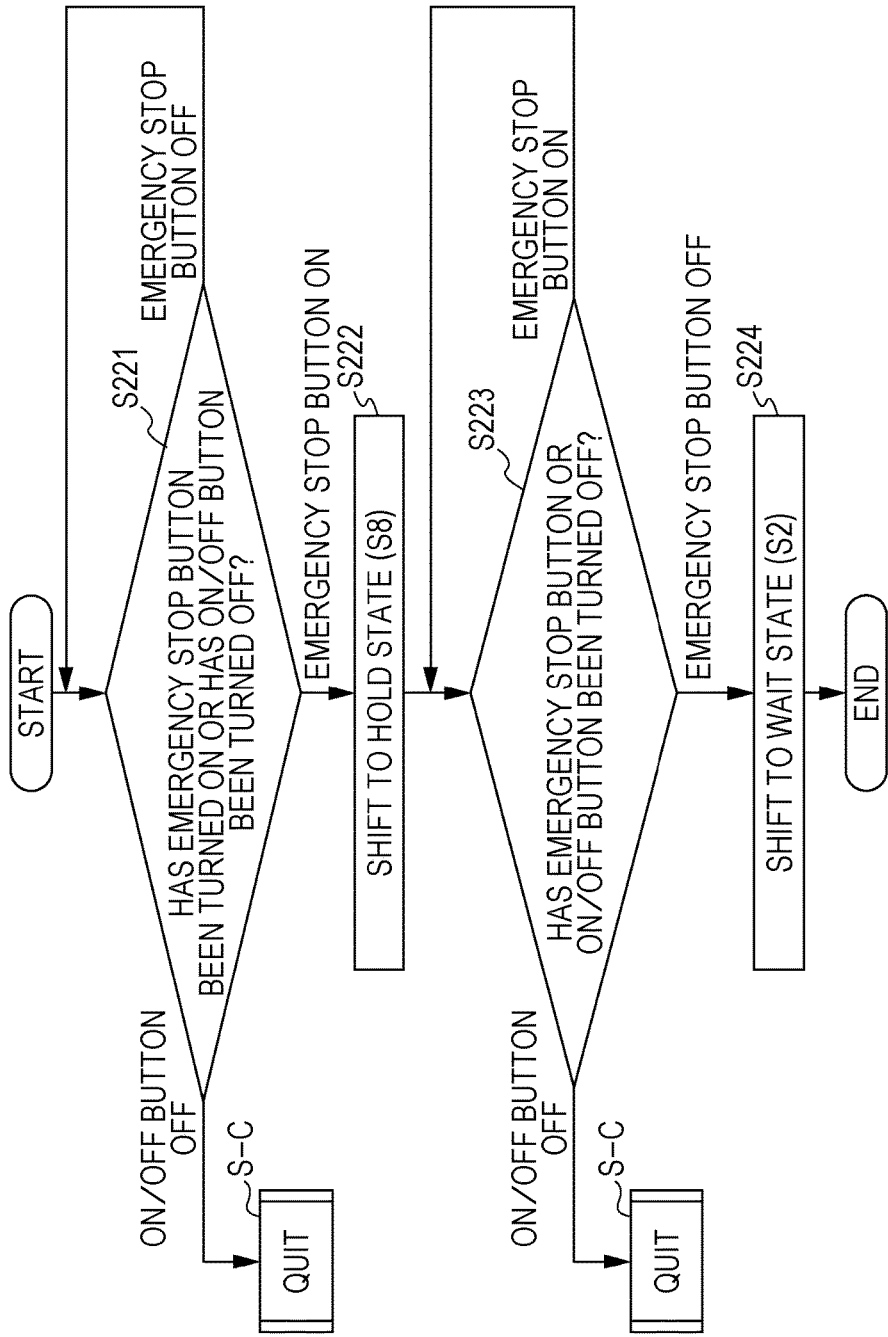
FIG. 14D is a flowchart illustrating an emergency stop operation of the robot system according to the first embodiment.

Then, as shown in FIGS. 8B and 14C, if the height of the connecting portion 3c of the care belt 3 fixed on the patient 7 does not match that of the connecting portion 4g of the arm mechanism 4, the height of the connecting portion 4g is adjusted. In the example shown in FIG. 8B, since it is necessary to move the connecting portion 4g of the arm mechanism 4 upward, the helper 18 or the patient 7 presses the up button 6b of the input IF 6 so as to adjust the height of the connecting portion 4g (steps S211 and S213).

The height is adjusted, for example, in accordance with the operation information database 8 shown in FIG. 6. FIG. 7 illustrates the path of the movement of the care belt 3 (in other words, the connecting portion 4g) when the arm mechanism 4 is driven. The path shown in FIG. 7 has a curved shape projecting toward forward of the patient 7, in other words, a C-shaped semicircular path in which all passing points from the start point to the end point are determined in advance. In this path, for example, the connecting portion 4g does not move to backward of the patient 7. At time t1 at which the progress information is "1" in FIG. 6, if the helper 18 or the patient 7 presses the up button 6b to adjust the height of the connecting portion 4g, the connecting portion 4g starts to move upward in the path shown in FIG. 7, that is, toward time t2 in FIG. 6 (downward in the table in FIG. 6). If the helper 18 or the patient 7 presses the down button 6c to adjust the height of the connecting portion 4g, the connecting portion 4g starts to move downward in the path shown in FIG. 7, that is, toward time t0 in FIG. 6 (upward in the table in FIG. 6). In this manner, the controller 12 controls the driving of the arm mechanism 4 to adjust the height of the connecting portion 4g. In the example shown in FIG. 8B, it is necessary to move the connecting portion 4g of the arm mechanism 4 upward. Accordingly, as a result of the helper 18 or the patient 7 pressing the up button 6b of the input IF 6, the controller 12 controls the driving of each of the first and second motors 41 and 42 separately so that the arm mechanism 4 will follow the path of the connecting portion 4g shown in FIG. 7 to move along the path upward.

When the helper 18 or the patient 7 releases the up button 6b upon completion of the adjustment of the height of the connecting portion 4g at a certain position, the arm mechanism 4 stops at this position. If the helper 18 or the patient 7 presses the up button 6b in the state S5, the operating state manager 21 manages the operating state of the robot system 1 so that the state S5 will shift to the state S6 (steps S211 and S213). If the helper 18 or the patient 7 releases the up button 6b in the state S6 (YES in step S215), the operating state manager 21 manages the operating state of the robot system 1 so that the state S6 will shift to the state S5. The state S6 is a state in which the arm mechanism 4 moves up. If the helper 18 or the patient 7 presses the down button 6c in the state S5, the operating state manager 21 manages the operating state of the robot system 1 so that the state S5 will shift to the state S7 (steps S211 and S212). If the helper 18 or the patient 7 releases the down button 6c in the state S7 (YES in step S214), the operating state manager 21 manages the operating state of the robot system 1 so that the state S7 will shift to the state S5. If the up button 6b has not been released in step S215 or if the down button 6c has not been released in step S214, the controller 12 returns to step S211.

The state S7 is a state in which the arm mechanism 4 moves down. In accordance with the transition of the operating state, the controller 12 updates the operating state database 23 via the database input/output unit 9. More specifically, the controller 12 sets the progress information concerning the state ID of the current state to be "1" and sets the progress information concerning the other state IDs to be "0". In the operating state database 23, the input IF receive/reject information concerning both of the state S6 and the state S7, as well as that of the state S5, is (1,0,1,1,1). Accordingly, input from the ON/OFF button 6a, the up button 6b, the down button 6c, and the emergency stop button 24 will be received by the controller 12, while input from the initial position shift button 6e will not be received by the controller 12. More specifically, if the ON/OFF button 6a, the up button 6b, the down button 6c, or the emergency stop button 24 is pressed by the helper 18 or the patient 7, the controller 12 receives input from the pressed button and performs control (step S211). If the initial position shift button 6e is pressed by the helper 18 or the patient 7, the controller 12 does not perform any control without receiving input from this button. In this case, if the ON/OFF button 6a is turned OFF, the controller 12 executes the quit operation S-C, and if the emergency stop button 24 is turned ON, the controller 12 executes the emergency stop operation S-D. The indicator information concerning the state IDs S6 and S7 in the operating state database 23 is (1,0,1,1,1). The operating state manager 21 supplies this indicator information to the indicators 22 via the controller 12, so that the ON/OFF button lamp 22a, the up button lamp 22b, and the down button lamp 22c will be turned ON and that the initial position shift button lamp 22e will be turned OFF, as indicated in the state S6 and the state S7 in FIG. 13. This enables the helper 18 or the patient 7 to visually check from which buttons an instruction will be received by the controller 12. When the helper 18 or the patient 7 has released the up button 6b or the down button 6c, the controller 12 stops performing control, and updates the progress information in the operation information database 8 corresponding to the time at which the up operation or the down operation started from "1" to "0", and updates the progress information corresponding to the time at which the arm mechanism 4 stopped moving from "0" to "1". FIG. 8B shows the robot system 1 (for example, the initial position P0 in FIG. 7) before the height of the arm mechanism 4 is adjusted, while FIG. 8C shows the robot system 1 (for example, the position P1 in FIG. 7) after the height of the arm mechanism 4 is adjusted.

Figure 8C:
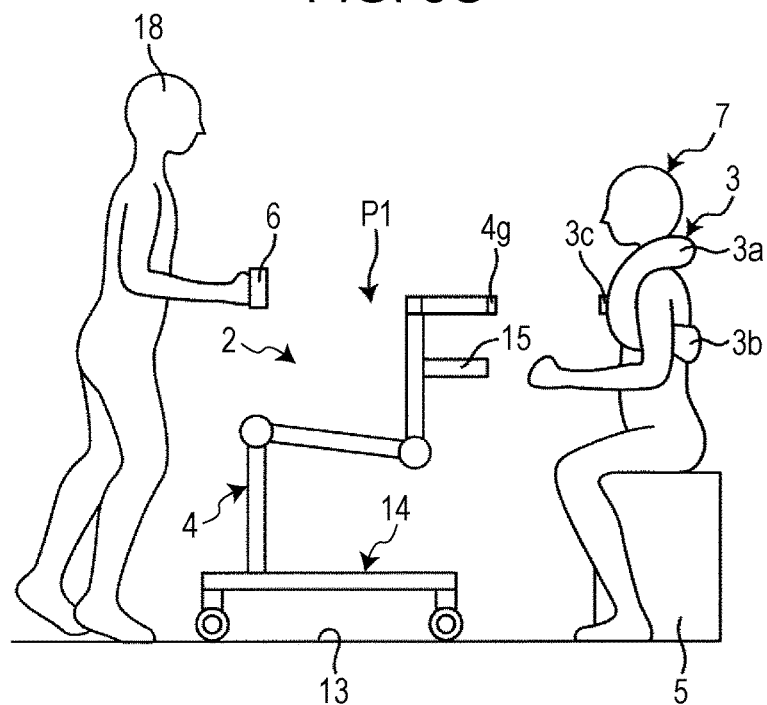

As a result of adjusting the height of the arm mechanism 4, the height of the connecting portion 3c of the care belt 3 and that of the connecting portion 4g of the arm mechanism 4 match each other, as shown in FIG. 8C.

Figure 8D:
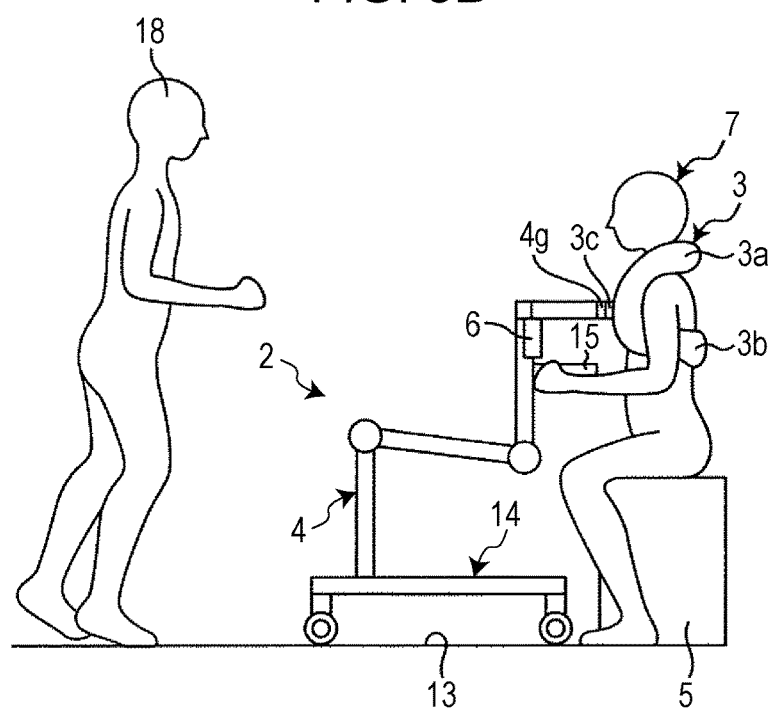

Then, as shown in FIG. 8D, the helper 18 or the patient 7 connects the connecting portion 3c of the care belt 3 and the connecting portion 4g of the arm mechanism 4. In this case, the helper 18 may attach the input IF 6 to the arm mechanism 4 to let the patient 7 operate the input IF 6 to perform the subsequent operations alone. Alternatively, the helper 18 may continue to operate the input IF 6 without attaching the input IF 6 to the arm mechanism 4.

Figure 9A:
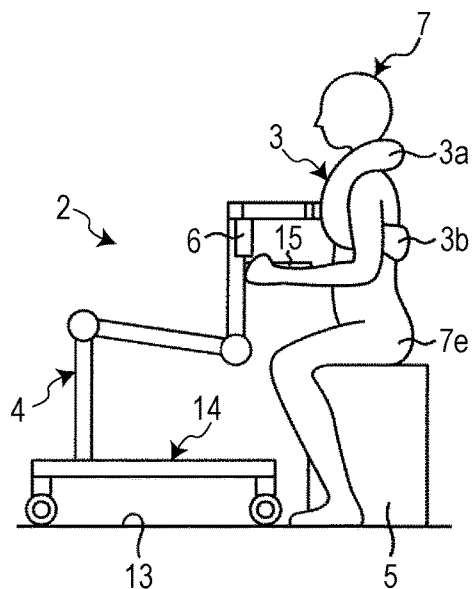
FIGS. 9A through 9E illustrate an example of the first drive pattern in a stand operation of the robot system according to the first embodiment.
Figure 9B:
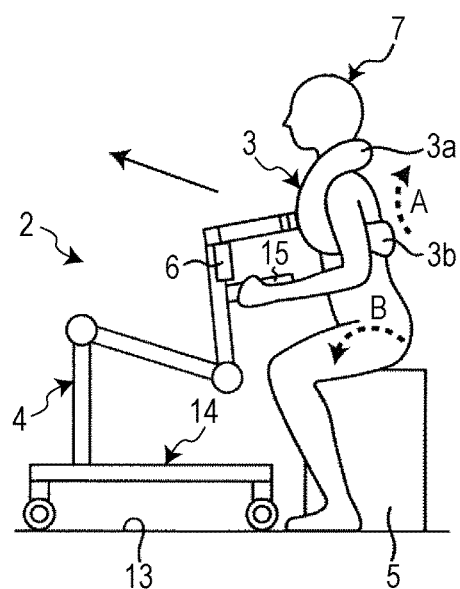
Figure 9C:
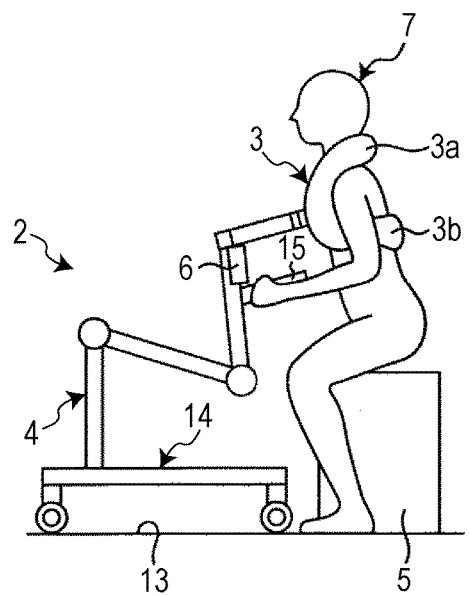
Figure 9D:
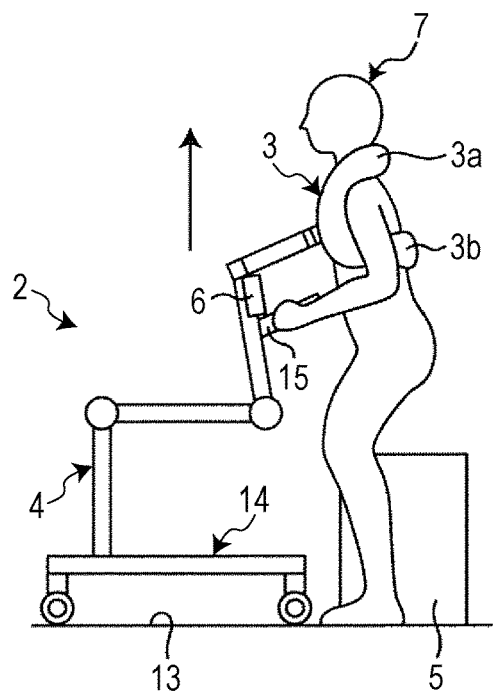

Then, as shown in FIG. 9A, the patient 7 starts standing up from a sitting posture in which the patient 7 is sitting on the seat 5. When the helper 18 or the patient 7 presses the up button 6*b* of the input IF 6, the arm mechanism 4 starts to move upward (stand operation) together with the patient 7 along the path of the connecting portion 4*g* in FIG. 7, as shown in FIGS. 9B through 9D.

Then, when the arm mechanism 4 has reached, together with the patient 7, the end position of the stand operation, it stops moving at this end position as a result of the helper 18 or the patient 7 releasing the up button 6*b*. The controller 12 updates the progress information in the operation information database 8 corresponding to the time at which the up operation started from "1" to "0", and updates the progress information corresponding to the time at which the arm mechanism 4 stopped moving at the end position from "0" to "1". In a manner similar to the above-described adjustment of the height of the arm mechanism 4, in the stand operation, the up button 6*b* is used, and the state S5 shifts to the state S6. Accordingly, an explanation of details of the stand operation will be omitted.

Figure 9E:
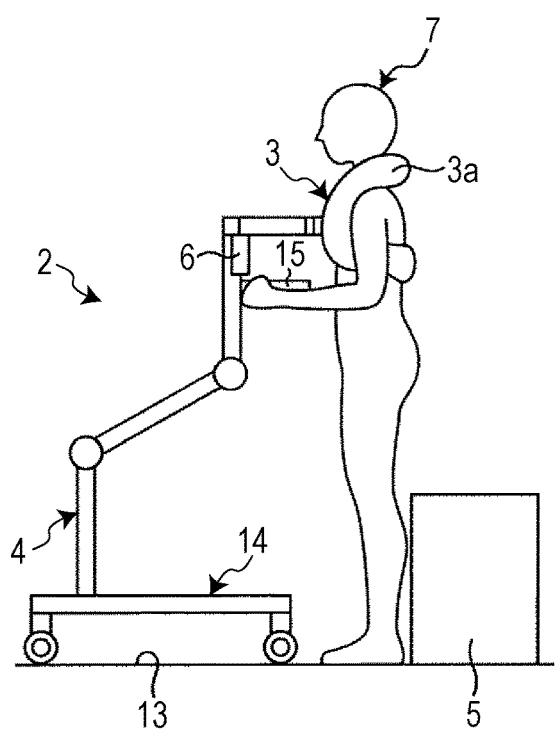

Then, after the patient 7 has stood up from the seat 5 such as a bed, the front-wheel brakes 14*c* and the rear-wheel brakes 14*d* are released in the state in FIG. 9E, and the patient 7 applies force toward the front side (for example, toward the left side in FIG. 9E) so as to rotate the front wheels 14*a* and the rear wheels 14*b* of the walking mechanism 14. In this manner, the walking mechanism 14 serves as a walker to assist the patient 7 in walking.

The robot 20 also assists the patient 7 in sitting down on the seat 5 such as a toilet seat. After moving the walking mechanism 14 to a position right in front of the seat 5, the helper 18 or the patient 7 turns ON the front-wheel brakes 14*c* and the rear-wheel brakes 14*d* by using the brake button 6*d* of the input IF 6 so as to apply the brakes to the front wheels 14*a* and the rear wheels 14*b* of the walking mechanism 14.

Figure 10A:
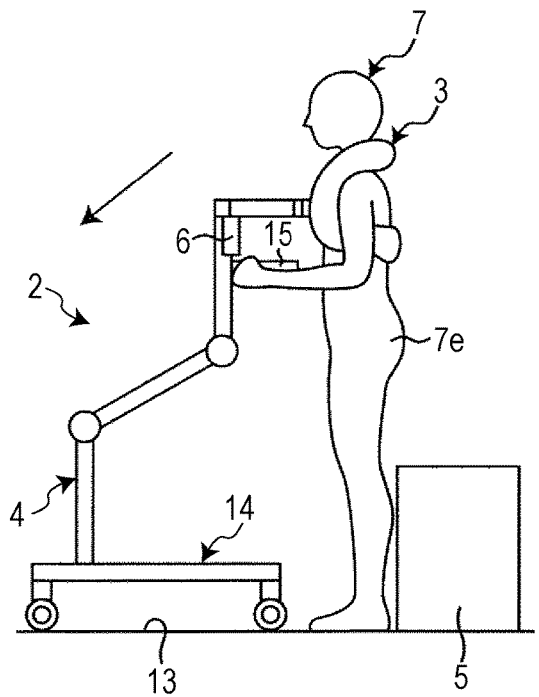
FIGS. 10A through 10C illustrate an example of the second drive pattern in a sit operation of the robot system according to the first embodiment.
Figure 10B:
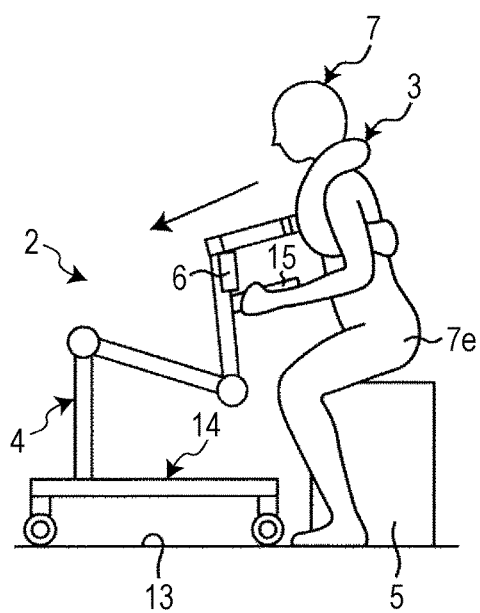

As shown in FIG. 10A, the patient 7 starts to sit down from a standing posture in which the patient 7 is standing in front of the seat 5. When the helper 18 or the patient 7 presses the down button 6*c* of the input IF 6, the arm mechanism 4 starts to move down (sit operation), and when the helper 18 or the patient 7 releases the down button 6*c* at a certain position, the arm mechanism 4 stops moving at this position. In the sit operation, if the arm mechanism 4 starts to move suddenly, the patient 7 may have the buttocks 7*e* hit the seat 5 and may break a bone. In order to avoid such a situation, the robot 20 assists the patient 7 in being in a secure posture so as not to let the patient 7 fall down. Additionally, for adjusting the position of the patient 7 on the seat 5, the arm mechanism 4 can stop moving at a position at which the helper 18 or the patient 7 releases the down button 6*c*.

As a result of the helper 18 or the patient 7 pressing the down button 6*c* of the input IF 6, as shown in FIG. 10A, the controller 12 sequentially controls the operation of the arm mechanism 4 in accordance with the position information in the operation information database 8 in FIG. 6 in a direction upward from the position at which the progress information is "1".

Figure 10C:
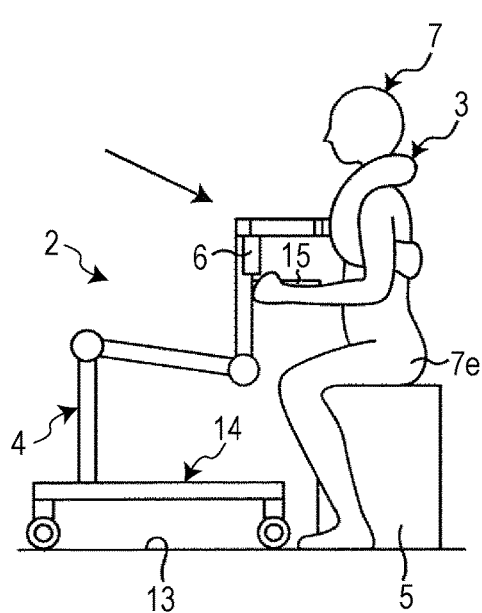

For example, the controller 12 reads the operation information concerning the operation of the arm mechanism 4 for moving downward from the stand position P2 in FIG. 7 from the operation information database 8, and controls the operation of the arm mechanism 4 so that the arm mechanism 4 will follow the path of the connecting portion 4*g* shown in FIG. 7. The arm mechanism 4 moves downward and toward the front side, as in the movement from the state in FIG. 10A to the state in FIG. 10B, and when the patient 7 finishes sitting down on the seat 5, as shown in FIG. 10C, the helper 18 or the patient 7 releases the down button 6*c*. In a manner similar to the stand operation, the controller 12 updates the progress information in the operation information database 8 corresponding to the time at which the arm mechanism 4 stopped moving from "0" to "1".

The up button 6*b* and the down button 6*c* of the input IF 6 may be pressed or released at any position. For example, the patient 7 starts to sit down on the toilet seat, together with the arm mechanism 4, from the position in FIG. 10A, and, at the position shown in FIG. 10B, the helper 18 or the patient 7 releases the down button 6*c* to stop moving the arm mechanism 4. Then, while the buttocks 7*e* of the patient 7 are being elevated from the toilet seat, the patient 7 takes off underwear, and then, the helper 18 or the patient 7 presses the down button 6*c* again to move down the arm mechanism 4 so that the patient 7 can sit down on the toilet seat. When standing up from the toilet seat, if the patient 7 wishes to adjust the height after stopping moving up the arm mechanism 4 at a certain position, the helper 18 or the patient 7 may press the up button 6*b* or the down button 6*c* to adjust the height.

In a manner similar to the above-described adjustment of the height of the arm mechanism 4, in the sit operation, the operating state manager 21 manages the operating state of the robot system 1 so that the state S5 will shift to the state S6 or the state S7 as a result of the helper 18 or the patient 7 pressing the up button 6*b* or the down button 6*c*. The transition from the state S5 to the state S6 or the state S7 is similar to that in the above-described adjustment of the height of the arm mechanism 4, and an explanation thereof will thus be omitted.

When the helper 18 or the patient 7 presses the initial position shift button 6*e*, the up button 6*b*, or the down button 6*c*, the arm mechanism 4 may start moving suddenly. In order to avoid such a situation, the controller 12 may change the time t to be longer (for example, twice as long) for a certain period of time (for example, three seconds) so as to decelerate the operating speed of the robot system 1.

While the helper 18 or the patient 7 is pressing the up button 6*b*, the controller 12 may perform control so that input from the down button 6*c* will not be received or so that the arm mechanism 4 will stop moving immediately. Similarly, while the helper 18 or the patient 7 is pressing the down button 6*c*, the controller 12 may perform control so that input from the up button 6*b* will not be received or so that the arm mechanism 4 will stop moving immediately. If the controller 12 performs control so that the arm mechanism 4 will stop moving immediately, when the helper 18 or the patient 7 releases the up button 6*b* or the down button 6*c*, the arm mechanism 4 may restart to move suddenly. In order to avoid such a situation, the controller 12 performs control so that input from the up button 6*b* or the down button 6*c* will be received again after the helper 18 or the patient 7 has released both of the up button 6*b* and the down button 6*c*.

(Emergency Stop Button (State S92→State S8, See FIG. 14D))

Since the input IF receive/reject information for the emergency stop button 24 concerning all the states S1 through S8 in the operating state database 23 is "1", the emergency stop button 24 can be pressed in the state S92, that is, in all the states S1 through S7 other than the state S8. If the emergency stop button 24 is pressed by the helper 18 or the patient 7 (S221), the operating state manager 21 manages the operating state of the robot system 1 so that one of the states S1 through S7 will shift to the state S8 (step S222). The state S8 is a state in which the state (for example, the position) of the arm mechanism 4 when one of the states S1 through S7 has shifted to the state S8 is held. If the robot 20 is operating in the state S92, it stops at a position at which the state S92 has shifted to the state S8. In the state S8, the input IF receive/reject information concerning the state ID S8 in the operating state database 23 is (1,0,0,0,1). Accordingly, input of an instruction from the ON/OFF button 6a or the emergency stop button 24 will be received (step S223), while input of an instruction from the initial position shift button 6e, the up button 6b, or the down button 6c will not be received. If the ON/OFF button 6a is turned OFF in step S221 or S223, the controller 12 executes the quit operation S-C. The operating state manager 21 supplies the above-described input IF receive/reject information to the controller 12, so that the controller 12 can perform control regarding whether or not to receive input from the input IF 6. The indicator information concerning the state ID S8 in the operating state database 23 is (0,0,0,0,0). Accordingly, the operating state manager 21 instructs the indicators 22 via the controller 12 to turn off all the lamps 22a, 22e, 22b, and 22c of the input IF 6, as indicated in the state S8 in FIG. 13. If the emergency stop button 24 is turned OFF (step S223), the operating state manager 21 manages the operating state of the robot system 1 so that the state S8 will shift to the state S2 (step S224). As described above, the state S92 is one of the states S1 through S7 other than the state S8. After the state S2, the arm mechanism 4 may shift to the initial position P0 as a result of the helper 18 or the patient 7 turning ON the initial position shift button 6e, and the robot system 1 is able to assist the patient 7 in standing up or sitting down again, as described above.

(ON/OFF Button OFF (State S91→State S1, See FIG. 14E))

Since the input IF receive/reject information for the ON/OFF button 6a concerning all the states S1 through S8 in the operating state database 23 is "1", the ON/OFF button 6a can be pressed in the state S91, that is, in all the states S2 through S8 other than the state S1. Accordingly, if the ON/OFF button 6a is turned OFF by the helper 18 or the patient 7 (step S231), the supply of power is terminated. For example, the operating state manager 21 manages the operating state of the robot system 1 so that the robot system 1 will shift to the state S1 in which the arm mechanism 4 is collapsed for storage, as shown in FIGS. 8A and 14E (step S232). In the state S1, the input IF receive/reject information concerning the state ID S1 in the operating state database 23 is (1,0,0,0,1). Accordingly, input of an instruction from the ON/OFF button 6a or the emergency stop button 24 will be received, while input of an instruction from the initial position shift button 6e, the up button 6b, or the down button 6c will not be received. If the emergency stop button 24 is turned ON in step S231, the controller 12 executes the emergency stop operation S-D. The operating state manager 21 supplies the above-described input IF receive/reject information to the controller 12, so that the controller 12 can perform control regarding whether or not to receive input from the input IF 6. The indicator information concerning the state ID S1 in the operating state database 23 is (0,0,0,0,0). Accordingly, the operating state manager 21 supplies this indicator information to the indicators 22 via the controller 12 to instruct the indicators 22 to turn OFF all the lamps 22a, 22e, 22b, and 22c of the input IF 6, as indicated in the state S1 in FIG. 13. In the state S1, if the ON/OFF button 6a is pressed again, the operating state manager 21 manages the operating state of the robot system 1 so that the robot system 1 will shift to the state S2.

(Advantages of First Embodiment)

In the sit-to-stand and/or stand-to-sit assist system of the first embodiment, the controller 12 decides whether or not an instruction input from the input IF 6 will be executed by the arm mechanism 4, on the basis of the execution state of a drive pattern executed by the arm mechanism 4. That is, if the controller 12 decides, based on the execution state, that the robot system 1 will not be able to assist the patient 7 appropriately if an instruction input from the input IF 6 is executed, the controller 12 does not execute this instruction. In this manner, when the patient 7 stands up or sits down, the arm mechanism 4 does not perform any operation that the patient does not wish to receive, which would otherwise make the patient feel uncomfortable. Additionally, the state of the robot system 1 is managed in accordance with an operation performed by an operator (helper 18 or patient 7), and the states of the buttons of the input IF 6 and the emergency stop button 24 are also presented to the operator (helper 18 or patient 7) in accordance with the state of the robot system 1. Thus, a user friendly operation interface can be provided.

Second Embodiment

In a second embodiment, an instruction received by the input IF 6 is wirelessly transmitted to the controller 12, and the controller 12 causes a state indicator 22g, which is part of the indicators 22, to indicate the operating state acquired by the operating state manager 21.

As in the first embodiment, a robot system 1 of the second embodiment includes a robot 20 and an operation information database 8 and an operating state database 23 outside the robot 20.

The robot 20 is placed on the floor 13. The robot 20 includes a main body mechanism 2, which is an example of a drive mechanism, a control device 11, an input IF 6, which is an example of an instruction input device, an operating state manager 21, which is an example of a state acquirer, and a controller 12.

The main body mechanism 2 includes an arm mechanism 4, a care belt 3, which is an example of a holding mechanism, and a walking mechanism 14. The main body mechanism 2 may not necessarily include the walking mechanism 14. The arm mechanism 4 at least includes a robot arm, which is an example of a pulling mechanism.

The second embodiment is similar to the first embodiment, except for the indicators 22, the operation information database 8, the operating state database 23, the operating state manager 21, and the controller 12 and except that the controller 12 and the input IF 6 wirelessly communicate with each other. Thus, an explanation of portions of the second embodiment similar to the first embodiment will be omitted. In the first embodiment, the controller 12 and the input IF 6 may communicate with each other via a wired or a wireless medium. On the other hand, in the second embodiment, the controller 12 and the input IF 6 communicate with each other via a wireless medium.

(Indicators 22)

Figure 18A:
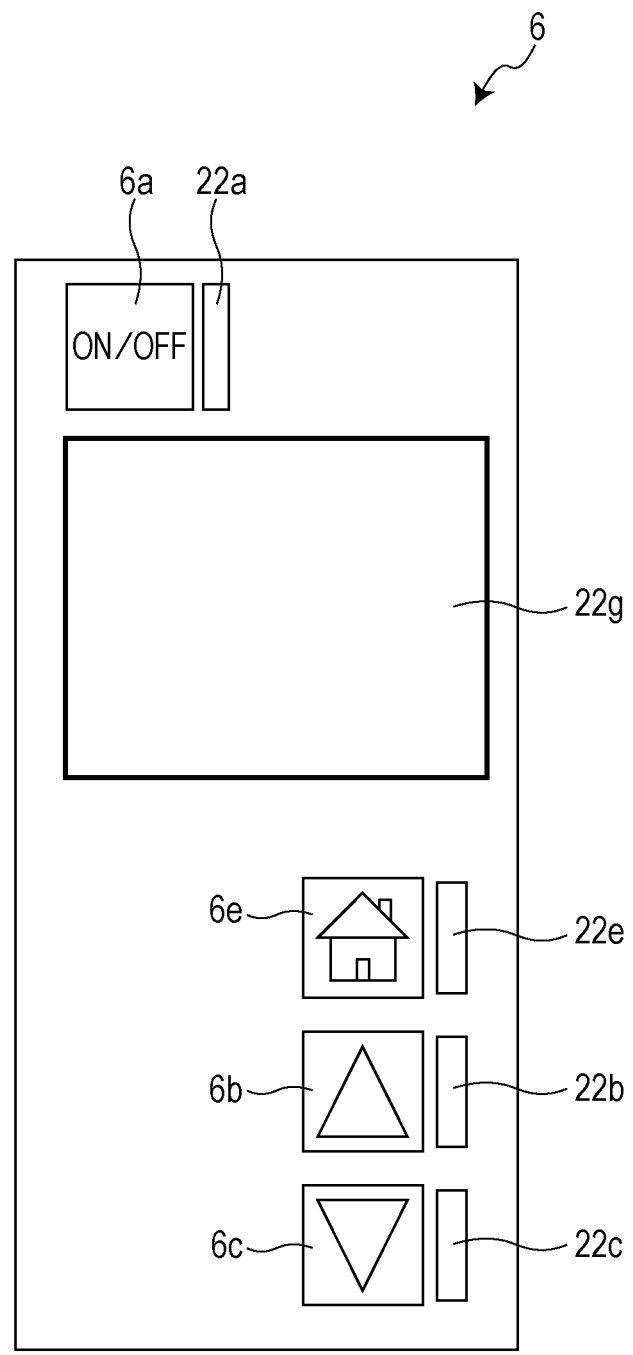
FIG. 18A schematically illustrates an input IF in the second embodiment.

As in the first embodiment, the indicators 22 indicate, under the control of the controller 12, whether or not input of instructions from the input IF 6 and the emergency stop button 24 can be received. The indicators 22 also include the state indicator 22g that indicates the execution state of the arm mechanism 4. An example of the state indicator 22g is a liquid crystal monitor located at the upper portion of the top surface of the input IF 6, as shown in FIG. 18A. When the up button 6b or the down button 6c is pressed, the execution state (for example, the operating state) of the arm mechanism 4 is indicated on the liquid crystal monitor in accordance with information concerning the operating state in the operating state database 23. Alternatively, the state of the patient 7 may be indicated on the liquid crystal monitor. Details of such an example will be discussed later.

(Operation Information Database 8)

The controller 12 is run based on an execution command from the timer 16. More specifically, the database input/output unit 9 and the controller 12 are run in response to an execution command from the timer 16 so as to generate position information concerning the arm mechanism 4 at predetermined regular times (for example, every one millisecond). In this case, the position information is generated by converting angle information concerning the angles of rotation detected by the first and second encoders 43 and 44. Then, in the second embodiment, plural items of position information generated in this manner are sequentially output, together with the times, to the operation information database 8 via the database input/output unit 9, and are stored in the operation information database 8 as operation information. In the second embodiment, the operation information is generated by using the input IF 6 and is stored in the operation information database 8 in advance.

FIG. 15 illustrates an example of the content of operation information stored in the operation information database 8.

(1) As in the first embodiment, in the field of "time", information concerning the time at which the arm mechanism 4 is being operated is indicated. The time is expressed by milliseconds (msec).

(2) As in the first embodiment, in the field of "position", position information concerning the arm mechanism 4 converted from angle information concerning the angles of rotation detected by the first and second encoders 43 and 44 of the arm mechanism 4 is indicated. The position information will be explained more specifically. As shown in FIG. 1A, one end of the arm mechanism 4 (for example, the bottom end of the first arm 4c shown in FIG. 1A) is set as the origin O. The position information is represented by relative coordinates from the origin O on two axes, that is, on the x axis and the z axis. The direction opposite to the traveling direction of the robot system 1 is taken as the positive side of the x axis, while the upward direction is taken as the positive side of the z axis. The position is expressed by meters (m).

(3) As in the first embodiment, in the field of "initial position flag", a flag for indicating the coordinates at the initial position of the arm mechanism 4 is stored. The arm mechanism 4 shifts from the position at which it is collapsed for storage as shown in FIG. 8A to the initial position shown in FIG. 8B. In the initial position flag, "0" or "1" is stored. When the initial position flag is "1", the position corresponding to the time for which "1" is stored is set as the initial position. When the initial position flag is "0", it means that the position corresponding to the time for which "0" is stored is not the initial position.

(4) As in the first embodiment, in the field of "progress information", information concerning the progress of the operation of the robot system 1 is stored by the controller 12. The controller 12 stores "1" in the progress information for a time corresponding to the current (that is, when the control operation is performed) position of the robot system 1. The controller 12 stores "0" in the progress information for a time which does not correspond to the current position. The controller 12 stores "0" in the progress information for a time at which the robot system 1 has not yet shifted to the initial position. Immediately after the robot system 1 has shifted to the initial position, the controller 12 stores "1" in the progress information corresponding to the time for which "1" is stored in the initial position flag.

(5) In the field of "state information", information to be indicated in the state indicator 22g when the robot system 1 is being operated is stored. For example, video information (such as the playback start frame number in a video file) to be displayed on the liquid crystal monitor (state indicator 22g), is stored.

(Operating State Database 23)

Based on an instruction input from the input IF 6 or the emergency stop button 24, the operating state manager 21 decides the operating state of the robot system 1 and stores it in the operating state database 23 via the database input/output unit 9.

FIGS. 16A and 16B illustrate examples of the content of the operating state database 23.

(1) As in the first embodiment, in the field of "state ID", the operating state of the arm mechanism 4 is indicated by one of ID numbers S1 through S8.

(2) As in the first embodiment, in the field of "input IF receive/reject information", information concerning whether or not input of an instruction from each button of the input IF 6 and the emergency stop button 24 will be received is recorded. If input of an instruction is received, "1" is recorded. If input of an instruction is not received, "0" is recorded. For example, input IF receive/reject information concerning each button of the ON/OFF button 6a, the initial position shift button 6e, the up button 6b, the down button 6c, and the emergency stop button 24 is recorded by using delimiters, such as (1,1,0,0,1).

(3) In the field of "indicator information", information for indicating the input receive/reject state concerning each button of the input IF 6 and the emergency stop button 24 is stored. Information to be indicated in the state indicator 22g of the indicators 22 is also stored.

For example, the indicator information concerning the input receive/reject state of each of the ON/OFF button 6a, the initial position shift button 6e, the up button 6b, the down button 6c, and the emergency stop button 24 and information to be indicated in the state indicator 22g of the indicators 22 are recorded by using delimiters, such as (1,1,0,0,1,ID). If the input receive/reject state of each of the ON/OFF button 6a, the initial position shift button 6e, the up button 6b, the down button 6c, and the emergency stop button 24 is indicated, "1" is recorded. If the input receive/reject state of each of the ON/OFF button 6a, the initial position shift button 6e, the up button 6b, the down button 6c, and the emergency stop button 24 is not indicated, "0" is recorded. Information to be indicated in the state indicator 22g of the indicators 22 is represented by the ID number, and as the specific indicator information represented by each of the ID numbers, information corresponding to each of the ID numbers is stored, as shown in FIG. 16B. For example, image or video information indicating the execution state (such as the operating state) corresponding to each of the ID numbers is stored.

If information for indicating the input receive/reject state concerning each button of the input IF 6 and the emergency stop button 24 is indicated, "1" is recorded. If such information is not indicated, "0" is recorded. For example, the indicator information concerning the input receive/reject state of each of the ON/OFF button 6a, the initial position shift button 6e, the up button 6b, the down button 6c, and the emergency stop button 24 and information to be indicated in the state indicator 22g of the indicators 22 is recorded by using delimiters, such as (1,1,0,0,1, ID). For a button for which the indicator information is "1", the corresponding one of the ON/OFF button lamp 22a, the up button lamp 22b, the down button lamp 22c, and the initial position shift button lamp 22e shown in FIG. 18A, and the emergency stop button lamp 22f is turned ON. For a button for which the indicator information is "0", the corresponding one of the ON/OFF button lamp 22a, the up button lamp 22b, the down button lamp 22c, the initial position shift button lamp 22e, and the emergency stop button lamp 22f is turned OFF. Examples of the indicator information represented by the ID number as information to be indicated in the state indicator 22g are as follows, as shown in FIG. 16B. If the indicator information concerning the ID number "ID1" is "0", information is not displayed. If the indicator information concerning the ID number "ID2" is "power ON", the character string "power ON" is displayed on the state indicator 22g. If the indicator information concerning the ID numbers "ID5", "ID6", and "ID7" is a video file name such as "videofilename1", video of the corresponding video file name is displayed on the state indicator 22g.

(4) As in the first embodiment, in the field of "progress information", information concerning the progress of the current (that is, when the control operation is performed) state is stored. For the current state, "1" is recorded, and for the other states, "0" is recorded.

(Operating State Manager 21 and Controller 12)

The controller 12 decides, based on the operating state acquired by the operating state manager 21, whether or not an instruction input and received from the input IF 6 by wireless communication will be executed by the arm mechanism 4, and controls the arm mechanism 4 in accordance with the decision result. More specifically, the controller 12 controls the arm mechanism 4, based on an instruction or a command input from the input IF 6 or the timer 16 or information concerning the operating state acquired by the operating state manager 21. The controller 12 also controls the operation of the operating state manager 21 and the indicators 22. If the controller 12 receives input of an instruction to sit down from the input IF 6 when the operating state acquired by the operating state manager 21 indicates that the arm mechanism 4 is executing the drive pattern for standing up, the controller 12 controls the arm mechanism 4 so that the arm mechanism 4 will not execute the drive pattern for sitting down. Conversely, if the controller 12 receives input of an instruction to stand up from the input IF 6 when the operating state acquired by the operating state manager 21 indicates that the arm mechanism 4 is executing the drive pattern for sitting down, the controller 12 controls the arm mechanism 4 so that the arm mechanism 4 will not execute the drive pattern for standing up.

As in the first embodiment, the operating state manager 21 acquires the execution state (for example, the operating state) of a drive pattern executed by the arm mechanism 4. More specifically, the operating state manager 21 decides the operating state (for example, the state) of the arm mechanism 4, based on an instruction from the input IF 6 or the emergency stop button 24, and stores the decided operating state in the operating state database 23 and informs the controller 12 of the operating state via the database input/output unit 9. An example of the state transition diagram of the robot system 1 is shown in FIG. 12.

Decision of the operating state and the control operation for the robot system 1 performed by the operating state manager 21 and the controller 12 will be described below with reference to FIGS. 7 through 10C, 12, and 17.

FIG. 7 is a plot graph indicating the positions of the arm mechanism 4 on the x axis and the z axis stored in the operation information database 8. The horizontal axis indicates the x axis, and the vertical axis indicates the z axis.

(State S1)

As shown in FIG. 8A, the patient 7 sits on the seat 5 such as a bed placed on the floor 13. Then, the helper 18 brings the robot system 1 in which the arm mechanism 4 is in a collapsed state for storage to the front side of the patient 7.

In this state, since the power of the robot 20 is OFF, the operating state manager 21 decides that the operating state of the robot system 1 is the state S1 (power OFF) shown in FIG. 12. In the state S1, the input IF receive/reject information concerning the state ID S1 in the operating state database 23 shown in FIG. 16A is (1,0,0,0,1). Accordingly, input from the ON/OFF button 6a and the emergency stop button 24 will be received, while input from the initial position shift button 6e, the up button 6b, and the down button 6c will not be received. The operating state manager 21 supplies the above-described input IF receive/reject information to the controller 12, so that the controller 12 can perform control regarding whether or not to receive input from the input IF 6. In other words, the controller 12 decides whether or not an instruction input from the input IF 6 will be executed by the arm mechanism 4, and controls the driving of the arm mechanism 4 based on the decision result. More specifically, if the input IF receive/reject information concerning a certain button of the input IF 6 is "1", the controller 12 receives input from this button. If the input IF receive/reject information concerning a certain button of the input IF 6 is "0", the controller 12 does not receive input from this button. If an instruction that can be received by the controller 12 is input, the operating state manager 21 manages the operating state of the robot system 1 so that the robot system 1 will shift to a corresponding state, based on the instruction input from the input IF 6. The controller 12 does not perform any control concerning an instruction which is not possible to receive.

The indicator information concerning the state ID S1 in the operating state database 23 is (0,0,0,0,0,ID1), as shown in FIG. 16A. Accordingly, the operating state manager 21 informs the indicators 22 via the controller 12 that the lamps 22a, 22e, 22b, and 22c of all the indicators 22 of the input IF 6 shown in FIG. 18A will be turned OFF. As a result of supplying this information from the operating state manager 21 to the controller 12, the ON/OFF button lamp 22a, the initial position shift button lamp 22e, the up button lamp 22b, and the down button lamp 22c are turned OFF, as indicated in the state S1 in FIG. 17. The indicator information concerning the ID number "ID1" is "0", as shown in FIG. 16B, and thus, information is not displayed on the state indicator 22g.

(State S1→State S2)

Then, as shown in FIG. 8B, the helper 18 or the patient 7 presses the ON/OFF button 6a of the input IF 6 of the robot 20.

When the ON/OFF button 6a of the input IF 6 has been pressed, the operating state manager 21 receives information via the controller 12 that the ON/OFF button 6a has been pressed, and manages the operating state of the robot system 1 so that the state S1 will shift to a subsequent state. More specifically, the operating state manager 21 manages the operating state of the robot system 1 so that the state S1 will shift to the state S2 (wait state) in FIG. 12. In accordance with this transition of the state, the controller 12 updates the operating state in the operating state database 23 via the database input/output unit 9. More specifically, the controller 12 sets the progress information concerning the state ID S2 in the operating state database 23 to be "1", and sets the progress information concerning the other state IDs to be "0". The input IF receive/reject information concerning the state ID S2 in the operating state database 23 is (1,1,0,0,1). Accordingly, input from the ON/OFF button 6a, the initial position shift button 6e, and the emergency stop button 24 will be received by the controller 12, while input from the up button 6b and the down button 6c will not be received by the controller 12. The state in which input will not be received includes a state in which the controller 12 receives input from the input IF 6, but it does not control the operation of the arm mechanism 4 based on the received input. The operating state manager 21 supplies the above-described input IF receive/reject information to the controller 12, so that the controller 12 can perform control regarding whether or not to receive input from the input IF 6. More specifically, if one of the ON/OFF button 6a, the initial position shift button 6e, and the emergency stop button 24 is pressed, the controller 12 receives input from the pressed button and performs control. On the other hand, if the up button 6b or the down button 6c is pressed, the controller 12 does not perform any control without receiving input from the pressed button. The indicator information concerning the state ID S2 in the operating state database 23 is (1,1,0,0,1, ID2), as shown in FIG. 16A. Accordingly, the operating state manager 21 supplies this indicator information to the indicators 22 via the controller 12. Then, as indicated in the state S2 in FIG. 17, the ON/OFF button lamp 22a and the initial position shift button lamp 22e are turned ON, while the up button lamp 22b and the down button lamp 22c are turned OFF. This enables the helper 18 or the patient 7 to visually check from which buttons an instruction will be received by the controller 12. The indicator information concerning the ID number ID2 in the operating state database 23 is "power ON", as shown in FIG. 16B. Accordingly, characters "power ON" are displayed on the state indicator 22g, as in the state S2 in FIG. 17.

(State S3→State S4 or State S5)

In the state in FIG. 8B, as a result of the helper 18 or the patient 7 pressing the initial position shift button 6e of the input IF 6 of the robot 20, the controller 12 controls the driving of the arm mechanism 4 so as to move the arm mechanism 4 to the initial position P0. In this example, the arm mechanism 4 moves only when the helper 18 or the patient 7 presses the initial position shift button 6e, and the arm mechanism 4 stops moving when the helper 18 or the patient 7 releases the initial position shift button 6e. In this manner, the arm mechanism 4 shifts to the initial position P0 shown in FIG. 7. That is, the arm mechanism 4 shifts from the position in FIG. 8A to the position in FIG. 8B. The initial position P0 in FIG. 7 is a position at which "1" is stored in the initial position flag in the operation information database 8. The operating state manager 21 manages the operating state of the robot system 1 so that the state S2 will shift to the state S3 when the helper 18 or the patient 7 presses the initial position shift button 6e. As a result, the arm mechanism 4 of the robot system 1 starts to shift to the initial position P0. The operating state manager 21 also manages the operating state of the robot system 1 so that the state S3 will shift to the state S4 when the helper 18 or the patient 7 releases the initial position shift button 6e. As a result, the arm mechanism 4 temporarily stops moving. As described above, the state S3 is a state in which the arm mechanism 4 is shifting to the initial position P0, and the state S4 is a state in which the arm mechanism 4 temporarily stops shifting to the initial position P0. The controller 12 controls the driving of each of the first and second motors 41 and 42 separately so that the arm mechanism 4 will shift to the initial position P0. The operating state manager 21 manages the operating state of the robot system 1 so that the arm mechanism 4 will restart to move and the state S4 will shift to the state S3 when the helper 18 or the patient 7 presses the initial position shift button 6e again. The operating state manager 21 also manages the operating state of the robot system 1 so that the state S3 will shift to the state S5 (suspension state) when the arm mechanism 4 reaches the initial position P0. As a result, the robot system 1 temporarily stops operating. In this case, the controller 12 determines whether or not the arm mechanism 4 has shifted to the initial position P0, on the basis of position information concerning the arm mechanism 4 (for example, position information converted from information concerning the angles of rotation detected by the first and second encoders 43 and 44). If the controller 12 determines that the arm mechanism 4 has shifted to the initial position P0, it outputs a completion signal to the operating state manager 21. This enables the operating state manager 21 to manage the operating state of the robot system 1 so that the state S3 will shift to the state S5. The state S5 is a state in which the robot system 1 temporarily stops operating. In accordance with the transition of the operating state, the controller 12 updates the operating state database 23 via the database input/output unit 9. More specifically, the controller 12 sets the progress information concerning the state ID of the current state to be "1" and sets the progress information concerning the other state IDs to be "0". In the operating state database 23, the input IF receive/reject information concerning both of the state S3 and the state S4 is (1,1,0,0,1). Accordingly, input from the ON/OFF button 6a, the initial position shift button 6e, and the emergency stop button 24 will be received by the controller 12, while input from the up button 6b and the down button 6c will not be received by the controller 12. The operating state manager 21 supplies this input IF receive/reject information concerning each of the state S3 and the state S4 to the controller 12, so that the controller 12 can perform control regarding whether or not to receive input from the input IF 6. More specifically, if the ON/OFF button 6a, the initial position shift button 6e, or the emergency stop button 24 is pressed by the helper 18 or the patient 7, the controller 12 receives input from the pressed button and performs control. If the up button 6b or the down button 6c is pressed by the helper 18 or the patient 7, the controller 12 does not perform any control without receiving input from the pressed button. The indicator information concerning the state ID S3 and that concerning the state ID S4 in the operating state database 23 are (1,1,0,0,1,ID3) and (1,1,0,0,1,ID4), respectively. The operating state manager 21 supplies this indicator information to the indicators 22 via the controller 12, so that the ON/OFF button lamp 22a and the initial position shift button lamp 22e will be turned ON, and the up button lamp 22b and the down button lamp 22c will be turned OFF, as indicated in the state S3 and the state S4 in FIG. 17. The indicator information concerning the ID number "ID3" of the state S3 is "initializing", as shown in FIG. 16B. Accordingly, as indicated in the state S3 in FIG. 17, characters "initializing" are displayed on the state indicator 22g. The indicator information concerning the ID number "ID4" of the state S4 is "initializing suspended", as shown in FIG. 16B. Accordingly, as indicated in the state S4 in FIG. 17, characters "initializing suspended" are displayed on the state indicator 22g.

In the operating state database 23, the input IF receive/reject information concerning the state S5 is (1,0,1,1,1). Accordingly, input from the ON/OFF button 6a, the up button 6b, the down button 6c, and the emergency stop button 24 will be received by the controller 12, while input from the initial position shift button 6e will not be received by the controller 12. More specifically, if the ON/OFF button 6a, the up button 6b, the down button 6c, or the emergency stop button 24 is pressed by the helper 18 or the patient 7, the controller 12 receives input from the pressed button and performs control. If the initial position shift button 6e is pressed by the helper 18 or the patient 7, the controller 12 does not perform any control without receiving input from the pressed button. The indicator information concerning the state ID S5 in the operating state database 23 is (1,0,1,1,1,ID5). The operating state manager 21 supplies this indicator information to the indicators 22 via the controller 12, so that the ON/OFF button lamp 22a, the up button lamp 22b, and the down button lamp 22c will be turned ON, and the initial position shift button lamp 22e will be turned OFF, as indicated in the state S5 in FIG. 17. This enables the helper 18 or the patient 7 to visually check from which buttons an instruction will be received by the controller 12. The indicator information concerning the ID number "ID5" of the state S5 is a file name of a video file, as shown in FIG. 16B. Accordingly, this video file is played back. Regarding which portion of this video file will be played back, the playback start frame is stored in the field of "state information" in the operation information database 8 shown in FIG. 15, and the video of the playback start frame corresponding to time t at which the robot system 1 temporarily stops operating in the state S5 is played back.

(State S5→State S6 or State S7)

Then, as shown in FIG. 8B, if the height of the connecting portion 3c of the care belt 3 fixed on the patient 7 does not match that of the connecting portion 4g of the arm mechanism 4, the height of the connecting portion 4g is adjusted. In the example shown in FIG. 8B, since it is necessary to move the connecting portion 4g of the arm mechanism 4 upward, the helper 18 or the patient 7 presses the up button 6b of the input IF 6 so as to adjust the height of the connecting portion 4g.

The height is adjusted, for example, in accordance with the operation information database 8 shown in FIG. 15. FIG. 7 illustrates the path of the movement of the connecting portion 4g. At time t1 at which the progress information is "1" in FIG. 15, if the helper 18 or the patient 7 presses the up button 6b to adjust the height of the connecting portion 4g, the connecting portion 4g starts to move upward in the path shown in FIG. 7, that is, toward time t2 in FIG. 15 (downward in the table in FIG. 15). If the helper 18 or the patient 7 presses the down button 6c to adjust the height of the connecting portion 4g, the connecting portion 4g starts to move downward in the path shown in FIG. 7, that is, toward time t0 in FIG. 15 (upward in the table in FIG. 6). In this manner, the controller 12 controls the driving of the arm mechanism 4 to adjust the height of the connecting portion 4g. In the example shown in FIG. 8B, it is necessary to move the connecting portion 4g of the arm mechanism 4 upward. Accordingly, as a result of the helper 18 or the patient 7 pressing the up button 6b of the input IF 6, the controller 12 controls the driving of each of the first and second motors 41 and 42 separately so that the arm mechanism 4 will follow the path of the connecting portion 4g shown in FIG. 7 to move along the path upward.

Figure 18B:
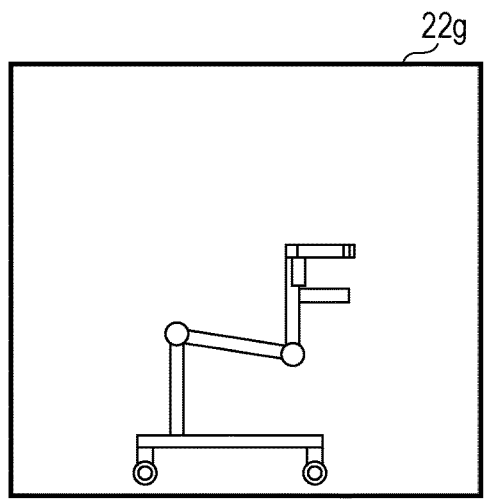
FIGS. 18B through 18D illustrate an example of video displayed on the input IF in the second embodiment.
Figure 18C:
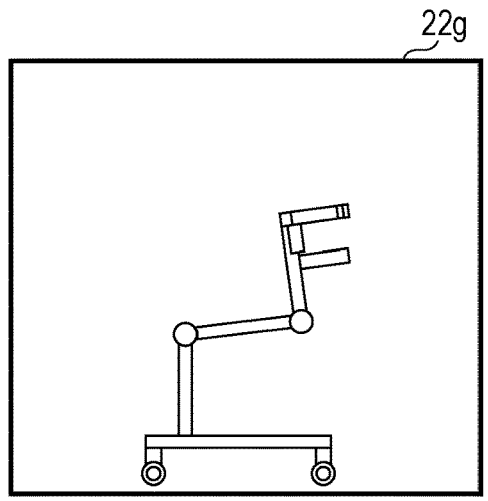
Figure 18D:
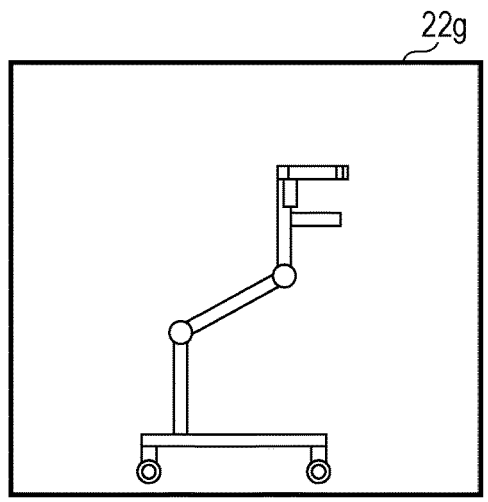
Figure 19A:
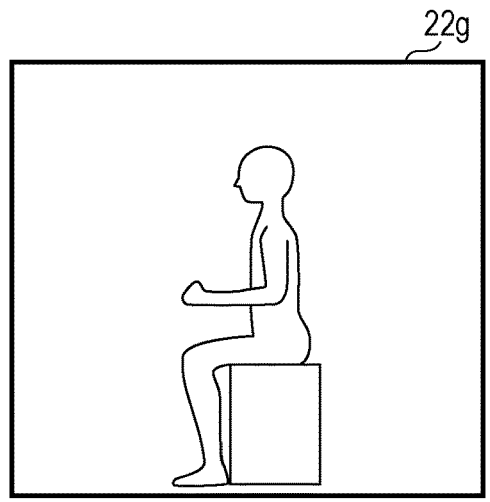
FIGS. 19A through 19C illustrate another example of video displayed on the input IF in the second embodiment.
Figure 19B:
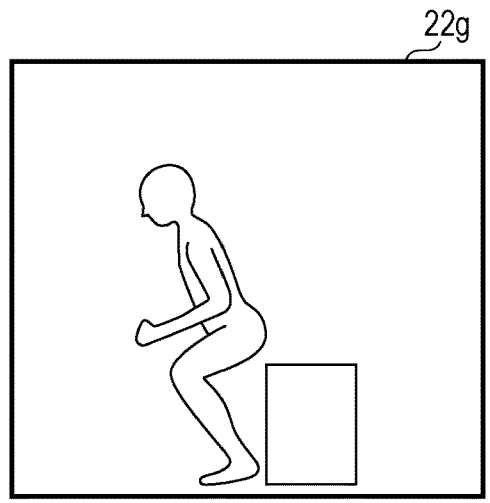
Figure 19C:
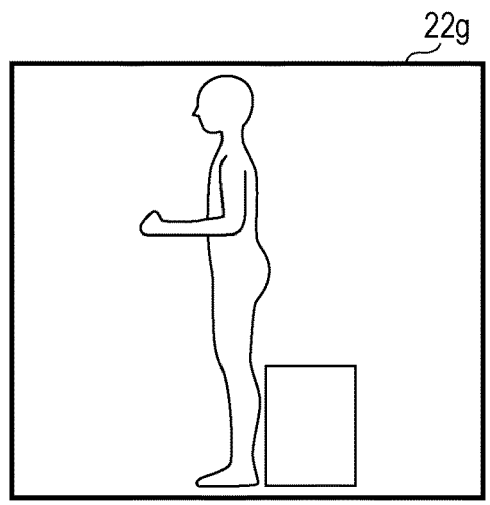
Figure 20A:
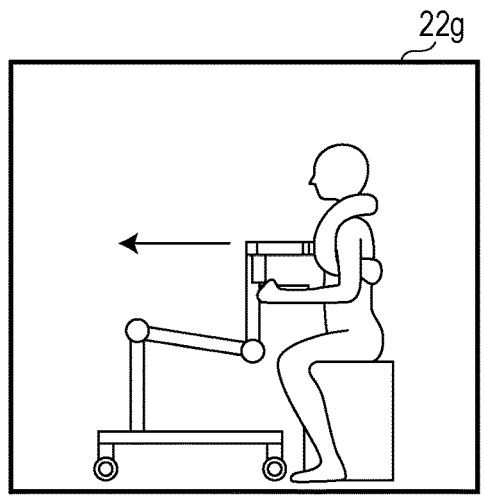
FIGS. 20A through 20C illustrate another example of video displayed on the input IF in a modified example of the second embodiment.
Figure 20B:
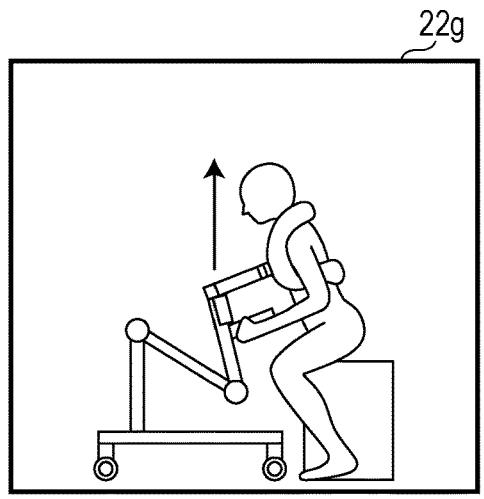
Figure 20C:
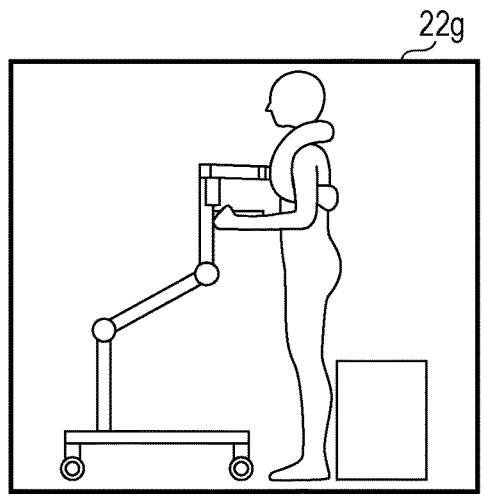

When the helper 18 or the patient 7 releases the up button 6b upon completion of the adjustment of the height of the connecting portion 4g at a certain position, the arm mechanism 4 stops at this position. If the helper 18 or the patient 7 presses the up button 6b in the state S5, the operating state manager 21 manages the operating state of the robot system 1 so that the state S5 will shift to the state S6. If the helper 18 or the patient 7 releases the up button 6b in the state S6, the operating state manager 21 manages the operating state of the robot system 1 so that the state S6 will shift to the state S5. The state S6 is a state in which the arm mechanism 4 moves up. If the helper 18 or the patient 7 presses the down button 6c in the state S5, the operating state manager 21 manages the operating state of the robot system 1 so that the state S5 will shift to the state S7. If the helper 18 or the patient 7 releases the down button 6c in the state S7, the operating state manager 21 manages the operating state of the robot system 1 so that the state S7 will shift to the state S5. The state S7 is a state in which the arm mechanism 4 moves down. In accordance with the transition of the operating state, the controller 12 updates the operating state database 23 via the database input/output unit 9. More specifically, the controller 12 sets the progress information concerning the state ID of the current state to be "1" and sets the progress information concerning the other state IDs to be "0". In the operating state database 23, the input IF receive/reject information concerning both of the state S6 and the state S7, as well as that of the state S5, is (1,0,1,1,1). Accordingly, input from the ON/OFF button 6a, the up button 6b, the down button 6c, and the emergency stop button 24 will be received by the controller 12, while input from the initial position shift button 6e will not be received by the controller 12. More specifically, if the ON/OFF button 6a, the up button 6b, the down button 6c, or the emergency stop button 24 is pressed by the helper 18 or the patient 7, the controller 12 receives input from the pressed button and performs control. If the initial position shift button 6e is pressed by the helper 18 or the patient 7, the controller 12 does not perform any control without receiving input from this button. The indicator information concerning the state ID S6 and that concerning the state ID S7 in the operating state database 23 are (1,0,1,1,1,ID6) and (1,0,1,1, 1,ID7), respectively. The operating state manager 21 supplies this indicator information to the indicators 22 via the controller 12, so that the ON/OFF button lamp 22a, the up button lamp 22b, and the down button lamp 22c will be turned ON and that the initial position shift button lamp 22e will be turned OFF, as indicated in the state S6 and the state S7 in FIG. 17. This enables the helper 18 or the patient 7 to visually check from which buttons an instruction will be received by the controller 12. When the helper 18 or the patient 7 has released the up button 6b or the down button 6c, the controller 12 stops performing control, and updates the progress information in the operation information database 8 corresponding to the time at which the up operation or the down operation started from "1" to "0", and updates the progress information corresponding to the time at which the arm mechanism 4 stopped moving from "0" to "1". FIG. 8B shows the robot system 1 (for example, the initial position P0 in FIG. 7) before the height of the arm mechanism 4 is adjusted, while FIG. 8C shows the robot system 1 (for example, the position P1 in FIG. 7) after the height of the arm mechanism 4 is adjusted. The indicator information concerning the ID number "ID6" of the state S6 and that concerning the ID number "ID7" of the state S7 are file names of video files, as shown in FIG. 16B. Accordingly, these video files are played back. Regarding which portions of these video files will be played back, the playback start frames are stored in the field of "state information" in the operation information database 8 shown in FIG. 15. The playback start frames are played back in accordance with the operation of the arm mechanism 4. By changing the video indicated by the file name of a video file, the operation of the arm mechanism 4 may be displayed, as shown in FIGS. 18B through 18D, or the state of the patient 7 may be displayed, as shown in FIGS. 19A through 19C. Alternatively, both of the operation of the arm mechanism 4 and the state of the patient 7 may be displayed, as shown in FIGS. 20A through 20C.

As a result of adjusting the height of the arm mechanism 4, the height of the connecting portion 3*c* of the care belt 3 and that of the connecting portion 4*g* of the arm mechanism 4 match each other, as shown in FIG. 8C.

Then, as shown in FIG. 8D, the helper 18 or the patient 7 connects the connecting portion 3*c* of the care belt 3 and the connecting portion 4*g* of the arm mechanism 4. In this case, the helper 18 may attach the input IF 6 to the arm mechanism 4 to let the patient 7 operate the input IF 6 to perform the subsequent operations alone. Alternatively, the helper 18 may continue to operate the input IF 6 without attaching the input IF 6 to the arm mechanism 4.

Then, as shown in FIG. 9A, the patient 7 starts standing up from a sitting posture in which the patient 7 is sitting on the seat 5. When the helper 18 or the patient 7 presses the up button 6*b* of the input IF 6, the arm mechanism 4 starts to move upward (stand operation) together with the patient 7 along the path of the connecting portion 4*g* in FIG. 7, as shown in FIGS. 9B through 9D.

Then, when the arm mechanism 4 has reached, together with the patient 7, the end position of the stand operation, it stops moving at this end position as a result of the helper 18 or the patient 7 releasing the up button 6*b*. The controller 12 updates the progress information in the operation information database 8 corresponding to the time at which the up operation started from "1" to "0", and updates the progress information corresponding to the time at which the arm mechanism 4 stopped moving at the end position from "0" to "1". In a manner similar to the above-described adjustment of the height of the arm mechanism 4, in the stand operation, the up button 6*b* is used, and the state S5 shifts to the state S6. Accordingly, an explanation of details of the stand operation will be omitted.

Then, after the patient 7 has stood up from the seat 5 such as a bed, the front-wheel brakes 14*c* and the rear-wheel brakes 14*d* are released in the state in FIG. 9E, and the patient 7 applies force toward the front side (for example, toward the left side in FIG. 9E) so as to rotate the front wheels 14*a* and the rear wheels 14*b* of the walking mechanism 14. In this manner, the walking mechanism 14 serves as a walker to assist the patient 7 in walking.

The robot 20 also assists the patient 7 in sitting down on the seat 5 such as a toilet seat.

As shown in FIG. 10A, the patient 7 starts to sit down from a standing posture in which the patient 7 is standing in front of the seat 5. When the helper 18 or the patient 7 presses the down button 6*c* of the input IF 6, the arm mechanism 4 starts to move down (sit operation), and when the helper 18 or the patient 7 releases the down button 6*c* at a certain position, the arm mechanism 4 stops moving at this position. In the sit operation, if the arm mechanism 4 starts to move suddenly, the patient 7 may have the buttocks 7*e* hit the seat 5 and may break a bone. In order to avoid such a situation, the robot 20 assists the patient 7 in being in a secure posture so as not to let the patient 7 fall down. Additionally, for adjusting the position of the patient 7 on the seat 5, the arm mechanism 4 can stop moving at a position at which the helper 18 or the patient 7 releases the down button 6*c*.

As a result of the helper 18 or the patient 7 pressing the down button 6*c* of the input IF 6, as shown in FIG. 10A, the controller 12 sequentially controls the operation of the arm mechanism 4 in accordance with the position information in the operation information database 8 in FIG. 15 in a direction upward from the position at which the progress information is "1".

For example, the controller 12 reads the operation information concerning the operation of the arm mechanism 4 for moving downward from the stand position P2 in FIG. 7 from the operation information database 8, and controls the operation of the arm mechanism 4 so that the arm mechanism 4 will follow the path of the connecting portion 4*g* shown in FIG. 7. The arm mechanism 4 moves downward and toward the front side, as in the movement from the state in FIG. 10A to the state in FIG. 10B, and when the patient 7 finishes sitting down on the seat 5, as shown in FIG. 10C, the helper 18 or the patient 7 releases the down button 6*c*. In a manner similar to the stand operation, the controller 12 updates the progress information in the operation information database 8 corresponding to the time at which the arm mechanism 4 stopped moving from "0" to "1".

The up button 6*b* and the down button 6*c* of the input IF 6 may be pressed or released at any position. For example, the patient 7 starts to sit down on the toilet seat, together with the arm mechanism 4, from the position in FIG. 10A, and, at the position shown in FIG. 10B, the helper 18 or the patient 7 releases the down button 6*c* to stop moving the arm mechanism 4. Then, while the buttocks 7*e* of the patient 7 are being elevated from the toilet seat, the patient 7 takes off underwear, and then, the helper 18 or the patient 7 presses the down button 6*c* again to move down the arm mechanism 4 so that the patient 7 can sit down on the toilet seat. When standing up from the toilet seat, if the patient 7 wishes to adjust the height after stopping moving up the arm mechanism 4 at a certain position, the helper 18 or the patient 7 may press the up button 6*b* or the down button 6*c* to adjust the height.

In a manner similar to the above-described adjustment of the height of the arm mechanism 4, in the sit operation, the operating state manager 21 manages the operating state of the robot system 1 so that the state S5 will shift to the state S6 or the state S7 as a result of the helper 18 or the patient 7 pressing the up button 6*b* or the down button 6*c*. The transition from the state S5 to the state S6 or the state S7 is similar to that in the above-described adjustment of the height of the arm mechanism 4, and an explanation thereof will thus be omitted.

When the helper 18 or the patient 7 presses the initial position shift button 6*e*, the up button 6*b*, or the down button 6*c*, the arm mechanism 4 may start moving suddenly. In order to avoid such a situation, the controller 12 may change the time t to be longer (for example, twice as long) for a certain period of time (for example, three seconds) so as to decelerate the operating speed of the robot system 1.

While the helper 18 or the patient 7 is pressing the up button 6*b*, the controller 12 may perform control so that input from the down button 6*c* will not be received or so that the arm mechanism 4 will stop moving immediately. Similarly, while the helper 18 or the patient 7 is pressing the down button 6*c*, the controller 12 may perform control so that input from the up button 6*b* will not be received or so that the arm mechanism 4 will stop moving immediately. If the controller 12 performs control so that the arm mechanism 4 will stop moving immediately, when the helper 18 or the patient 7 releases the up button 6*b* or the down button 6*c*, the arm mechanism 4 may restart to move suddenly. In order to avoid such a situation, the controller 12 performs control so that input from the up button 6b or the down button 6c will be received again after the helper 18 or the patient 7 has released both of the up button 6b and the down button 6c.
(Emergency Stop Button (State S92→State S8))

Since the input IF receive/reject information for the emergency stop button 24 concerning all the states S1 through S8 in the operating state database 23 is "1", the emergency stop button 24 can be pressed in the state S92, that is, in all the states S1 through S7 other than the state S8. If the emergency stop button 24 is pressed by the helper 18 or the patient 7, the operating state manager 21 manages the operating state of the robot system 1 so that one of the states S1 through S7 will shift to the state S8. As discussed in the first embodiment, the state S8 is a holding state. If the robot 20 is operating in the state S92, it stops at a position at which the state S92 has shifted to the state S8. In the state S8, the input IF receive/reject information concerning the state ID S8 in the operating state database 23 is (1,0,0,0,1). Accordingly, input from the ON/OFF button 6a and the emergency stop button 24 will be received by the controller 12, while input from the initial position shift button 6e, the up button 6b, and the down button 6c will not be received by the controller 12. The operating state manager 21 supplies the above-described input IF receive/reject information to the controller 12, so that the controller 12 can perform control regarding whether or not to receive input from the input IF 6. The indicator information concerning the state ID S8 in the operating state database 23 is (0,0,0,0,0,ID8). The operating state manager 21 supplies this indicator information to the indicators 22 via the controller 12. Accordingly, all the lamps 22a, 22e, 22b, and 22c of the input IF 6 are turned OFF, as indicated in the state S8 in FIG. 17. The indicator information concerning the ID number "ID8" of the state S8 is "emergency stop", as shown in FIG. 16B. Accordingly, as indicated in the state S8 in FIG. 17, characters "emergency stop" are displayed on the state indicator 22g.

As a result of turning OFF the emergency stop button 24, the operating state manager 21 manages the operating state of the robot system 1 so that the state S8 will shift to the state S2. As described above, the state S92 is one of the states S1 through S7 other than the state S8. After the state S2, the arm mechanism 4 may shift to the initial position P0 as a result of the helper 18 or the patient 7 turning ON the initial position shift button 6e, and the robot system 1 is able to assist the patient 7 in standing up or sitting down again, as described above.
(ON/OFF Button OFF (State S91→State S1))

Since the input IF receive/reject information for the ON/OFF button 6a concerning all the states S1 through S8 in the operating state database 23 is "1", the ON/OFF button 6a can be pressed in the state S91, that is, in all the states S2 through S8 other than the state S1. Accordingly, if the ON/OFF button 6a is turned OFF by the helper 18 or the patient 7, the supply of power is terminated. For example, the operating state manager 21 manages the operating state of the robot system 1 so that the robot system 1 will shift to the state S1 in which the arm mechanism 4 is collapsed for storage, as shown in FIG. 8A. In the state S1, the input IF receive/reject information concerning the state ID S1 in the operating state database 23 is (1,0,0,0,1). Accordingly, input from the ON/OFF button 6a and the emergency stop button 24 will be received by the controller 12, while input from the initial position shift button 6e, the up button 6b, and the down button 6c will not be received by the controller 12. The operating state manager 21 supplies the above-described input IF receive/reject information to the controller 12, so that the controller 12 can perform control regarding whether or not to receive input from the input IF 6. The indicator information concerning the state ID S1 in the operating state database 23 is (0,0,0,0,0,ID1). Accordingly, the operating state manager 21 supplies this indicator information to the indicators 22 via the controller 12 to instruct the indicators 22 to turn OFF all the lamps 22a, 22e, 22b, and 22c of the input IF 6 shown in FIG. 18A, as indicated in the state S1 in FIG. 17. Since the indicator information concerning the ID number "ID1" is "0", as shown in FIG. 16B, information is not displayed on the state indicator 22g, as indicated in the state S1 in FIG. 17. In the state S1, if the ON/OFF button 6a is pressed again, the operating state manager 21 manages the operating state of the robot system 1 so that the state S1 will shift to the state S2.
(Advantages of Second Embodiment)

In the sit-to-stand and/or stand-to-sit assist system of the second embodiment, in addition to the advantages obtained by the first embodiment, the following advantages are achieved.

In one scene where the robot system 1 is utilized, the helper 18 may control the operation of the robot 20 by using the input IF 6 at a remote place from the patient 7. In such a scene, an instruction received by the input IF 6 is wirelessly transmitted to the controller 12 disposed within the robot 20.

In a case where the helper 18 controls the operation of the robot 20 by using the input IF 6 in a remote place from the patient 7, it is in most cases difficult for the helper 18 to check the execution state of a drive pattern executed by the arm mechanism 4.

In the second embodiment, the controller 12 performs control so that the execution state (for example, the operating state) acquired by the operating state manager 21 will be indicated on the state indicator 22g of the indicators 22. Accordingly, the state of the robot system 1 is managed by the operating state manager 21 in accordance with the operation for standing up or sitting down, and in accordance with the state of the robot system 1, the operating state, such as the operation of the robot 20 or the state of the patient 7, is displayed on the state indicator 22g of the input IF 6. Thus, even when remote operation is performed by using the input IF 6 (remote controller) by means of wireless communication, a user friendly operation interface (input IF 6) can be provided. With this configuration, even in a case in which the helper 18 remotely controls the operation of the robot 20, the helper 18 is able to easily check the execution state of the arm mechanism 4. As the execution state (for example, the operating state) to be indicated in the state indicator 22g, recorded images or video may be used, instead of real-time images or video. The use of real-time images or video will be discussed in a modified example, which will be discussed later.

Third Embodiment

Figure 21:
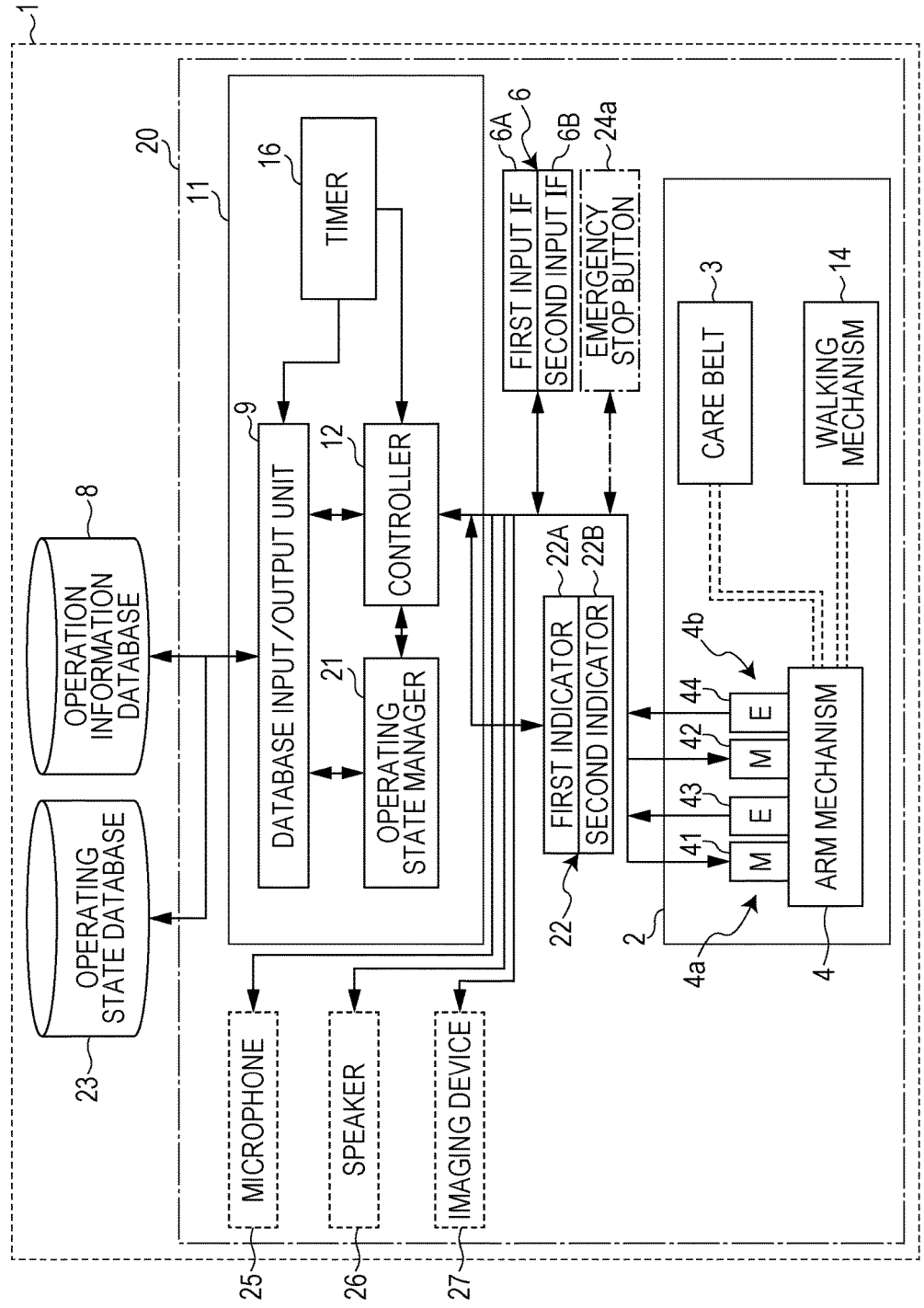
FIG. 21 is a block diagram illustrating an example of the detailed configuration of a robot system according to a third embodiment of the present disclosure.

In a third embodiment, as well as in the second embodiment, an instruction received by the input IF 6 is wirelessly transmitted to the controller 12. Additionally, in the third embodiment, the controller 12 performs control so that the state of the patient 7 based on the execution state acquired by the operating state manager 21 will be indicated on the state indicator 22g. In the third embodiment, as shown in FIG. 21, the input IF 6 is constituted by a first input IF 6A, which is an example of a first instruction input device, and a second input IF 6B, which is an example of a second instruction input device. The first input IF 6A receives a third instruction that causes the arm mechanism 4 to execute a first instruction input from the first input IF 6A with higher priority than a second instruction input from the second input IF 6B. When the third instruction is received from the first input IF 6A, the controller 12 performs control so that the arm mechanism 4 will not execute the second instruction even if the second instruction is input from the second input IF 6B.

As in the first embodiment, the robot system 1 of the third embodiment includes a robot 20 and an operation information database 8 and an operating state database 23 outside the robot 20, as shown in FIG. 21.

The robot 20 is placed on the floor 13. The robot 20 includes a main body mechanism 2, which is an example of a drive mechanism, a control device 11, the input IF 6 (the first input IF 6A operated by the patient 7 and the second input IF 6B operated by the helper 18), which is an example of an instruction input device, an operating state manager 21, which is an example of a state acquirer, and a controller 12.

The main body mechanism 2 includes an arm mechanism 4, a care belt 3, which is an example of a holding mechanism, and a walking mechanism 14. The main body mechanism 2 may not necessarily include the walking mechanism 14. The arm mechanism 4 at least includes a robot arm, which is an example of a pulling mechanism.

The third embodiment is similar to the first embodiment, except for the indicators 22, the operation information database 8, the operating state database 23, the operating state manager 21, and the controller 12 and except that the controller 12 and the input IF 6 wirelessly communicate with each other. Thus, an explanation of portions of the third embodiment similar to the first embodiment will be omitted. In the first embodiment, the controller 12 and the input IF 6 may communicate with each other via a wired or a wireless medium. On the other hand, in the third embodiment, the controller 12 and the first and second input IFs 6A and 6B communicate with each other via a wireless medium.

(First and Second Input IFs 6A and 6B and Emergency Stop Button 24)

Figure 22:
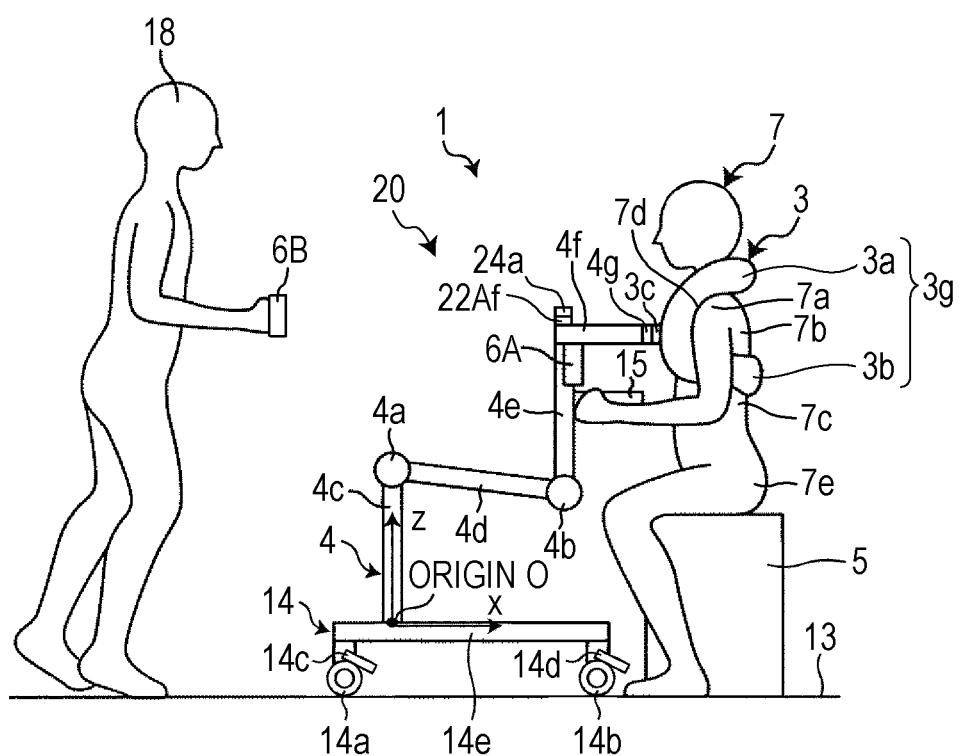
FIG. 22 is a side view illustrating an example of the overall configuration of a robot system, together with a patient and a helper, as a sit-to-stand and/or stand-to-sit assist system (sit-to-stand and/or stand-to-sit assist apparatus) according to the third embodiment.
Figure 23A:
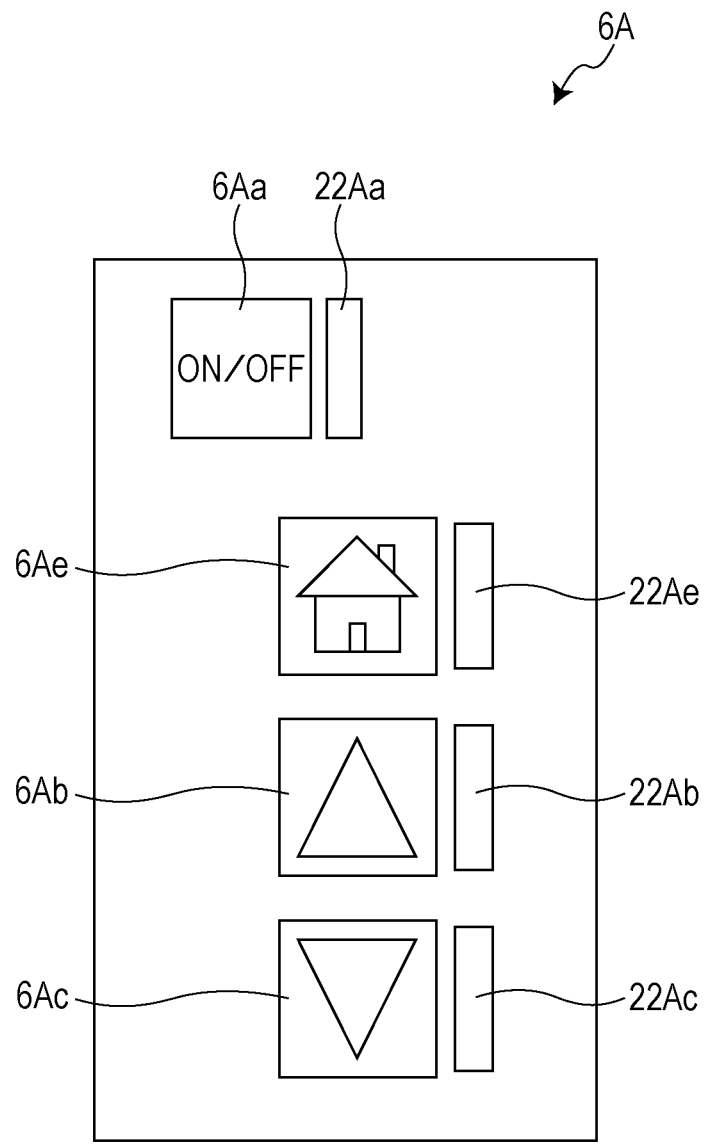
FIGS. 23A and 23B schematically illustrate a first input IF for a patient and a second input IF for a helper, respectively, in the third embodiment.

As shown in FIG. 22, at the front portion of the fourth arm 4f, an input interface (for example, the first input IF 6A), such as a console panel, on which buttons are provided, protrudes downward. The first input IF 6A is an input IF for a patient 7. By providing the first input IF 6A at this position, the patient 7 in a sitting posture is able to operate the first input IF 6A from a side of the arm mechanism 4. The first input IF 6A receives input of an instruction to stand up (for example, a first instruction) to execute a drive pattern for assisting the patient 7 in standing up and input of an instruction to sit down (for example, a second instruction) to execute a drive pattern for assisting the patient 7 in sitting down. A specific example of the first input IF 6A is shown in FIG. 23A. The first input IF 6A has an ON/OFF button 6Aa for powering the robot system 1 ON or OFF (for example, when the button 6Aa is pressed, the robot system 1 is powered ON, and the when the button 6Aa is released, the robot system 1 is powered OFF), an up button 6Ab used for assisting the patient 7 in standing up, a down button 6Ac used for assisting the patient 7 in sitting down, and an initial position shift button 6Ae for shifting the arm mechanism 4 to the initial position.

An emergency stop button 24a mainly used by the patient 7 is an example of an emergency stop instruction input device. The emergency stop button 24a is provided on the fourth arm 4f (for example, at the front end of the fourth arm 4f) of the arm mechanism 4, as shown in FIG. 22. The patient 7 can press the emergency stop button 24a when wishing to stop the operation of the robot system 1. Under the control of the controller 12, the emergency stop button 24a receives input of an instruction to stop the operation of the arm mechanism 4 and to maintain the state of the arm mechanism 4 when it has stopped operating. Specifically, when the emergency stop button 24a is pressed, the robot system 1 enters the emergency stop state, and the emergency stop button 24a remains ON (remains being pressed). In the emergency stop state, if the emergency stop button 24a which remains being pressed is rotated, it is turned OFF, so that the emergency stop state can be canceled. After the emergency stop state obtained by pressing the emergency stop button 24a is canceled, under the control of the controller 12, the arm mechanism 4 is shifted to the initial position at which it is connected to the connecting portion 3c of the care belt 3, and then, input of an instruction using the input IF 6 can be received. In this example, the emergency stop button 24a is provided on the arm mechanism 4. However, the emergency stop button 24a may be provided on the first input IF 6A or may be provided on each of the arm mechanism 4 and the first input IF 6A.

Figure 23B:
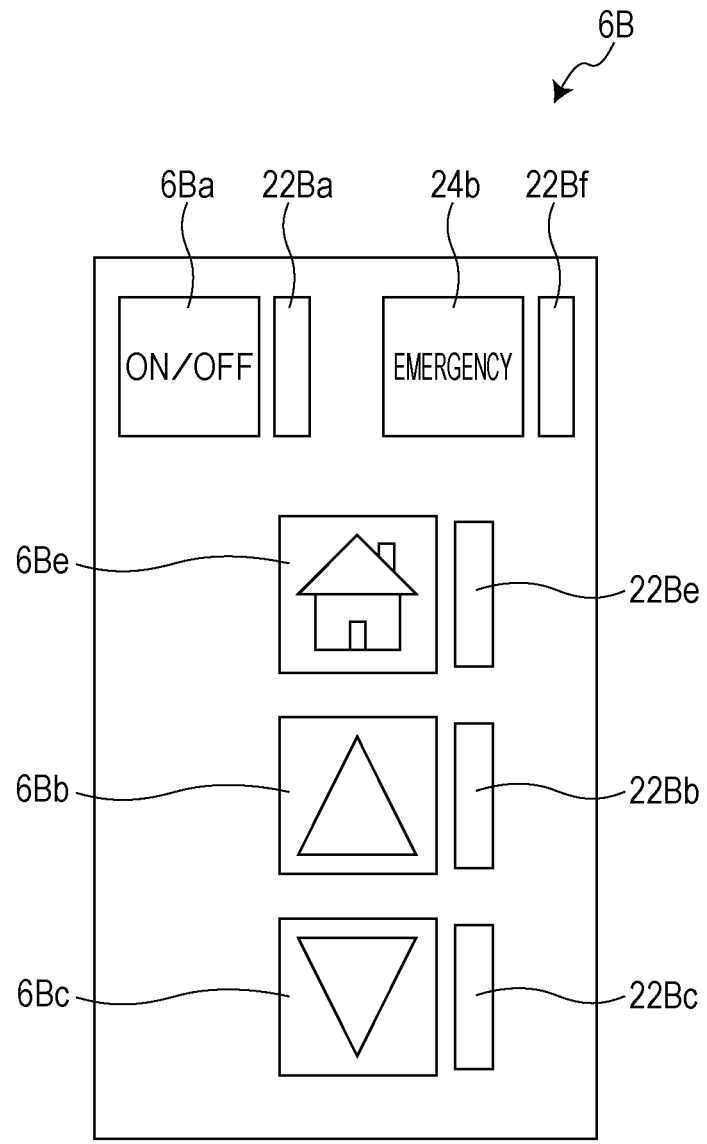

As shown in FIGS. 22 and 23B, an input interface (for example, the second input IF 6B) for a helper 18, such as a console panel, on which buttons are provided, can be held and operated by the helper 18. The second input IF 6B has an ON/OFF button 6Ba for powering the robot system 1 ON or OFF (for example, when the button 6Ba is pressed, the robot system 1 is powered ON, and the when the button 6Ba is released, the robot system 1 is powered OFF), an up button 6Bb used for assisting the patient 7 in standing up, a down button 6Bc used for assisting the patient 7 in sitting down, an initial position shift button 6Be for shifting the arm mechanism 4 to the initial position, and an emergency stop button 24b. In this example, the second input IF 6B is held and operated by the helper 18. However, the second input IF 6B may be fixed to the arm mechanism 4.

(Indicators 22)

The indicators 22 indicate, under the control of the controller 12, whether or not input of instructions can be received. The indicators 22 are constituted by a first indicator 22A provided in the first input IF 6A and a second indicator 22B provided in the second input IF 6B. Specifically, the indicators 22 indicate whether or not input from each of the first and second input IFs 6A and 6B and the emergency stop buttons 24a and 24b can be received. For example, in the first input IF 6A shown in FIG. 23A, an ON/OFF button lamp 22Aa, an up button lamp 22Ab, a down button lamp 22Ac, and an initial position shift button lamp 22Ae are provided. Similarly, in the second input IF 6B shown in FIG. 23B, an ON/OFF button lamp 22Ba, an up button lamp 22Bb, a down button lamp 22Bc, and an initial position shift button lamp 22Be are provided. An emergency stop button lamp 22Af shown in FIG. 22 is provided next to the emergency stop button 24a at the front end of the arm mechanism 4. In the second input IF 6B, an emergency stop button lamp 22Bf is provided next to the emergency stop button 24b. If input of instructions from the buttons 6Aa, 6Ab, 6Ac, and 6Ae of the first input IF 6A and buttons 6Ba, 6Bb, 6Bc, and 6Be of the second input IF 6B and the emergency stop buttons 24a and 24b is received, the corresponding lamps are turned ON. If input of instructions from these buttons is not received, the corresponding lamps are turned OFF.

(Operating State Manager 21 and Controller 12)

The controller 12 decides, based on the operating state acquired by the operating state manager 21, whether or not an instruction input and received from the first input IF 6A or the second input IF 6B will be executed by the arm mechanism 4, and controls the arm mechanism 4 in accordance with the decision result. More specifically, the controller 12 controls the arm mechanism 4, based on an instruction input from the first input IF 6A or the second input IF 6B or a command input from the timer 16 or information concerning the operating state acquired by the operating state manager 21. The controller 12 also controls the operation of the operating state manager 21 and the indicators 22. If the controller 12 receives input of an instruction to sit down from the first input IF 6A or the second input IF 6B when the operating state acquired by the operating state manager 21 indicates that the arm mechanism 4 is executing the drive pattern for standing up, the controller 12 controls the arm mechanism 4 so that the arm mechanism 4 will not execute the drive pattern for sitting down. Conversely, if the controller 12 receives input of an instruction to stand up from the first input IF 6A or the second input IF 6B when the operating state acquired by the operating state manager 21 indicates that the arm mechanism 4 is executing the drive pattern for sitting down, the controller 12 controls the arm mechanism 4 so that the arm mechanism 4 will not execute the drive pattern for standing up.

As in the first and second embodiments, the operating state manager 21 acquires the execution state (for example, the operating state) of a drive pattern executed by the arm mechanism 4. More specifically, the operating state manager 21 decides the operating state (for example, the state) of the arm mechanism 4, based on an instruction from the first input IF 6A or the second input IF 6B or the emergency stop button 24a or 24b, and stores the decided operating state in the operating state database 23 and informs the controller 12 of the operating state via the database input/output unit 9.

There are the following three modes (1) through (3) in which input of an instruction from the first input IF 6A for a patient and that from the second input IF 6B for a helper are received by the controller 12.

(1) In an input interface for a helper (for example, the second input IF 6B) and an input interface for a patient (for example, the first input IF 6A), input from a button which is first pressed is received with higher priority. In other words, in the case of the mode (1), one of the first and second input IFs 6A and 6B receives a third instruction that causes the arm mechanism 4 to execute a first instruction input from this input IF 6A or 6B with higher priority than a second instruction input from the other one of the first and second input IFs 6A and 6B. In this case, when the third instruction is received from one of the first and second input IFs 6A and 6B, the controller 12 performs control so that the arm mechanism 4 will not execute a second instruction even if the second instruction is input from the other one of the first and second input IFs 6A and 6B.

(2) Input from the second input IF 6B for a helper is received with higher priority. In other words, in the case of the mode (2), the second input IF 6B for a helper receives a third instruction that causes the arm mechanism 4 to execute a first instruction input from the second input IF 6B with higher priority than a second instruction input from the first input IF 6A.

(3) Input from the first input IF 6A for a patient or that from the second input IF 6B for a helper can be received after instructions from both of the first and second input IFs 6A and 6B are input.

The above-described modes (1) through (3) will be described in detail.

((1) Mode in which Input from a Pressed Button is Received with Higher Priority)

When one of the ON/OFF buttons 6Aa and 6Ba and the emergency stop buttons 24a and 24b is pressed, the controller 12 receives input from a pressed button.

Figure 25:
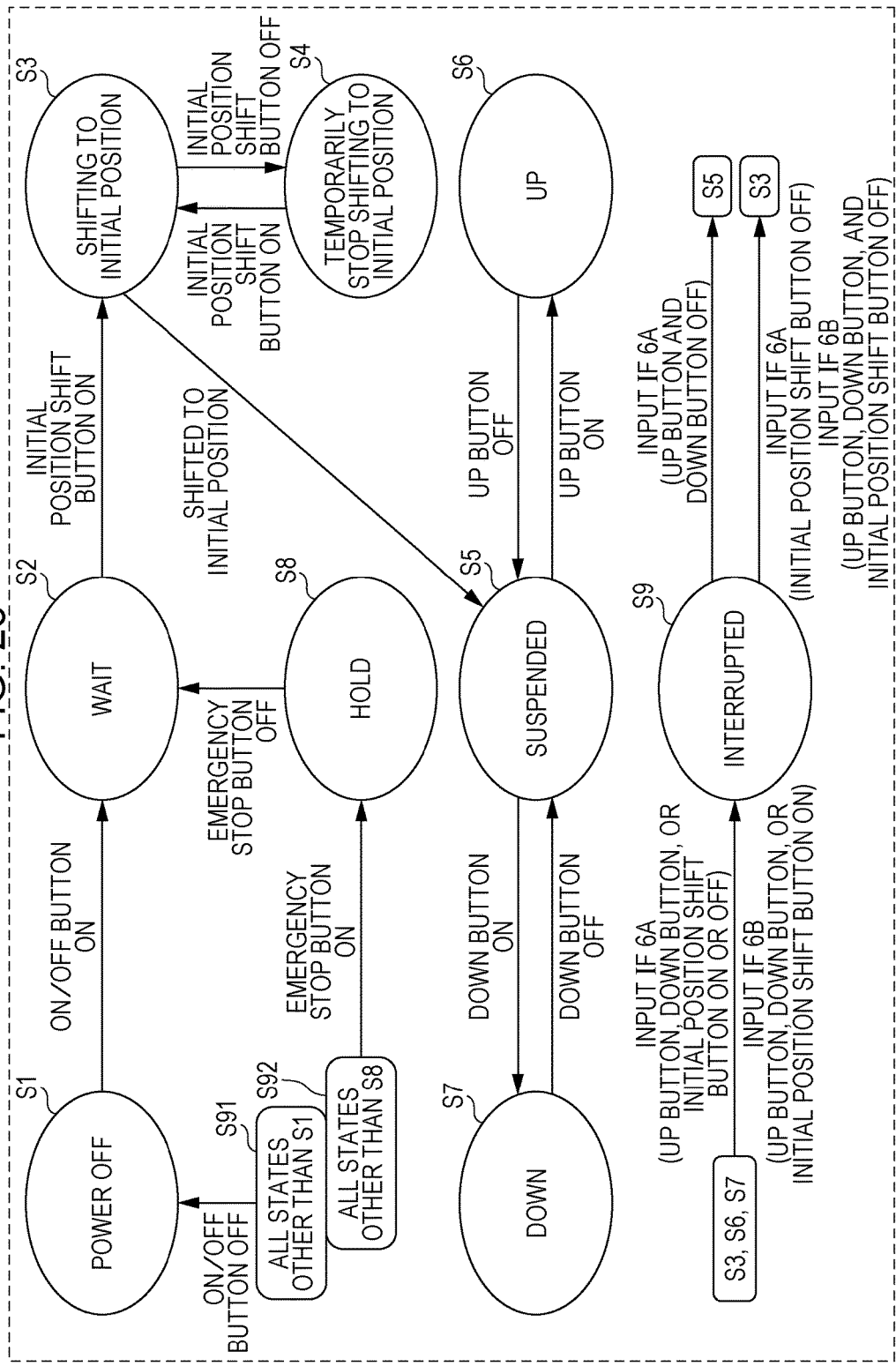
FIG. 25 is a diagram illustrating the transition of the state of the controller in the third embodiment.

In one example, if the ON/OFF button 6Aa of the first input IF 6A is pressed in the state S1 in FIG. 25, the controller 12 receives input from the ON/OFF button 6Aa, and, as in the first embodiment, the operating state manager 21 manages the operating state of the robot system 1 so that the state S1 will shift to the state S2. In this case, under the control of the controller 12, the ON/OFF button lamps 22Aa and 22Ba and the initial position shift button lamps 22Ae and 22Be of the first and second indicators 22A and 22B of the first and second input IFs 6A and 6B, respectively, are turned ON, as indicated in the state S2 in FIG. 13. If the ON/OFF button 6Ba of the second input IF 6B is pressed in the state S1, the controller 12 receives input from the ON/OFF button 6Ba, and, as in the first embodiment, the operating state manager 21 manages the operating state of the robot system 1 so that the state S1 will shift to the state S2. In this case, under the control of the controller 12, the ON/OFF button lamps 22Aa and 22Ba and the initial position shift button lamps 22Ae and 22Be of the first and second indicators 22A and 22B of the first and second input IFs 6A and 6B, respectively, are turned ON, as indicated in the state S2 in FIG. 13. After the state of the robot system 1 has been shifted as a result of a patient pressing a button of a certain function in the first input IF 6A, if a helper presses a button of the same function in the second input IF 6B, the controller 12 does not shift the state of the robot system 1. If the emergency stop button 24a is pressed, the state shifts to the state S8. In this state, however, input from the emergency stop button 24a will not be received again under the control of the controller 12.

In another example, if the emergency stop button 24a of the first input IF 6A is pressed in one of the states S1 through S8, the controller 12 receives input from the emergency stop button 24a and, as in the first embodiment, the operating state manager 21 manages the operating state of the robot system 1 so that one of the states S1 through S8 will shift to the state S8. In this case, under the control of the controller 12, all the lamps of the first and second indicators 22A and 22B of the first and second input IFs 6A and 6B are turned OFF, as indicated in the state S8 in FIG. 13.

If the emergency stop button 24b of the second input IF 6B is pressed in one of the states S1 through S8, the controller 12 receives input from the emergency stop button 24b and, as in the first embodiment, the operating state manager 21 manages the operating state of the robot system 1 so that one of the states S1 through S8 will shift to the state S8. In this case, under the control of the controller 12, all the lamps of the first and second indicators 22A and 22B of the first and second input IFs 6A and 6B are turned OFF, as indicated in the state S8 in FIG. 13.

Figure 24A:
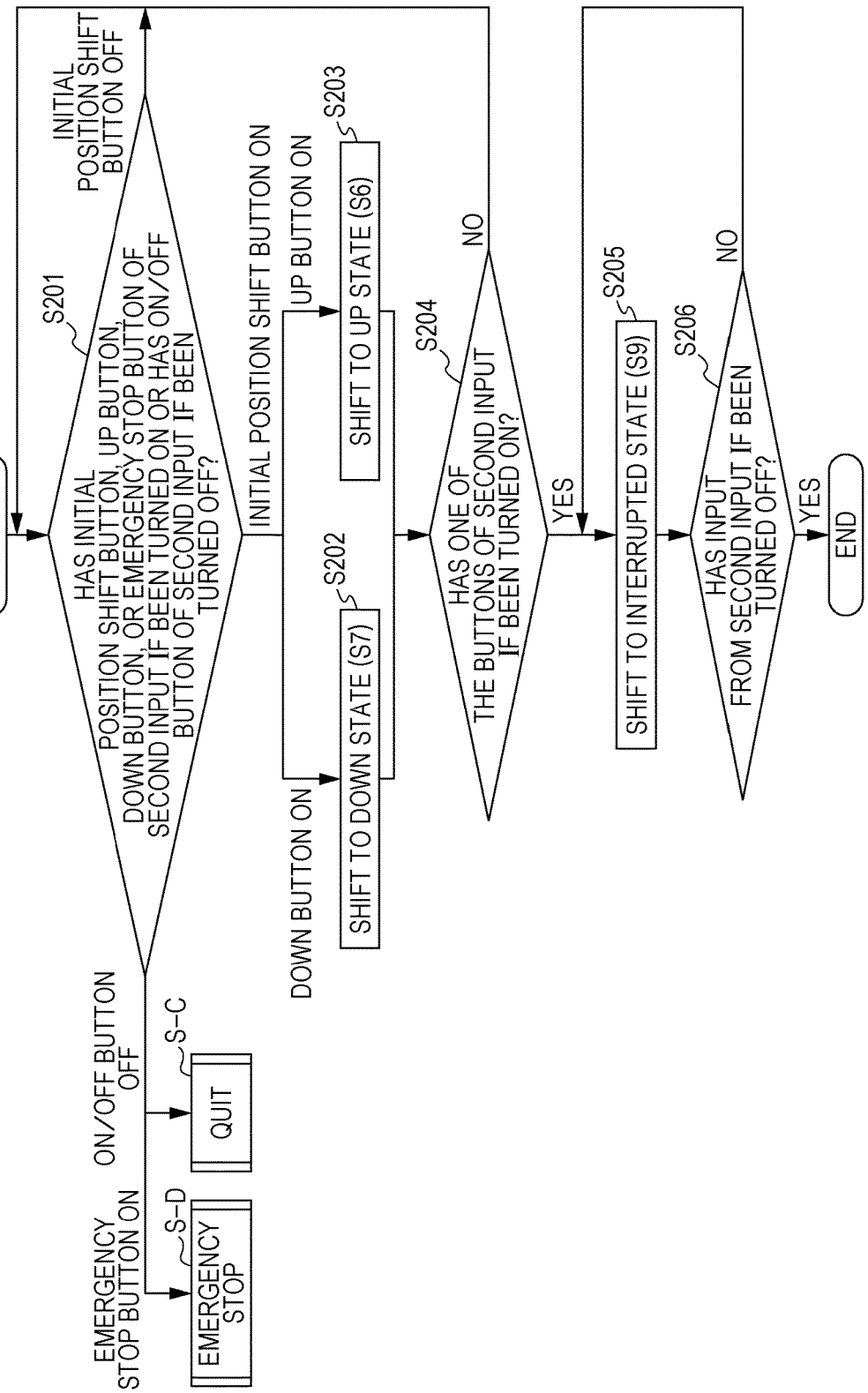
FIG. 24A is a flowchart illustrating an operation when input from the second input IF for a helper is received with higher priority in the third embodiment.

((2) Mode in which Input from the Second Input IF 6B is Received with Higher Priority, See FIG. 24A)

The flowchart of the operation in the mode (2) is shown in FIG. 24A. An example of the state transition diagram of the state of the robot system 1 when the first input IF 6A is pressed (that is, the state transition diagram in the preferential input operation) is shown in FIG. 25.

First, in step S201, the controller 12 determines whether or not the initial position shift button 6Be of the second input IF 6B for a helper is pressed. In step S201, the controller 12 waits for a predetermined time until the initial position shift button 6Be is pressed. During this predetermined time, if the ON/OFF button 6Ba of the second input IF 6B is turned OFF, the controller 12 executes the quit operation S-C. During this predetermined time, if the emergency stop button 24b of the second input IF 6B is turned ON, the controller 12 executes the emergency stop operation S-D. That is, a fourth instruction to stop a drive pattern executed by the arm mechanism 4 can be received by using the first input IF 6A for a patient. If the fourth instruction is received from the first input IF 6A, the controller 12 performs control so that the arm mechanism 4 will not execute another instruction input from the second input IF 6B for a helper.

With this configuration, if an instruction to stop a drive pattern executed by the arm mechanism 4 is received from the first input IF 6A which would not normally be executed with higher priority, the controller 12 does not cause the arm mechanism 4 to execute an instruction input from the second input IF 6B which would normally be executed with higher priority. This makes it possible to prevent the robot 20 from assisting the patient 7 if the patient does not wish.

If the controller 12 determines in step S201 that the initial position shift button 6Be of the second input IF 6B is pressed, the controller 12 determines whether or not the up button 6Bb or the down button 6Bc of the second input IF 6B is pressed. The controller 12 waits in step S201 until the up button 6Bb or the down button 6Bc is pressed.

If the controller 12 determines in step S201 that the down button 6Bc is pressed, the controller proceeds to step S202. In step S202, the operating state manager 21 manages the operating state of the robot system 1 so that the operating state will shift to the state S7. Then, the controller proceeds to step S204.

If the controller 12 determines in step S201 that the up button 6Bb is pressed, the controller proceeds to step S203. In step S203, the operating state manager 21 manages the operating state of the robot system 1 so that the operating state will shift to the state S6. Then, the controller proceeds to step S204.

In step S204, the controller 12 determines whether or not one of the buttons of the second input IF 6B is pressed. If the controller 12 determines that none of the buttons of the second input IF 6B is pressed, it returns to step S201.

If the controller 12 determines in step S204 that one of the buttons of the second input IF 6B is pressed, it proceeds to step S205. In step S205, the operating state manager 21 manages the operating state of the robot system 1 so that the operating state will shift to the state S9 (that is, the interrupted state). When the operating state has shifted to the state S9 in step S205, the above-described operation has been completed.

That is, the controller 12 performs control so that input from the first input IF 6A for a patient will be canceled and so that input from the second input IF 6B for a helper will be received with higher priority. If there is input of an instruction from the second input IF 6B, the controller 12 performs control so that, even if the first input IF 6A is turned ON after being turned OFF, the state S9 will remain the same without shifting to another state. Thereafter, the controller 12 proceeds to step S206.

In step S206, if the second input IF 6B is turned OFF and if the first input IF 6A is turned OFF, the operating state manager 21 manages the operating state under the control of the controller 12 so that the state S9 will shift to the state S5 or the state S3. In this manner, the preferential input operation has been completed, and, under the control of the controller 12, input from the first input IF 6A can be received again.

An example of the preferential input operation is as follows. While the arm mechanism 4 is moving upward as a result of the patient 7 pressing the up button 6Ab of the first input IF 6A (that is, while the state S5 is shifting to the state S6), if the helper 18 presses the up button 6Bb of the second input IF 6B, the operating state manager 21 manages the operating state of the robot system 1 so that the state S6 of the first input IF 6A will shift to the state S9. As a result, input from the up button 6Ab of the first input IF 6A is not received by the controller 12. After the up button 6Bb of the second input IF 6B is turned OFF by the helper 18 and after the up button 6Ab of the first input IF 6A is turned OFF, the operating state manager 21 manages the operating state of the robot system 1 so that the state S9 will shift to the state S5. The operating state database 23 concerning the operating state of the first input IF 6A is shown in FIG. 26. The operating states concerning the states S1 through S8 are similar to those in the first embodiment. The input IF receive/reject information concerning the state ID S9 in the operating state database 23 is (1,0,0,0,1). Accordingly, input only from the ON/OFF button 6Aa of the first input IF 6A and the emergency stop button 24a can be received. The indicator information concerning the state S9 is (1,0,0,0,1). Accordingly, the ON/OFF button lamp 22Aa and the emergency stop button lamp 22Af are turned ON, while the up button lamp 22Ab, the down button lamp 22Ac, and the initial position shift button lamp 22Ae are turned OFF.

As described above, in the mode (2), if the patient 7 operates the arm mechanism 4 inadvertently, priority is given to the helper 18 to operate the arm mechanism 4 over the patient 7.

Figure 24B:
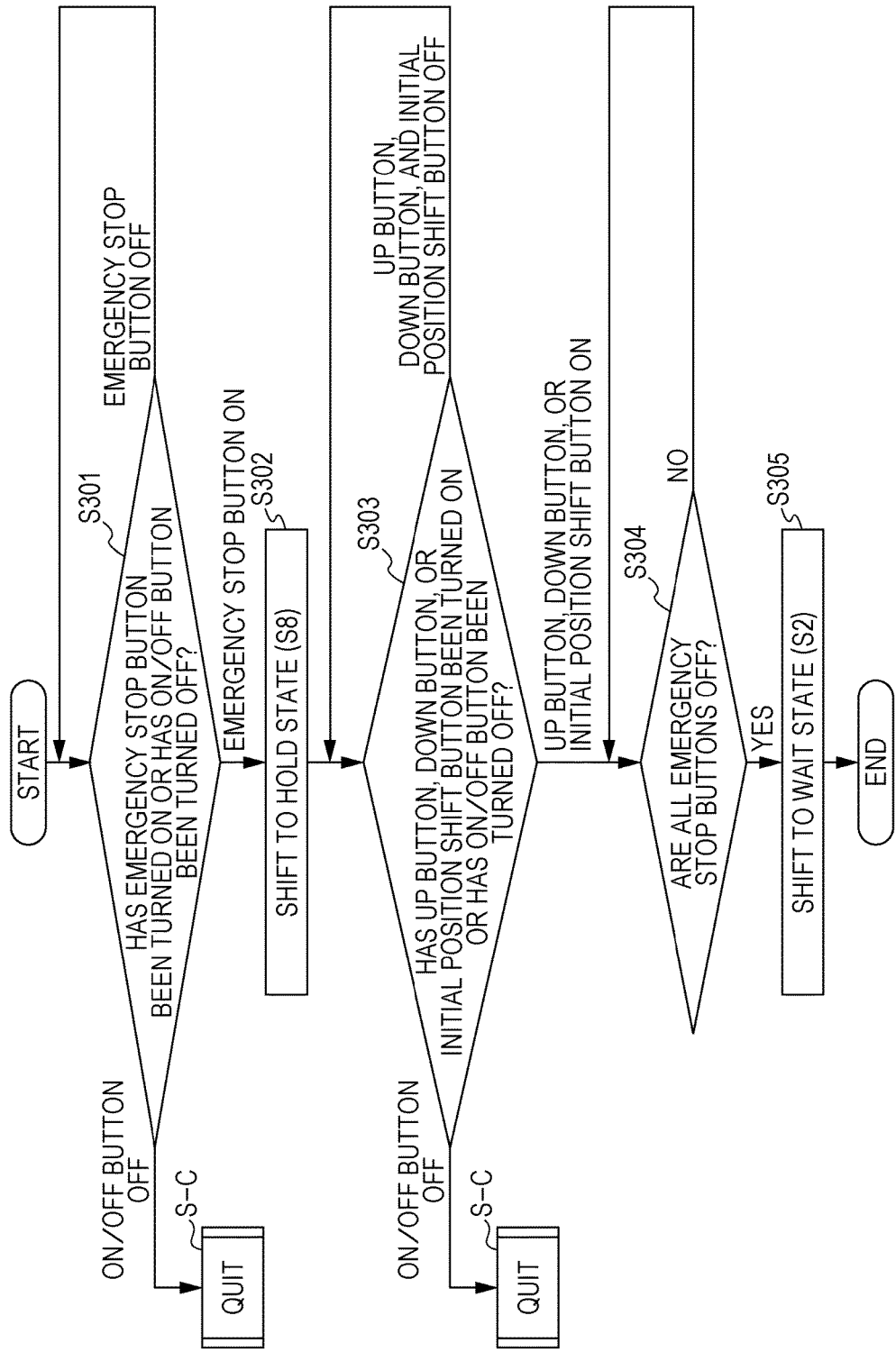
FIG. 24B is a flowchart illustrating an operation when input from the first input IF or that from the second input IF can be received after instructions from both of the first and second input IFs are input in the third embodiment.

((3) Mode in which Input from the First Input IF 6A or that from the Second Input IF 6B can be Received after Instructions from Both of the First and Second Input IFs 6A and 6B are Input, See FIG. 24B)

The flowchart of the operation in the mode (3) is shown in FIG. 24B.

First, in step S301, the controller 12 determines whether or not the emergency stop button 24a of the first input IF 6A for a patient or the emergency stop button 24b of the second input IF 6B for a helper has been turned ON. In step S301, the controller 12 waits for a predetermined time until the emergency stop button 24a or 24b is turned ON. During this predetermined time, if the ON/OFF button 6Aa or 6Ba is turned OFF, the controller 12 executes the quit operation S-C.

If the controller 12 determines in step S301 that the emergency stop button 24a or 24b has been turned ON, the controller proceeds to step S302. In step S302, the operating state manager 21 manages the operating state of the robot system 1 so that the operating state shifts to the state S8. The controller 12 then proceeds to step S303.

In step S303, the controller 12 determines whether or not the up button 6Ab, the down button 6Ac, or the initial position shift button 6Ae of the first input IF 6A has been turned ON during a predetermined time or the up button 6Bb, the down button 6Bc, or the initial position shift button 6Be of the second input IF 6B has been turned ON during the predetermined time. If the ON/OFF button 6Aa or 6Ba is turned OFF during this predetermined time, the controller 12 executes the quit operation S-C.

If the controller 12 determines in step S303 that one of the above-described buttons of the first and second input IFs 6A and 6B has been turned ON, the controller 12 determines in step S304 whether or not all the emergency stop buttons, that is, both of the emergency stop buttons 24a and 24b, are OFF.

If the emergency stop state is canceled as a result of both of the emergency stop buttons 24a and 24b being OFF, the controller 12 proceeds to step S305. In step S305, the state S8 shifts to the state S2. In this manner, the emergency stop operation has been completed. That is, in steps S304 and S305, the operating state manager 21 manages the operating state of the robot system 1 so that the state S8 will be canceled if both of the emergency stop buttons 24a and 24b are turned OFF.

As a result of the series of operations being performed, after confirming the safety of both of the helper 18 and the patient 7, the emergency stop state can be canceled. It is thus possible to operate the robot system 1 more safely.

(Advantages of Third Embodiment)

In the sit-to-stand and/or stand-to-sit assist system of the third embodiment, the two input IFs 6A and 6B, which are an input interface for a patient and an input interface for a helper, respectively, are used. The state of the robot system 1 is managed in accordance with the operation when the patient 7 stands up or sits down, and in accordance with the state of the robot system 1, the operation of the robot 20 or the state of the patient 7 is displayed on the first and second indicators 22A and 22B of the first and second input IFs 6A and 6B. It is thus possible to provide an operation interface that enables the patient 7 and the helper 18 to perform safe operation.

[Modified Examples of First Through Third Embodiments]

When the robot system 1 assists the patient 7 in standing up, the patient 7 may find it difficult to smoothly stand up depending on the position of the arm mechanism 4.

Figure 29:
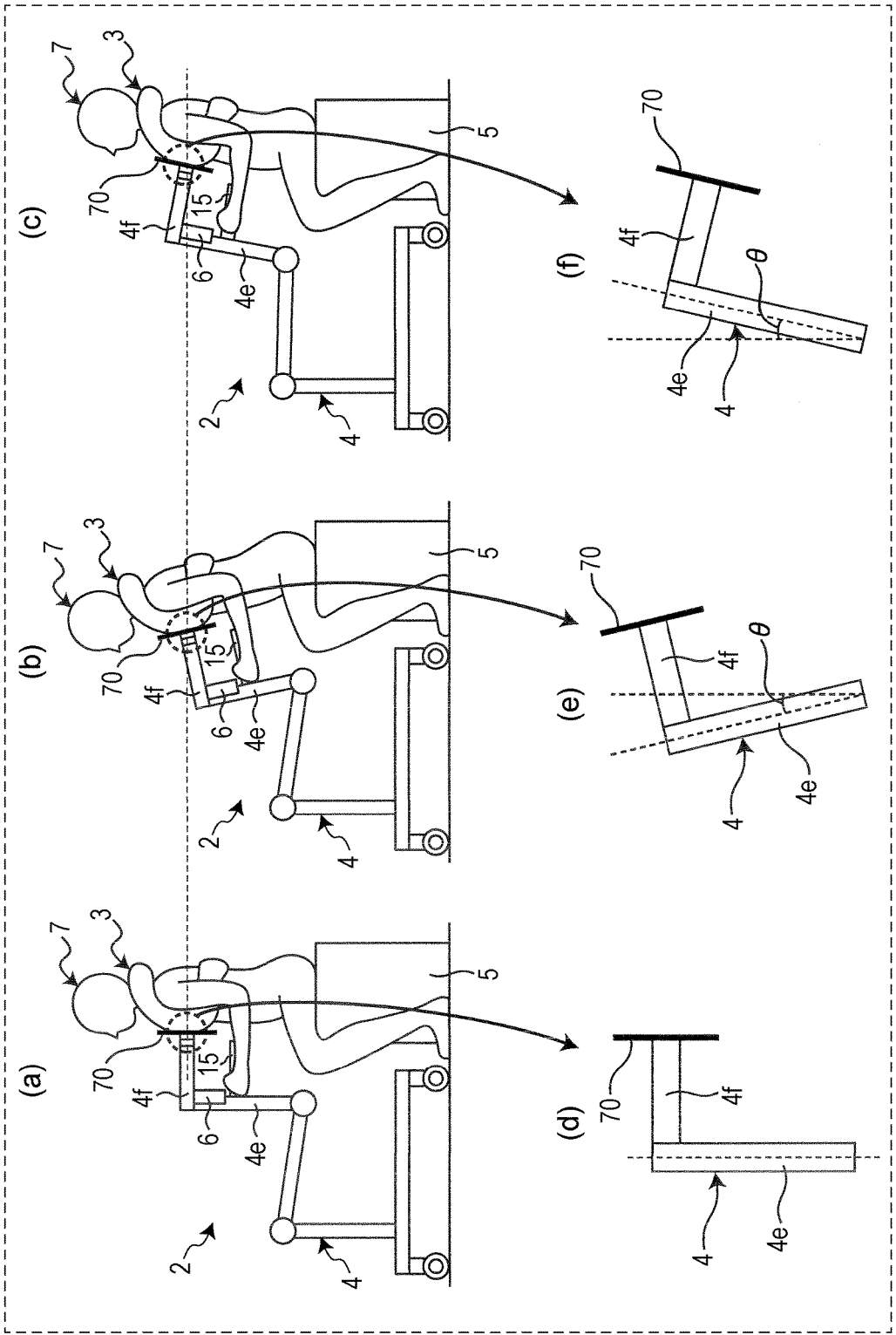
FIG. 29 illustrates the relationship between the position of an arm mechanism and the posture of a patient in a modified example.

As indicated by the horizontal broken line in FIG. 29(a) through FIG. 29(c), although the heights of the connecting portion 4g of the arm mechanism 4 and the connecting portion 3c of the care belt 3 connected to each other are the same, the position of the arm mechanism 4 is different in FIG. 29(a) through FIG. 29(c). FIG. 29(d) through FIG. 29(f) correspond to FIG. 29(a) through 29(c), respectively, and illustrate in enlarged form the states of a surface 70 perpendicular to the axial direction of the fourth arm 4f at the forward end of the arm mechanism 4 near the patient 7. The tilt angle θ of the surface 70 is equal to the angle θ of the third arm 4e, which is perpendicularly connected to the fourth arm 4f, with respect to the vertical direction. Accordingly, the tilt angle θ of the surface 70 may be detected by measuring the tilt angle θ of the third arm 4e.

A case in which the surface 70 is in the vertical position, as shown in FIG. 29(a) and FIG. 29(d) or that the surface 70 is in a position in which it tilts forward (hereinafter referred to as the "forward tilting position"), as shown in FIG. 29(b) and FIG. 29(e) will now be considered. In this case, when the arm mechanism 4 assists the patient 7 in standing up, the surface 70 at the connecting portion 4g of the arm mechanism 4 is in the forward tilting position so as to bend the upper half of the patient 7 forward. Accordingly, the patient 7 can smoothly stand up while leaning forward, as discussed with reference to FIGS. 3A through 3C.

On the other hand, however, in a case in which the surface 70 is in a position in which it tilts backward (hereinafter referred to as the "backward tilting position"), as shown in FIG. 29(c) and FIG. 29(f), when the arm mechanism 4 assists the patient 7 in standing up, the surface 70 at the connecting portion 4g of the arm mechanism 4 is in the backward tilting position so as to bend the upper half of the patient 7 backward. Accordingly, the patient 7 is pulled upward while bending backward, which makes it very difficult for the patient 7 to stand up smoothly.

Accordingly, when the arm mechanism 4 assists the patient 7 in standing up after shifting to the above-described initial position or the height of the arm mechanism 4 has been adjusted after the arm mechanism 4 shifted to the initial position, a determination is made regarding whether or not the surface 70 at the forward end of the connecting portion 4g of the arm mechanism 4 is in the vertical position as shown in FIG. 29(a) and FIG. 29(d), or in the forward tilting position as shown in FIG. 29(b) and FIG. 29(e). Only when it is detected that the surface 70 is in one of the vertical position and in the forward tilting position, may the arm mechanism 4 assist the patient 7 in standing up. For example, a detector, such as a force sensor, for detecting the tilt state of the surface 70 and outputting detection information to the input IF 6 may be provided in the connecting portion 4g of the arm mechanism 4. Then, the controller 12 may perform control so that the arm mechanism 4 can assist the patient 7 in standing up only when the detector has detected that the surface 70 is in one of the vertical position and in the forward tilting position.

The relationship between the tilt angle θ and the position of the surface 70 may be defined as follows. When the clockwise direction is assumed as the positive direction in FIG. 29(e) and FIG. 29(f), the surface 70 is in the vertical position or in the forward tilting position when the tilt angle θ is, for example, in a range of 0 to −30 degrees. In this case, when the surface 70 is in the backward tilting position, the tilt angle θ is, for example, θ>0. Accordingly, if the tilt angle θ detected by the detector is in a range of 0 to −30 degrees, it is determined that the surface 70 is in the vertical position or in the forward tilting position. Then, the controller 12 may perform control so that the arm mechanism 4 can assist the patient 7 in standing up. If the tilt angle θ is outside of the above-described range, the controller 12 may perform control so that the arm mechanism 4 will stop operating without assisting the patient 7 in standing up.

If the tilt angle θ is detected by a sensor, the tilt angle θ may be detected only for a predetermined time (for example, about four seconds) after the arm mechanism 4 has shifted to the initial position or the height of the arm mechanism 4 has been adjusted after the arm mechanism 4 shifted to the initial position, and the position of the surface 70 may be determined based on the tilt angle θ detected during this predetermined time.

If the controller 12 is able to determine whether or not the arm mechanism 4 and the care belt 3 are being connected to each other, based on detection information from a switch or imaging information from a camera that may be output to the controller 12 via the input IF 6, the tilt angle θ may be detected immediately after the connecting operation has finished.

Instead of detecting the tilt angle θ, force applied to the arm mechanism 4 in the traveling direction (forward direction) may be detected by using a force detector 17 such as a force sensor (see FIG. 1A). If the force in the forward direction is smaller than a predetermined threshold, it may be determined that the force in the forward direction is equal to or greater than a predetermined value and the arm mechanism 4 is in the forward tilting position, and the controller 12 may perform control so that the arm mechanism 4 will continue to assist the patient 7 in standing up. This control operation will be discussed below with reference to FIG. 30.

Figure 30:
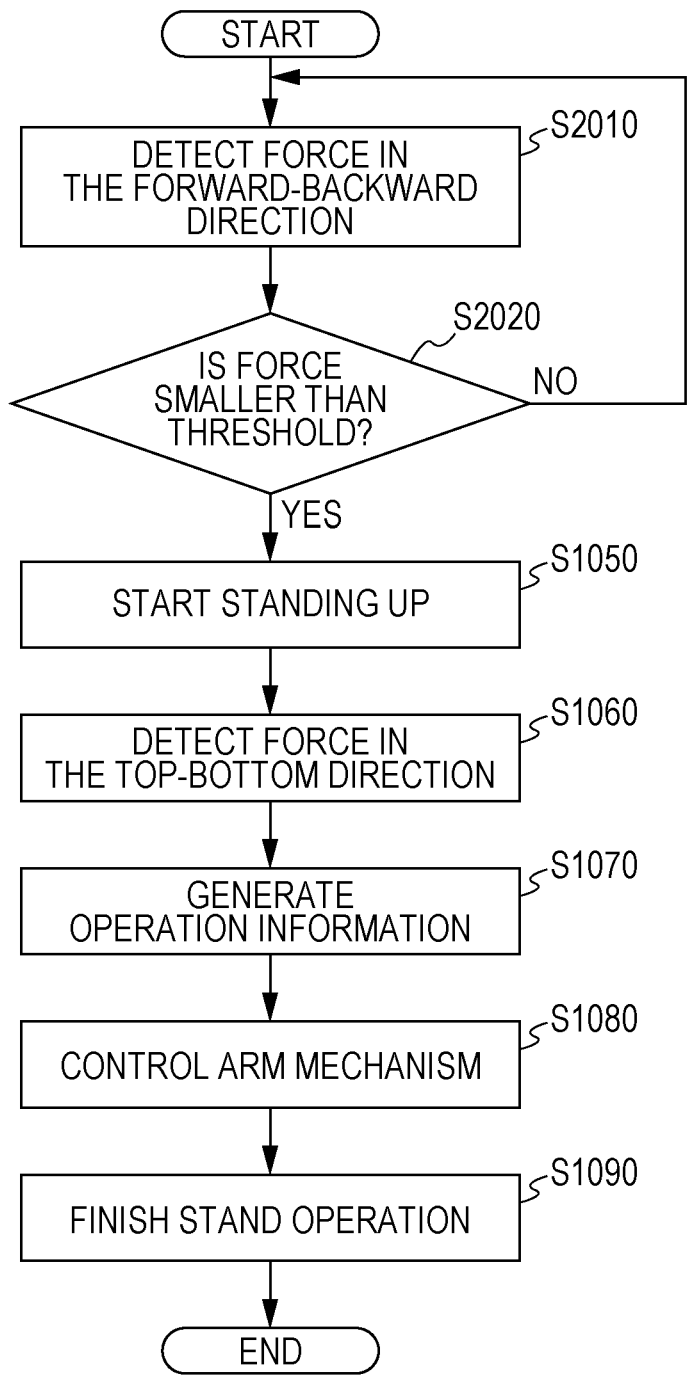
FIG. 30 is a flowchart illustrating a stand operation of a controller in a modified example.

In FIG. 30, in the stand operation S-B, after making a determination as to whether the arm mechanism 4 (surface 70) is in the vertical position or in the forward tilting position, the stand operation is performed.

The stand operation can be performed by utilizing the detection of a force by the force detector 17. Accordingly, prior to a description of the stand operation, the force detector 17 will be explained first.

The force detector 17 (see FIG. 1A), which is a force sensor, is provided in the arm mechanism 4, and detects the force applied to the arm mechanism 4 by the patient 7. After the control operation of the control device 11 of the robot system 1 has started as a result of the patient 7 inputting information indicating that the operation of the robot system 1 has started by using the input IF 6 (for example, by pressing the up button 6b or the down button 6c), the force detector 17 detects the force applied to the arm mechanism 4 by the patient 7. Then, the controller 12 controls the operation of the arm mechanism 4, based on the force detected by the force detector 17, the position of the arm mechanism 4, and the operation information stored in the operation information database 8.

The detection of the force by the force detector 17 will be explained more specifically. As shown in FIG. 1A, the force detector 17 is provided near the connecting portion between the top end of the third arm 4e and the front end of the fourth arm 4f of the arm mechanism 4, and detects the force applied to the arm mechanism 4 from an external source (for example, from the patient 7). Information concerning the force detected by the force detector 17 is stored, together with the time, in the operation information database 8 via the database input/output unit 9. Examples of the force detector 17 are a two-axis force sensor that is capable of measuring the force in the top-bottom direction and the force in the forward-backward direction of the robot system 1 and a three-axis force sensor that is also capable of measuring the rotation of the near side of the robot system 1.

The stand operation S-B will now be discussed. Prior to step S1050 in FIG. 30, steps S2010 and S2020 are executed.

In step S2010, the force detector 17 detects the force in the forward-backward direction. In this case, the forward direction is assumed as the negative sign, while the backward direction is assumed as the positive sign.

Then, in step S2020, it is determined whether or not the force detected by the force detector 17 is smaller than a predetermined threshold (for example, −10N). If the force is smaller than the predetermined threshold, it is determined that the force in the traveling direction (forward direction) is equal to or greater than a predetermined value and that the arm mechanism 4 is in the vertical position or in the forward tilting position, and the controller 12 may perform control so that the stand operation starting from step S1050 will continue. If it is determined in step S2020 that the force detected by the force detector 17 is not smaller than the predetermined threshold, the controller returns to step S2010. In this case, the operating state manager 21 may cause the state indicator 22g to display information for instructing the patient 7 to take a forward leaning posture. For example, an image indicating a forward leaning posture or character information indicating "please take a forward leaning posture" may be displayed. If the operation returning to step S2010 continues even after the lapse of a predetermined time, the processing is terminated.

Then, in step S1050, as a result of the helper 18 or the patient 7 pressing the up button 6b of the input IF 6, the arm mechanism 4 of the robot system 1 starts assisting the patient 7 in standing up. In this example, the arm mechanism 4 is operated only when the up button 6b is being pressed by the helper 18 or the patient 7, and when the helper 18 or the patient 7 releases the up button 6b, the arm mechanism 4 stops operating. For example, from a time point at which the patient 7 is in a sitting posture as shown in FIG. 3A to a time point at which the buttocks 7e of the patient 7 are separated from the seat 5 as shown in FIG. 3B, both of the x axis and the z axis are controlled based on the positions in the operation information database 8, and when the patient 7 is standing up from the posture shown in FIG. 3B to the posture in FIG. 3C, the force in the top-bottom direction is detected by the force detector 17 in step S1060. Then, in step S1070, operation information is generated based on information concerning the force detected by the force detector 17 in step S1060 and position information concerning the arm mechanism 4, and is stored in the operation information database 8 via the database input/output unit 9.

Then, in step S1080, the controller 12 obtains the operation information from the operation information database 8 via the database input/output unit 109, and controls the driving of each of the first and second motors 41 and 42 separately so that the arm mechanism 4 will follow the operation information obtained from the operation information database 8 via the database input/output unit 109.

Then, in step S1090, as a result of the helper 18 or the patient 7 releasing the up button 6b of the input IF 6 at a stand position, the stand operation of the arm mechanism 4 finishes.

Then, the stand operation S-B has been completed.

If it is determined that the arm mechanism 4 is not in the vertical position or in the forward tilting position as a result of a sensor detecting the tilt angle θ or the force detector 17 detecting the force, information that the arm mechanism 4 is not in the vertical position or in the forward tilting position may be displayed or output by voice. Alternatively, an instruction for the patient 7 to move the arm mechanism 4 to the vertical position or the forward tilting position may be displayed or output by voice. Alternatively, a warning or an alarm may be issued.

In the robot system 1 in this modified example, a force sensor for determining whether or not to start a pulling operation is provided. Before starting a pulling operation by a pulling mechanism (for example, the arm mechanism 4), the force sensor measures the force applied to the pulling mechanism in the traveling direction (forward direction) by a holding mechanism (for example, the care belt 3). Only when the force detected by this force sensor exceeds a predetermined value, may the pulling mechanism start the pulling operation. As this force sensor, the force detector 17 may be used. Alternatively, an additional sensor may be separately provided in the pulling mechanism (for example, at the connecting portion 4g) as the force sensor.

With the above-described configuration, the robot system 1 is able to assist the patient 7 in standing up more safely and more smoothly.

In the main body mechanism 2 of the first embodiment, the walking mechanism 14 on which the arm mechanism 4 is mounted is provided. However, the arm mechanism 4 may be disposed near the seat 5 such as a bed, a toilet seat, or a wheel chair, in which case, the provision of the walking mechanism 14 may be omitted.

In the above-described embodiments, the arm mechanism 4 is an example of the pulling mechanism. However, the pulling mechanism is not restricted to the arm mechanism 4. Any type of mechanism may be used as long as it applies a force to the care belt 3 in order to assist the patient 7 in standing up.

In the first embodiment, before starting to assist the patient 7 in standing up or sitting down, the arm mechanism 4 shifts to the initial position. However, if power is turned OFF when the arm mechanism 4 is in the initial position instead of being in the collapsed state, shifting of the arm mechanism 4 to the initial position may be omitted.

In each of the first through third embodiments, a microphone 25, a speaker 26, and a camera 27 may also be provided.

Figure 27A:
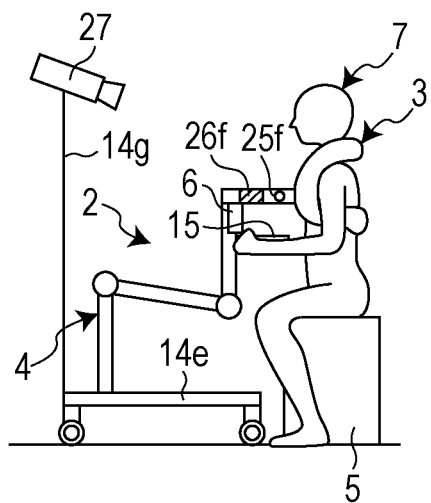
FIGS. 27A and 27B are side views illustrating examples of the overall configuration of a robot system provided with a microphone and a speaker in a modified example.
Figure 27B:
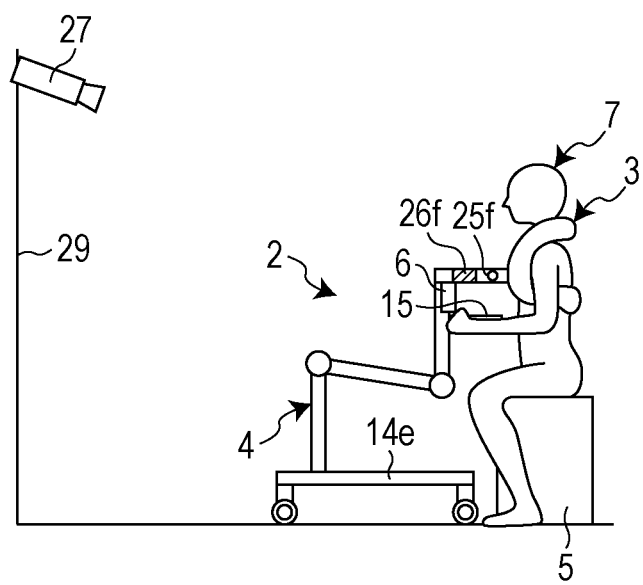

For example, as shown in FIG. 27A, a microphone 25*f* and a speaker 26*f* may be disposed on the fourth arm 4*f* of the arm mechanism 4 of the robot system 1. Further, a pole 14*g* may be provided on the rectangular table 14*e*, and an imaging device 27 such as a camera may be disposed on the top end of the pole 14*g*. The imaging device 27 may be installed in the robot system 1 as described above, or may be installed on a wall 29 in a room where the robot system 1 is operated, as shown in FIG. 27B.

Figure 28:
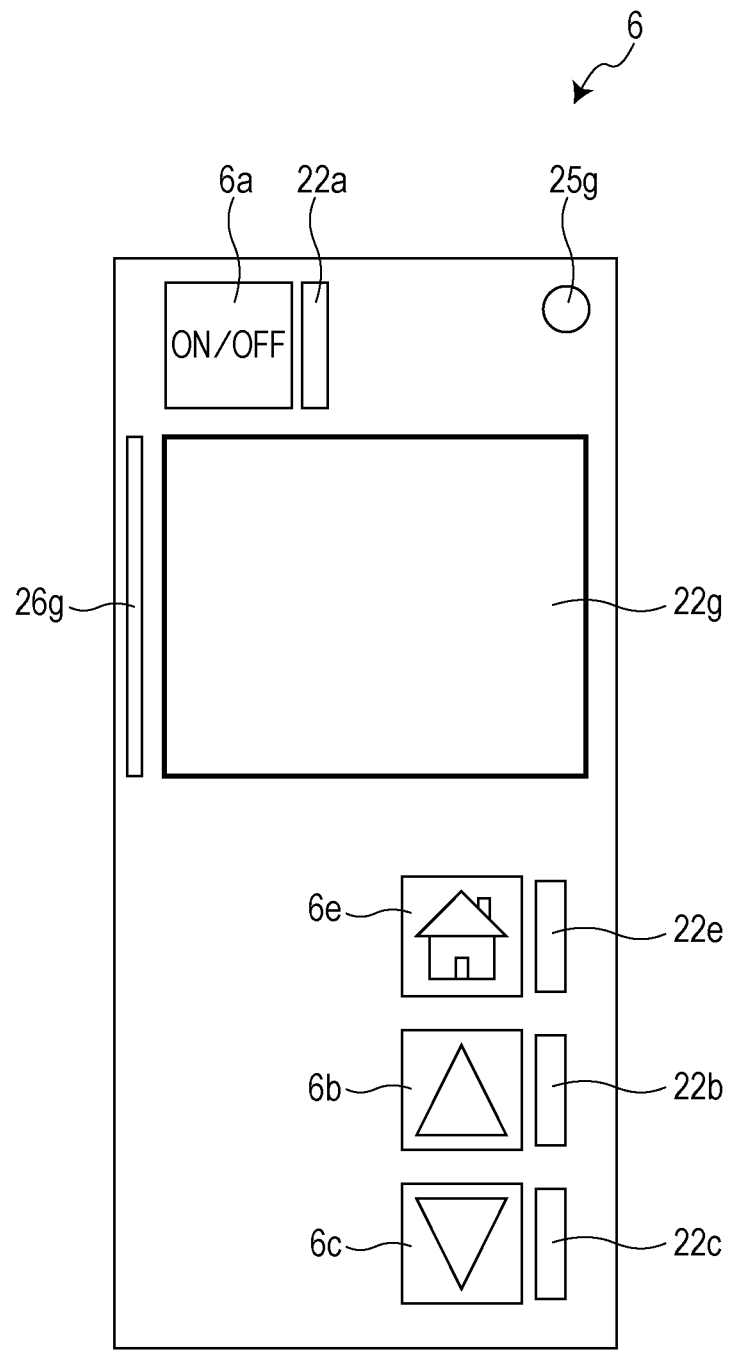
FIG. 28 schematically illustrates an input IF in a modified example.

As shown in FIG. 28, a microphone 25*g* and a speaker 26*g* may be provided in the input IF 6 (or the first input IF 6A and the second input IF 6B).

With the above-described configuration, when the ON/OFF button 6*a* is turned ON, for example, the imaging device 27 installed in the robot system 1 starts imaging, and video showing the state of the patient 7 imaged by the imaging device 27 is displayed on the state indicator 22*g* of the input IF 6 shown in FIG. 28. This enables the helper 18 to check the state of the patient 7 on the input IF 6 in real time. That is, the first and second indicators 22A and 22B indicate the state of the patient 7 based on the execution state. With this configuration, even when the helper 18 remotely controls the operation of the robot 20, the helper 18 is able to check the state and the posture of the patient 7 easily.

If the microphone 25 and the speaker 26 are provided in both of the robot system 1 and the input IF 6, the helper 18 and the patient 7 are able to communicate with each other by using the microphone 25 and the speaker 26.

Figure 23C:
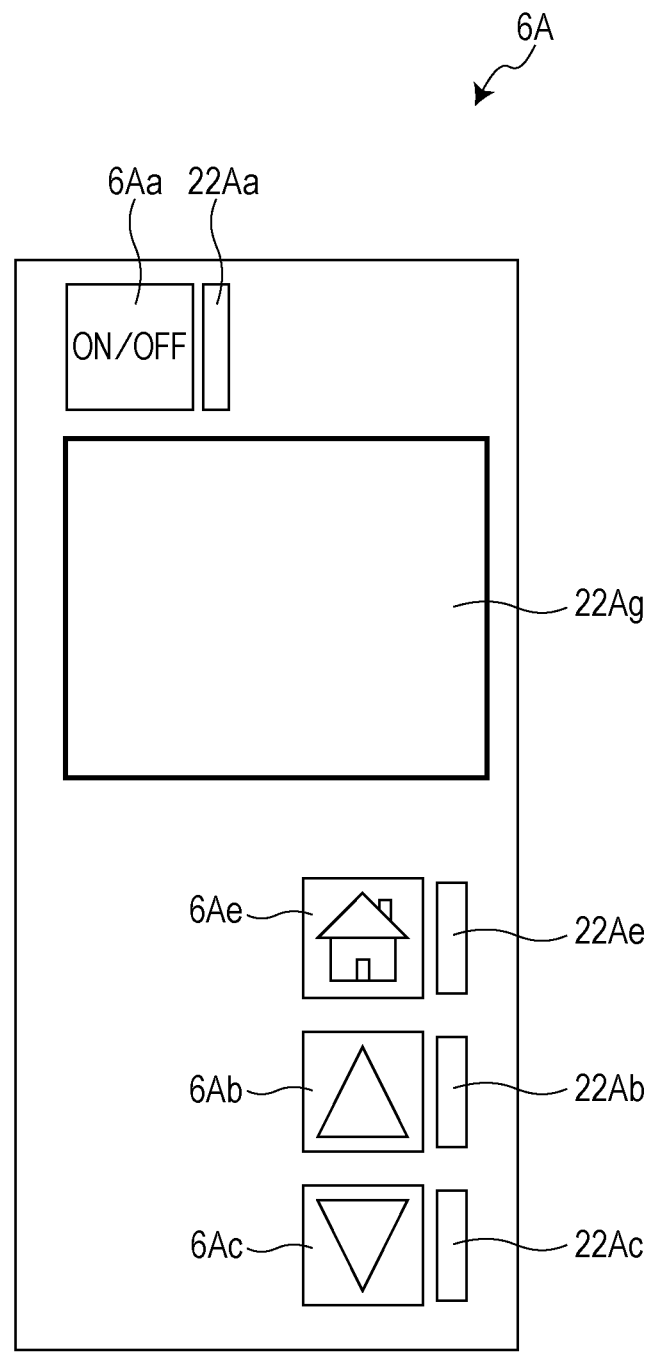
FIGS. 23C and 23D schematically illustrate a first input IF for a patient and a second input IF for a helper, respectively, in a modified example of the third embodiment.
Figure 23D:
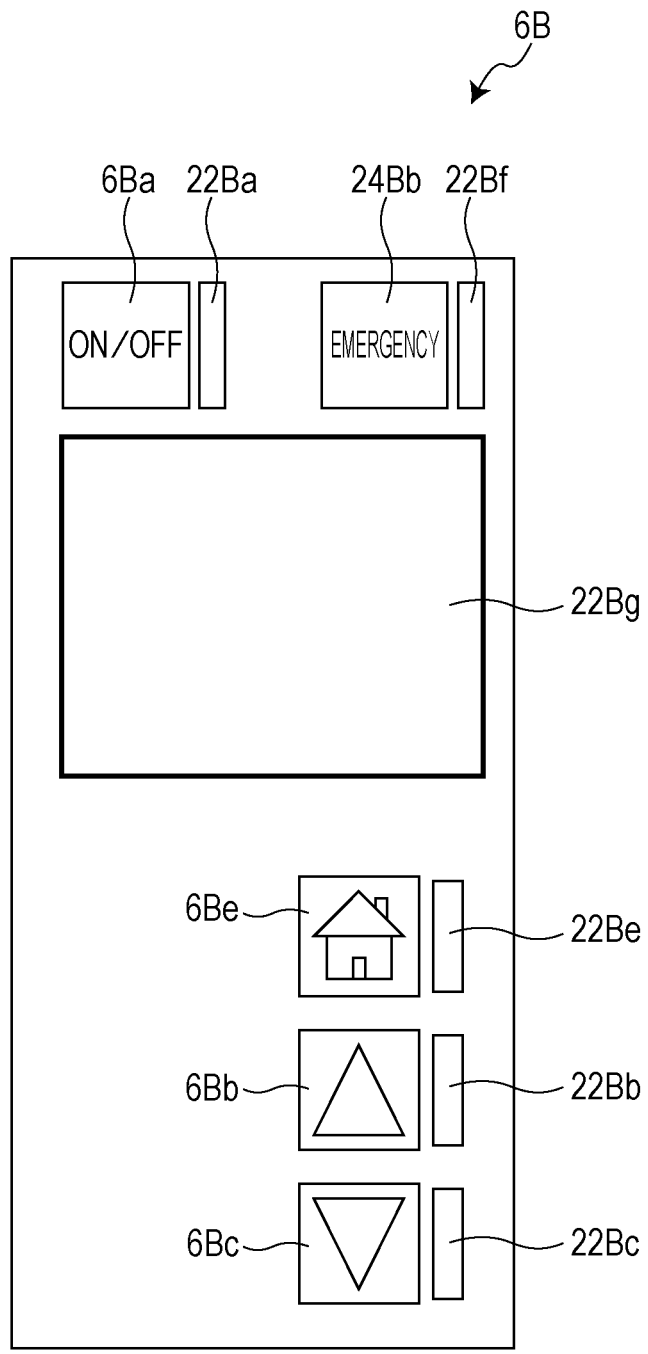

The first and second indicators 22A and 22B may include state indicators 22A*g* and 22B*g*, respectively, as shown in FIGS. 23C and 23D. While the arm mechanism 4 is executing a drive pattern, the controller 12 may cause the first and second indicators 22A and 22B to indicate which one of the first and second input IFs 6A and 6B has given an instruction to execute this drive pattern. For example, characters such as "operating with the helper remote controller" may be displayed on the state indicators 22A*g* and/or 22B*g* (for example, liquid crystal monitors) shown in FIGS. 23C and 23D. Alternatively, two lamps indicating the states of the first and second input IFs 6A and 6B (remote controllers) may be provided on each of the first and second input IFs 6A and 6B, and only the lamp indicating the state of one of the first and second input IFs 6A and 6B which has given an instruction to execute the drive pattern may be turned ON.

With this configuration, during the execution of a drive pattern, the first and second indicators 22A and 22B indicate which one of the first and second input IFs 6A and 6B has given an instruction to execute this drive pattern. Then, the helper 18 and the patient 7 can identify which one of the first and second input IFs 6A and 6B has given an instruction to execute this drive pattern.

In each of the above-described embodiments, the entirety or part of the control device 11 may be constituted by software. The entirety or part of the control device 11 constituted by software may be stored in a computer readable format in a recording medium, such as a storage device (for example, a hard disk), as a computer program including steps which form the control operation of each of the embodiments, and the computer program may be read into a temporary storage device (for example, a semiconductor memory) of a computer and be executed by using a central processing unit (CPU), so that the steps of the control operations can be executed.

More specifically, the entirety or part of the control device 11 of each of the embodiments is a computer system constituted by a microprocessor, a read only memory (ROM), a random access memory (RAM), a hard disk unit, a display unit, a keyboard, a mouse, etc. The computer program is stored in the RAM or the hard disk unit. As a result of the microprocessor operating in accordance with the computer program, the elements of the computer system implement their functions. In this case, the computer program is constituted by a combination of plural instruction codes representing instructions for a computer for implementing predetermined functions.

For example, as a result of a program executing portion, such as a CPU, reading and executing a software program recorded on a recording medium, such as a hard disk or a semiconductor memory, the elements of the software program are implemented. An example of software for implementing the entirety or part of the control device 11 in the above-described embodiments and modified examples is the following program.

A program to be executed by a computer of a robot system, the robot system including:

a drive mechanism that executes a drive pattern for assisting a patient in moving;

an instruction input device that receives an instruction to cause the drive mechanism to execute the drive pattern;

a state acquirer that acquires an execution state of the drive mechanism which is executing the drive pattern;

a controller that decides whether or not to cause the drive mechanism to execute the instruction received by the instruction input device, on the basis of the execution state acquired by the state acquirer, and controls the drive mechanism; and an emergency stop instruction input device that receives an instruction to stop the drive mechanism operating and to maintain a state of the drive mechanism when the drive mechanism stops operating, under the control of the controller, wherein an execution state of the drive mechanism which is executing the drive pattern is acquired by the state acquirer, it is decided by the controller whether or not to cause the drive mechanism to execute the instruction received by the instruction input device, on the basis of the execution state acquired by the state acquirer, if it is decided by the controller that the drive mechanism will execute the instruction received by the instruction input device, the controller controls the drive mechanism based on the instruction, and if it is decided by the controller that the drive mechanism will not execute the instruction received by the instruction input device, the controller does not control the drive mechanism based on the instruction, and if the instruction received by the emergency stop instruction input device is canceled, under the control of the controller, after the drive mechanism is shifted to a connecting position at which the drive mechanism is connected to the patient, the instruction to cause the drive mechanism to execute the drive pattern is received by the instruction input device.

This program may be downloaded from an external source such as a server and be executed. Alternatively, this program may be recorded on a predetermined recording medium (for example, an optical disc such as a compact disc-read only memory (CD-ROM), a magnetic disk, or a semiconductor memory) and be executed.

The computer which executes this program may be a single computer or plural computers. That is, centralized processing may be executed, or distributed processing may be executed.

By combining the above-described embodiments and modified examples in a desired manner, the advantages of the combined embodiments and modified examples are achieved.

The above-described embodiments may be combined with each other, or examples in the above-described embodiments may be combined or the above-described embodiments and examples may be combined. Additionally, features in the different embodiments or different examples may be combined with each other.

A robot system, an instruction input device, a non-transitory computer-readable recording medium, and a control method for the robot system according to an embodiment of the present disclosure are applicable to a robot system, an instruction input device, a non-transitory computer-readable recording medium, and a control method for the robot system in which, when the robot system assists a patient in standing up, sitting down, or walking, a drive mechanism of the robot system does not perform any operation that the patient does not wish to receive, which would otherwise make the patient feel uncomfortable.

What is claimed is:

1. A robot system comprising:
   a drive mechanism that executes a drive pattern for assisting a user in moving;
   an instruction input device that receives an instruction to execute the drive pattern;
   a state acquirer that acquires an execution state of the drive mechanism which is executing the drive pattern; and
   a controller that decides whether or not to cause the drive mechanism to execute the instruction received by the instruction input device, on the basis of the execution state, and controls driving of the drive mechanism,
   wherein
   when an emergency stop instruction is received, until predetermined conditions are satisfied, the controller does not allow the drive mechanism to execute the instruction received by the instruction input device, the emergency stop instruction being an instruction to stop the drive mechanism operating and to maintain a state of the drive mechanism when the drive mechanism stops operating, and
   the predetermined conditions are that (i) the emergency stop instruction is canceled and (ii) the drive mechanism is shifted to a connecting position at which the drive mechanism is connected to the user.

2. The robot system according to claim 1, wherein, when the emergency stop instruction is received, even after the emergency stop instruction is canceled, until the drive mechanism reaches the connecting position, the controller does not allow the drive mechanism to execute the instruction received by the instruction input device.

3. The robot system according to claim 1, further comprising:
   an emergency stop instruction input device that receives the emergency stop instruction to stop the drive mechanism operating and to maintain a state of the drive mechanism when the drive mechanism stops operating,
   wherein, when the emergency stop instruction is received by the emergency stop instruction input device, until the predetermined conditions are satisfied, the controller does not allow the drive mechanism to execute the instruction received by the instruction input device.

4. The robot system according to claim 1,
   the drive mechanism including
      a holding mechanism that holds the user, and
      a pulling mechanism that is connectable to the holding mechanism and pulls the holding mechanism so that the holding mechanism will move along the drive pattern,
   the instruction input device including
      a connecting position shift instruction input device that receives an instruction to shift the pulling mechanism to the connecting position,
   wherein the predetermined conditions are that (i) the emergency stop instruction is canceled, (ii) the connecting position shift instruction input device receives the instruction to shift the pulling mechanism to the connecting position, and (iii) the drive mechanism is shifted to the connecting position.

5. The robot system according to claim 1, wherein:
   the drive mechanism executes a first drive pattern for assisting the user in performing a first movement and a second drive pattern for assisting the user in performing a second movement;
   the instruction input device receives a first instruction to cause the drive mechanism to execute the first drive pattern or a second instruction to cause the drive mechanism to execute the second drive pattern; and
   when the second instruction is received by the instruction input device when the execution state acquired by the state acquirer indicates that the drive mechanism is executing the first drive pattern, the controller does not allow the drive mechanism to execute the second drive pattern.

6. The robot system according to claim 1, wherein:
   the instruction input device includes an indicator that indicates whether or not it is possible to receive the instruction to execute the drive pattern; and
   the controller causes the indicator to indicate whether or not it is possible to receive the instruction, on the basis of a result of deciding whether or not to cause the drive mechanism to execute the instruction received by the instruction input device.

7. The robot system according to claim 6, wherein, when the instruction received by the instruction input device is wirelessly transmitted to the controller, the controller causes the indicator to indicate the execution state acquired by the state acquirer.

8. The robot system according to claim 6, wherein, when the instruction received by the instruction input device is wirelessly transmitted to the controller, the controller causes the indicator to indicate a state of the user based on the execution state acquired by the state acquirer.

9. The robot system according to claim 5, wherein:
   the instruction input device includes first and second instruction input devices;
   the first instruction input device receives a third instruction that causes the drive mechanism to execute the first instruction received by the first instruction input device with higher priority than the second instruction received by the second instruction input device; and
   when the third instruction is received by the first instruction input device, the controller performs control so that the drive mechanism will not execute the second instruction even when the second instruction is received by the second instruction input device.

10. The robot system according to claim 9, wherein:
the second instruction input device receives a fourth instruction to stop the drive pattern executed by the drive mechanism; and
when the fourth instruction is received by the second instruction input device, the controller performs control so that the drive mechanism will not execute the third instruction even when the third instruction is received by the first instruction input device.

11. The robot system according to claim 9, wherein:
the first and second instruction input devices include first and second indicators, respectively; and
while the drive mechanism is executing the drive pattern, the controller causes each of the first and second indicators to indicate which one of the first and second instruction input devices has provided an instruction to execute the drive pattern.

12. An instruction input device comprising:
a state acquirer that acquires an execution state of a drive mechanism which is executing a drive pattern, the drive pattern being executed for assisting a user in moving; and
a controller that decides whether or not to cause the drive mechanism to execute an instruction to execute the drive pattern, on the basis of the execution state, and controls driving of the drive mechanism, wherein
when an emergency stop instruction is received, until predetermined conditions are satisfied, the controller does not allow the drive mechanism to execute an instruction received by the instruction input device, the emergency stop instruction being an instruction to stop the drive mechanism operating and to maintain a state of the drive mechanism when the drive mechanism stops operating, and
the predetermined conditions are that (i) the emergency stop instruction is canceled and (ii) the drive mechanism is shifted to a connecting position at which the drive mechanism is connected to the user.

13. The instruction input device according to claim 12, further comprising:
an indicator that indicates whether or not it is possible to receive the instruction to execute the drive pattern,
wherein, when the instruction received by the instruction input device is wirelessly transmitted to the controller, the indicator indicates a state of the user based on the execution state acquired by the state acquirer.

14. The instruction input device according to claim 12, wherein, when the emergency stop instruction is received, even after the emergency stop instruction is canceled, until the drive mechanism reaches the connecting position, the controller does not allow the drive mechanism to execute the instruction received by the instruction input device.

15. The instruction input device according to claim 12, further comprising:
an emergency stop instruction input device that receives the emergency stop instruction to stop the drive mechanism operating and to maintain a state of the drive mechanism when the drive mechanism stops operating,
wherein, when the emergency stop instruction is received by the emergency stop instruction input device, until the predetermined conditions are satisfied, the controller does not allow the drive mechanism to execute the instruction received by the instruction input device.

16. A non-transitory computer-readable recording medium storing a program for controlling a robot system, the robot system including
a drive mechanism that executes a drive pattern for assisting a user in moving,
an instruction input device that receives an instruction to execute the drive pattern,
a state acquirer that acquires an execution state of the drive mechanism which is executing the drive pattern,
a controller that decides whether or not to cause the drive mechanism to execute the instruction received by the instruction input device, on the basis of the execution state, and controls driving of the drive mechanism, and
an emergency stop instruction input device that receives an emergency stop instruction to stop the drive mechanism operating and to maintain a state of the drive mechanism when the drive mechanism stops operating,
the program causing the controller to execute:
not allowing, when the emergency stop instruction is received by the emergency stop instruction input device, the drive mechanism to execute the instruction received by the instruction input device until predetermined conditions are satisfied; and
causing, when the emergency stop instruction is received by the emergency stop instruction input device, the drive mechanism to execute the instruction received by the instruction input device after the predetermined conditions are satisfied,
wherein the predetermined conditions are that (i) the emergency stop instruction is canceled and (ii) the drive mechanism is shifted to a connecting position at which the drive mechanism is connected to the user.

17. The non-transitory computer-readable recording medium according to claim 16, wherein:
the instruction input device includes an indicator that indicates whether or not the instruction to execute the drive pattern will be received, and
when the instruction received by the instruction input device is wirelessly transmitted to the controller, the indicator indicates a state of the user based on the execution state acquired by the state acquirer.

18. The non-transitory computer-readable recording medium according to claim 16, wherein, when the emergency stop instruction is received, even after the emergency stop instruction is canceled, until the drive mechanism reaches the connecting position, the controller does not allow the drive mechanism to execute the instruction received by the instruction input device.

19. A control method for a robot system, the robot system including
a drive mechanism that executes a drive pattern for assisting a user in moving,
an instruction input device that receives an instruction to execute the drive pattern,
a state acquirer that acquires an execution state of the drive mechanism which is executing the drive pattern,
a controller that decides whether or not to cause the drive mechanism to execute the instruction received by the instruction input device, on the basis of the execution state, and controls driving of the drive mechanism, and
an emergency stop instruction input device that receives an emergency stop instruction to stop the drive mechanism operating and to maintain a state of the drive mechanism when the drive mechanism stops operating,
the control method comprising:
not allowing, when the emergency stop instruction is received by the emergency stop instruction input device, the drive mechanism to execute the instruction received by the instruction input device until predetermined conditions are satisfied; and causing, when the emergency stop instruction is received by the emergency stop instruction input device, the drive mechanism to execute the instruction received by the instruction input device after the predetermined conditions are satisfied, wherein the predetermined conditions are that (i) the emergency stop instruction is canceled and (ii) the drive mechanism is shifted to a connecting position at which the drive mechanism is connected to the user.

* * * * *